(12) United States Patent
Signorelli et al.

(10) Patent No.: US 11,482,384 B2
(45) Date of Patent: *Oct. 25, 2022

(54) HIGH TEMPERATURE ENERGY STORAGE DEVICE

(71) Applicant: FASTCAP SYSTEMS CORPORATION, Boston, MA (US)

(72) Inventors: Riccardo Signorelli, Boston, MA (US); John J. Cooley, Boston, MA (US); Christopher John Sibbald Deane, Boston, MA (US); James Epstein, Sharon, MA (US); Padmanaban Sasthan Kuttipillai, Malden, MA (US); Fabrizio Martini, Boston, MA (US); Lindsay A. Wilhelmus, Lexington, KY (US)

(73) Assignee: FASTCAP SYSTEMS CORPORATION, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/872,959

(22) Filed: May 12, 2020

(65) Prior Publication Data

US 2020/0273632 A1 Aug. 27, 2020

Related U.S. Application Data

(63) Continuation of application No. 14/131,666, filed as application No. PCT/US2012/045994 on Jul. 9, 2012.
(Continued)

(51) Int. Cl.
*H01G 11/14* (2013.01)
*H01G 11/18* (2013.01)
(Continued)

(52) U.S. Cl.
CPC ............. *H01G 11/14* (2013.01); *H01G 11/18* (2013.01); *H01G 11/32* (2013.01); *H01G 11/58* (2013.01);
(Continued)

(58) Field of Classification Search
CPC .......... H01G 11/60; H01G 9/10; H01G 11/14; H01G 11/32; H01G 11/04; H01G 11/78; H01G 11/18; H01G 11/58; H01G 11/84
(Continued)

(56) References Cited

U.S. PATENT DOCUMENTS

| 3,185,903 A | 5/1965 | Genovese |
| 3,982,182 A | 9/1976 | Hogg |

(Continued)

FOREIGN PATENT DOCUMENTS

| CN | 1096611 A | 12/1994 |
| CN | 1317809 A | 10/2001 |

(Continued)

OTHER PUBLICATIONS

[No Author Listed], New technology for electric vehicle. Japan Electric Society, Electric Vehicle Drive System Survey Special Committee. Machinery Industry Press. Section 5.6. Aug. 2008:134-9.

(Continued)

*Primary Examiner* — Arun Ramaswamy

(57) ABSTRACT

An ultracapacitor that includes an energy storage cell immersed in an electrolyte and disposed within an hermetically sealed housing, the cell electrically coupled to a positive contact and a negative contact, wherein the ultracapacitor is configured to output electrical energy within a temperature range between about 80 degrees Celsius to about 210 degrees Celsius. Methods of fabrication and use are provided.

18 Claims, 19 Drawing Sheets

Related U.S. Application Data

(60) Provisional application No. 61/619,203, filed on Apr. 2, 2012, provisional application No. 61/602,713, filed on Feb. 24, 2012, provisional application No. 61/569,010, filed on Dec. 9, 2011, provisional application No. 61/560,888, filed on Nov. 17, 2011, provisional application No. 61/512,090, filed on Jul. 27, 2011, provisional application No. 61/505,715, filed on Jul. 8, 2011.

(51) Int. Cl.
*H01G 11/58* (2013.01)
*H01G 11/78* (2013.01)
*H01G 11/84* (2013.01)
*H01G 11/32* (2013.01)
*H01G 11/60* (2013.01)

(52) U.S. Cl.
CPC ............ *H01G 11/60* (2013.01); *H01G 11/78* (2013.01); *H01G 11/84* (2013.01); *Y02E 60/13* (2013.01)

(58) Field of Classification Search
USPC ...... 361/502, 503, 504, 508, 518; 500/300.1
See application file for complete search history.

(56) References Cited

U.S. PATENT DOCUMENTS

| | | | |
|---|---|---|---|
| 4,208,699 A * | 6/1980 | Philpott | H01G 9/10 361/519 |
| 4,252,873 A | 2/1981 | Epstein et al. | |
| 4,349,910 A | 9/1982 | Belz | |
| 4,408,259 A | 10/1983 | Muranaka et al. | |
| 4,604,676 A | 8/1986 | Senda et al. | |
| 4,934,366 A | 6/1990 | Truex et al. | |
| 4,982,485 A | 1/1991 | Nakaya et al. | |
| 4,992,910 A | 2/1991 | Evans | |
| 5,440,447 A | 8/1995 | Shipman et al. | |
| 5,441,827 A | 8/1995 | Gratzel et al. | |
| 5,476,709 A | 12/1995 | Inoue et al. | |
| 5,710,699 A | 1/1998 | King et al. | |
| 5,711,988 A | 1/1998 | Tsai et al. | |
| 5,736,647 A | 4/1998 | Matsubara et al. | |
| 5,885,650 A | 3/1999 | Melody et al. | |
| 5,923,619 A | 7/1999 | Knapen et al. | |
| 5,945,749 A | 8/1999 | Li | |
| 5,982,156 A | 11/1999 | Weimer et al. | |
| 6,059,847 A | 5/2000 | Farahmandi et al. | |
| 6,118,251 A | 9/2000 | Atwater | |
| 6,193,032 B1 | 2/2001 | Lesieutre et al. | |
| 6,193,779 B1 | 2/2001 | Reichert et al. | |
| 6,194,815 B1 | 2/2001 | Carroll | |
| 6,201,685 B1 | 3/2001 | Jerabek et al. | |
| 6,205,016 B1 | 3/2001 | Niu | |
| 6,232,706 B1 | 5/2001 | Dai et al. | |
| 6,257,332 B1 | 7/2001 | Vidrine et al. | |
| 6,304,427 B1 | 10/2001 | Reed et al. | |
| 6,318,457 B1 | 11/2001 | Den Boer et al. | |
| 6,350,488 B1 | 2/2002 | Lee et al. | |
| 6,388,423 B1 | 5/2002 | Schilleci, Jr. | |
| 6,413,285 B1 | 7/2002 | Chu et al. | |
| 6,443,999 B1 | 9/2002 | Cantave et al. | |
| 6,444,326 B1 | 9/2002 | Smith | |
| 6,454,816 B1 | 9/2002 | Lee et al. | |
| 6,491,848 B1 | 12/2002 | Sato et al. | |
| 6,498,712 B1 | 12/2002 | Ditlya | |
| 6,511,760 B1 | 1/2003 | Barone et al. | |
| 6,514,113 B1 | 2/2003 | Lee et al. | |
| 6,565,701 B1 | 5/2003 | Jerabek et al. | |
| 6,585,915 B2 * | 7/2003 | Shinozaki | H01G 9/155 252/502 |
| 6,665,169 B2 | 12/2003 | Tennent et al. | |
| 6,706,610 B2 | 3/2004 | Tetsuo et al. | |
| 6,764,874 B1 | 7/2004 | Zhang et al. | |
| 6,872,681 B2 | 3/2005 | Niu et al. | |
| 6,906,911 B2 | 6/2005 | Keda et al. | |
| 6,914,341 B1 | 7/2005 | McIntyre | |
| 6,924,059 B1 | 8/2005 | Kawakami et al. | |
| 6,927,475 B2 | 8/2005 | Lu | |
| 6,952,060 B2 | 10/2005 | Goldner et al. | |
| 6,962,823 B2 | 11/2005 | Empedocles et al. | |
| 7,070,833 B2 | 7/2006 | Smith et al. | |
| 7,126,207 B2 | 10/2006 | Mosley et al. | |
| 7,168,487 B2 | 1/2007 | Salamitou et al. | |
| 7,201,627 B2 | 4/2007 | Ohnuma | |
| 7,268,256 B2 | 9/2007 | Kikuyama et al. | |
| 7,327,556 B2 | 2/2008 | Ro et al. | |
| 7,335,395 B2 | 2/2008 | Ward et al. | |
| 7,381,367 B1 | 6/2008 | Baker et al. | |
| 7,468,679 B2 | 12/2008 | Feluch | |
| 7,493,962 B2 | 2/2009 | Sheffield | |
| 7,511,941 B1 | 3/2009 | Gallay et al. | |
| 7,567,013 B2 | 7/2009 | Lu et al. | |
| 7,605,271 B2 * | 10/2009 | Uchimura | C07D 233/54 548/300.1 |
| 7,645,434 B2 | 1/2010 | Welz-Biermann et al. | |
| 7,699,102 B2 | 4/2010 | Storm et al. | |
| 7,713,658 B2 | 5/2010 | Mizuta et al. | |
| 7,785,558 B2 | 8/2010 | Hikata | |
| 7,834,197 B2 | 11/2010 | Nishida et al. | |
| 7,897,209 B2 | 3/2011 | Shibuya et al. | |
| 7,914,927 B2 | 3/2011 | Mizuta et al. | |
| 7,982,345 B2 | 7/2011 | Tung et al. | |
| 7,982,439 B2 | 7/2011 | Trainor et al. | |
| 7,999,695 B2 | 8/2011 | Rodney et al. | |
| 8,025,971 B2 | 9/2011 | Maeno et al. | |
| 8,168,331 B2 | 5/2012 | Best et al. | |
| 8,481,158 B2 | 7/2013 | Nakayama et al. | |
| 8,531,818 B2 | 9/2013 | Hashimoto et al. | |
| 8,760,851 B2 | 6/2014 | Signorelli et al. | |
| 8,932,750 B2 | 1/2015 | Cooley et al. | |
| 9,001,495 B2 | 4/2015 | Martini et al. | |
| 9,013,144 B2 | 4/2015 | Cooley et al. | |
| 9,017,634 B2 | 4/2015 | Brambilla et al. | |
| 9,206,672 B2 | 12/2015 | Cooley et al. | |
| 9,209,434 B2 | 12/2015 | Epstein | |
| 9,214,709 B2 | 12/2015 | Cooley et al. | |
| 9,218,917 B2 | 12/2015 | Brambilla et al. | |
| 9,515,499 B2 | 12/2016 | Signorelli et al. | |
| 9,558,894 B2 | 1/2017 | Signorelli et al. | |
| 9,683,441 B2 | 6/2017 | Signorellii et al. | |
| 9,954,382 B2 | 4/2018 | Cooley et al. | |
| 2001/0006108 A1 | 7/2001 | Brett | |
| 2001/0040379 A1 | 11/2001 | Schultz et al. | |
| 2002/0018934 A1 * | 2/2002 | Majima | H01M 4/587 429/231.8 |
| 2002/0043369 A1 | 4/2002 | Vinegar et al. | |
| 2002/0159943 A1 | 10/2002 | Smalley et al. | |
| 2002/0177018 A1 | 11/2002 | Fuglevand | |
| 2003/0003359 A1 | 1/2003 | Banno et al. | |
| 2003/0027038 A1 | 2/2003 | Tsukamoto et al. | |
| 2003/0030960 A1 | 2/2003 | Kanno et al. | |
| 2003/0030969 A1 | 2/2003 | Farahmandi et al. | |
| 2003/0081372 A1 | 5/2003 | Nakazawa et al. | |
| 2004/0084219 A1 | 5/2004 | Moore et al. | |
| 2004/0130852 A1 | 7/2004 | Matsumoto et al. | |
| 2004/0131937 A1 | 7/2004 | Chen et al. | |
| 2004/0142190 A1 * | 7/2004 | Kawai | H01G 9/08 428/461 |
| 2004/0188350 A1 | 9/2004 | Beste et al. | |
| 2004/0229117 A1 | 11/2004 | Mitani et al. | |
| 2004/0265682 A1 | 12/2004 | Hudson et al. | |
| 2005/0023070 A1 | 2/2005 | Smiley et al. | |
| 2005/0152096 A1 | 7/2005 | Farahmandi et al. | |
| 2005/0172721 A1 | 8/2005 | Daigle | |
| 2005/0182744 A1 | 8/2005 | Kawabata et al. | |
| 2005/0208207 A1 | 9/2005 | Hinoki et al. | |
| 2005/0231893 A1 * | 10/2005 | Harvey | H01G 11/12 361/502 |
| 2005/0234177 A1 | 10/2005 | Zaghib et al. | |
| 2005/0238810 A1 | 10/2005 | Scaringe et al. | |
| 2006/0019168 A1 | 1/2006 | Li et al. | |

(56) References Cited

U.S. PATENT DOCUMENTS

| | | |
|---|---|---|
| 2006/0115722 A1 | 6/2006 | Kim |
| 2006/0191681 A1 | 8/2006 | Storm et al. |
| 2006/0194102 A1 | 8/2006 | Keshishian et al. |
| 2006/0256506 A1 | 11/2006 | Konuma et al. |
| 2006/0279906 A1 | 12/2006 | Stemen et al. |
| 2007/0015336 A1 | 1/2007 | Farahmandi et al. |
| 2007/0024266 A1 | 2/2007 | Yurgil |
| 2007/0026295 A1 | 2/2007 | Angell et al. |
| 2007/0076349 A1 | 4/2007 | Dementiev et al. |
| 2007/0097598 A1 | 5/2007 | Siggel et al. |
| 2007/0146965 A1 | 6/2007 | Mitchell et al. |
| 2007/0175663 A1 | 8/2007 | Rotthaeuser |
| 2007/0188977 A1 | 8/2007 | Takeda et al. |
| 2007/0224516 A1 | 9/2007 | Deguchi et al. |
| 2007/0254213 A1 | 11/2007 | Best et al. |
| 2007/0258192 A1 | 11/2007 | Schindall et al. |
| 2007/0258193 A1 | 11/2007 | Zhong et al. |
| 2007/0259216 A1 | 11/2007 | Logan |
| 2007/0287062 A1 | 12/2007 | Tsukuda et al. |
| 2007/0292746 A1 | 12/2007 | Sloop |
| 2007/0296606 A1 | 12/2007 | Godager |
| 2008/0003166 A1 | 1/2008 | Maletin et al. |
| 2008/0013224 A1 | 1/2008 | Kim et al. |
| 2008/0068801 A1 | 3/2008 | Wilk |
| 2008/0083626 A1 | 4/2008 | Kubo et al. |
| 2008/0089012 A1 | 4/2008 | Kon et al. |
| 2008/0090183 A1 | 4/2008 | Zhu et al. |
| 2008/0094777 A1 | 4/2008 | Itahashi et al. |
| 2008/0123330 A1 | 5/2008 | Sullivan |
| 2008/0128123 A1 | 6/2008 | Gold |
| 2008/0150524 A1 | 6/2008 | Song et al. |
| 2008/0192407 A1 | 8/2008 | Lu et al. |
| 2008/0212261 A1 | 9/2008 | Ajayan et al. |
| 2008/0316678 A1 | 12/2008 | Ehrenberg et al. |
| 2008/0317660 A1 | 12/2008 | Pan et al. |
| 2008/0318049 A1 | 12/2008 | Hata et al. |
| 2009/0011330 A1 | 1/2009 | Onodera et al. |
| 2009/0021890 A1 | 1/2009 | Bourcier et al. |
| 2009/0102478 A1 | 4/2009 | Reiderman et al. |
| 2009/0103241 A1 | 4/2009 | Kikuchi et al. |
| 2009/0147441 A1 | 6/2009 | Yoshida et al. |
| 2009/0154059 A1 | 6/2009 | Wessling et al. |
| 2009/0194314 A1 | 8/2009 | Varkey et al. |
| 2009/0244812 A1 | 10/2009 | Rawal et al. |
| 2009/0250409 A1 | 10/2009 | Fiene et al. |
| 2009/0272935 A1 | 11/2009 | Hata et al. |
| 2009/0272946 A1 | 11/2009 | Lu |
| 2009/0286163 A1 | 11/2009 | Shin et al. |
| 2009/0294753 A1 | 12/2009 | Hauge et al. |
| 2009/0302153 A1 | 12/2009 | Matasso et al. |
| 2009/0303658 A1 | 12/2009 | Hiroyuki et al. |
| 2010/0004121 A1 | 1/2010 | Chang et al. |
| 2010/0016287 A1 | 1/2010 | Bonanomi et al. |
| 2010/0046142 A1 | 2/2010 | Aitchison et al. |
| 2010/0119934 A1 | 5/2010 | Ushio et al. |
| 2010/0134955 A1 | 6/2010 | O'Connor et al. |
| 2010/0178564 A1 | 7/2010 | Asari et al. |
| 2010/0194117 A1 | 8/2010 | Pabon et al. |
| 2010/0196600 A1 | 8/2010 | Shibuya et al. |
| 2010/0196758 A1 | 8/2010 | Hojo et al. |
| 2010/0236777 A1 | 9/2010 | Partouche et al. |
| 2010/0259866 A1 | 10/2010 | Shaffer et al. |
| 2011/0045327 A1 | 2/2011 | Yawata et al. |
| 2011/0049901 A1 | 3/2011 | Tinnen et al. |
| 2011/0057151 A1 | 3/2011 | Chen et al. |
| 2011/0080689 A1 | 4/2011 | Bielawski et al. |
| 2011/0085285 A1 | 4/2011 | Zednicek et al. |
| 2011/0122662 A1 | 5/2011 | Li et al. |
| 2011/0141661 A1 | 6/2011 | Muthu et al. |
| 2011/0150736 A1 | 6/2011 | Hagiwara et al. |
| 2011/0151317 A1 | 6/2011 | Giroud et al. |
| 2011/0170236 A1 | 7/2011 | Young |
| 2011/0194231 A1 | 8/2011 | Aitchison et al. |
| 2011/0274967 A1 | 11/2011 | Suzuki |
| 2012/0154979 A1 | 6/2012 | Signorelli et al. |
| 2012/0156528 A1 | 6/2012 | Cooley |
| 2012/0169298 A1 | 7/2012 | Martin |
| 2012/0268074 A1 | 10/2012 | Kdooley et al. |
| 2012/0313586 A1 | 12/2012 | Signorelli et al. |
| 2013/0026978 A1 | 1/2013 | Kdooley et al. |
| 2013/0029215 A1 | 1/2013 | Signorelli et al. |
| 2013/0033130 A1 | 2/2013 | Nair et al. |
| 2013/0044130 A1 | 2/2013 | Geisner et al. |
| 2013/0044405 A1 | 2/2013 | Brambilla et al. |
| 2013/0045157 A1 | 2/2013 | Brambilla et al. |
| 2013/0141840 A1 | 6/2013 | Cooley et al. |
| 2013/0235509 A1 | 9/2013 | Ruoff et al. |
| 2013/0342962 A1 | 12/2013 | Fletcher et al. |
| 2014/0042988 A1 | 2/2014 | Kuttipillai |
| 2014/0057164 A1 | 2/2014 | Brambilla et al. |
| 2014/0265565 A1 | 9/2014 | Cooley et al. |
| 2014/0265580 A1 | 9/2014 | Cooley et al. |
| 2015/0000118 A1 | 1/2015 | Zhao et al. |
| 2015/0107824 A1 | 4/2015 | Signorelli et al. |
| 2015/0210548 A1 | 7/2015 | Brambilla et al. |
| 2015/0218913 A1 | 8/2015 | Cooley et al. |
| 2015/0279578 A1 | 10/2015 | Martini et al. |
| 2015/0287961 A1 | 10/2015 | Signorelli et al. |
| 2017/0316889 A1 | 11/2017 | Martini et al. |
| 2018/0068803 A1 | 3/2018 | Brambilla et al. |
| 2018/0068804 A1 | 3/2018 | Brambilla et al. |
| 2018/0135408 A1 | 5/2018 | Cooley et al. |
| 2018/0171777 A1 | 6/2018 | Cooley et al. |
| 2018/0204689 A1 | 7/2018 | Brambilla |
| 2018/0211794 A1 | 7/2018 | Brambilla |
| 2020/0020488 A1 | 1/2020 | Martini et al. |

FOREIGN PATENT DOCUMENTS

| | | |
|---|---|---|
| CN | 1538470 A | 10/2004 |
| CN | 1759497 A | 4/2006 |
| CN | 101180691 A | 5/2008 |
| CN | 101221853 A | 7/2008 |
| CN | 101222055 A | 7/2008 |
| CN | 101395748 A | 3/2009 |
| CN | 101600851 A | 12/2009 |
| CN | 103682434 A | 3/2014 |
| EP | 1146527 A2 | 10/2001 |
| EP | 1305502 B1 | 3/2007 |
| EP | 2056312 A1 | 6/2009 |
| JP | 63261811 A | 10/1988 |
| JP | H01220424 A | 9/1989 |
| JP | 05159972 A | 6/1993 |
| JP | 05234814 A | 9/1993 |
| JP | H0864199 A | 3/1996 |
| JP | H09126839 A | 5/1997 |
| JP | 09293490 A | 11/1997 |
| JP | 2000182910 A | 6/2000 |
| JP | 2000200739 A | 7/2000 |
| JP | 2001176923 A | 6/2001 |
| JP | 2002535808 A | 10/2002 |
| JP | 2002367633 A | 12/2002 |
| JP | 2003115422 A | 4/2003 |
| JP | 2003133185 A | 5/2003 |
| JP | 2003173936 A | 6/2003 |
| JP | 2004123653 A | 4/2004 |
| JP | 2004127737 A | 4/2004 |
| JP | 2004127774 A | 4/2004 |
| JP | 2004153101 A | 5/2004 |
| JP | 2004186246 A | 7/2004 |
| JP | 2004221557 A | 8/2004 |
| JP | 2005183443 A | 7/2005 |
| JP | 2006140142 A | 6/2006 |
| JP | 2006186226 A | 7/2006 |
| JP | 2006186227 A | 7/2006 |
| JP | 2007043091 A | 2/2007 |
| JP | 2007049030 A | 2/2007 |
| JP | 2007095983 A | 4/2007 |
| JP | 2007109609 A | 4/2007 |
| JP | 2007131596 A | 5/2007 |
| JP | 2007518905 A | 7/2007 |
| JP | 2007197370 A | 8/2007 |
| JP | 2007250994 A | 9/2007 |
| JP | 2007273149 | 10/2007 |

(56) References Cited

FOREIGN PATENT DOCUMENTS

| | | |
|---|---|---|
| JP | 2008081893 A | 4/2008 |
| JP | 2008088135 A | 4/2008 |
| JP | 2008277401 A | 11/2008 |
| JP | 2009016549 A | 1/2009 |
| JP | 2009158961 A | 7/2009 |
| JP | 2009188003 A | 8/2009 |
| JP | 2009534828 A | 9/2009 |
| JP | 2009224751 A | 10/2009 |
| JP | 2010109355 A | 5/2010 |
| JP | 2010220413 A | 9/2010 |
| JP | 2010245070 A | 10/2010 |
| JP | 2010245071 A | 10/2010 |
| JP | 2011151030 A | 8/2011 |
| JP | 2012074541 A | 4/2012 |
| RU | 98846 U1 | 10/2010 |
| WO | 9407272 A1 | 3/1994 |
| WO | 9606985 A1 | 3/1996 |
| WO | 9966985 A1 | 12/1999 |
| WO | 0042674 | 7/2000 |
| WO | 2004082059 A1 | 9/2004 |
| WO | 2005101432 A1 | 10/2005 |
| WO | 2007055392 A1 | 5/2007 |
| WO | 2007101303 A1 | 9/2007 |
| WO | 2008016990 A2 | 2/2008 |
| WO | 2008085946 A2 | 7/2008 |
| WO | 2009137508 A1 | 11/2009 |
| WO | 2010150534 A1 | 12/2010 |
| WO | 2011029006 A2 | 3/2011 |
| WO | 2012041437 A2 | 4/2012 |
| WO | 2014088712 A1 | 6/2012 |
| WO | 2012151618 A1 | 11/2012 |
| WO | 2012162500 A2 | 11/2012 |
| WO | 2013010641 A1 | 1/2013 |
| WO | 2013016145 A1 | 1/2013 |
| WO | 2013126915 A1 | 8/2013 |
| WO | 2014145259 A2 | 9/2014 |
| WO | 2015054432 A1 | 4/2015 |
| WO | 2015102716 A2 | 7/2015 |
| WO | 2015171528 A1 | 11/2015 |

OTHER PUBLICATIONS

[No Author Listed], Principles of Automobile Engines. The Peoples Transportation Press. Oct. 2007:260.
An et al., "Electrochemical Properties of High-Power Supercapacitors Using Single-Walled Carbon Nanotube Electrodes," Adv. Funct. Mater., Oct. 2001, 387-392, vol. 11, No. 5.
An, et al., "Supercapacitors Using Single-Walled Carbon Nanotube Electrodes", Advanced Materials, Apr. 2001, pp. 497-500, vol. 13, No. 7.
Awad, et al., "Thermal degradation studies of alkyl-imidazolium salts and their application in nanocomposites," Thermochimica Acta, pp. 3-11, 2004, vol. 409.
Balducci, et al., "High temperature carbon-carbon supercapacitor using ionic liquid as electrolyte," J. Power Sources, pp. 922-927, Jan. 3, 2007, vol. 165.
Borges et al., Supercapacitor Operating At 200 Degrees Celsius. Scientific Reports. 2013;3:2572. 6 pages.
Borra et al., Deposition of metal films on an ionic liquid as a basis for a lunar telescope. Jun. 2007;447:979-81.
Brandon et al., Low-Temperature Supercapacitors. NASA Tech Briefs. Jul. 2008:11-12.
Courtney et al., Ionic Liquid Ion Souice Emitter Arrays Fabricated on Bulk Porous Substrates for Spacecraft Propulsion. MIT Doctoral Thesis. Jun. 2011. 334 pages.
Dahi et al., Polyimide/ionic liquid composite membranes for fuel cells operating at high temperatures. Electrochimica Acta. Jun. 2014;130:830-40.
Dahi et al., Supported ionic liquid membranes for water and volatile organic compounds separation: Sorption and permeation properties. Journal of Membrane Science. 2014;458:164-78. Epub Feb. 10, 2014.
Diaz et al., Progress in the use of ionic liquids as electrolyte membranes in fuel cells. Journal of Membrane Science. Nov. 2014;469:379-96.
Emmenegger, et al., "Investigation of Electrochemical Double-layer (ECDL) Capacitors Electrodes Based on Carbon Nanotubes and Activated Carbon Materials," J. Of Power Souices, 2003,pp. 321-329, vol. 124.
Extended European Search Report for EP App. No. 12817809.2 dated Jul. 14, 2015.
Extended European Search Report for EP dated Feb. 4, 2015 for EP App. No. 12810706.7.
Farmer et al., The oxidation of alcohols in substituted imidazolium ionic liquids using ruthenium catalysts. Green Chemistry. 2002;4:97-102.
Halber, "Researchers Fired Up Over New Battery", The Tech, Feb. 8, 2006, pp. 1, 5, vol. 50, No. 16.
Hensley, et al., "The evolution of oilfield batteries", Oilfield Review, Autumn 1998, pp. 42-57.
Hua, Diesel Engine Failure Analysis. Coal Industry Press. 1987:217-9.
International Preliminary Report on Patentability for PCT/US2012/045994 dated Jan. 23, 2014.
International Search Report and Written Opinion for PCT/US2012/045994 dated Dec. 26, 2012.
International Search Report and Written Opinion for PCT/US2012/047474 dated Oct. 16, 2012.
Zadi-Najafabadi et al., Extracting the full potential of single-walled carbon nanotubes as durable supercapacitor electrodes operable at 4 V with high power and energy density. Adv Mater. Sep. 15, 2010;22(35):E235-41.
Koch, "Electrochemical Double Layer Capacitors for High Temperature Applications," 14th International Seminar on Double Layer Capacitors and Hybrid Energy Storage Devices, Dec. 6-8, 2004, pp. 33-39.
Koch, "Thermally Robust Capacitors for the Drilling Industry," Report for U.S. Dept. of Energy Grant No. DE-FG02-06ER84598 for the period Jun. 28, 2006 to Mar. 27, 2007. 19 pages.
Liu, et al., "Graphene-Based Supercapacitor with an Ultrahigh Energy Density," Nano Lett., pp. 4863-4868, 2010, vol. 10.
Marincic, "High Temperature Electrochemical Double Layer Capacitors with Reduced Leakage Rate," 14th International Seminar on Double Layer Capacitors and Hybrid Energy Storage Devices, Dec. 6-8, 2004,pp. 310-316.
Maxwell Technologies Application Note, "Maxwell Technologies' Test Procedures for Capacitance, ESR, Leakage Current and Self-Discharge Characterizations of Ultracapacitors," Jul. 2009,pp. 1-10.
Murakami, et al., "Growth Of Vertically Aligned Single-walled Carbon Nanotube Films On Quartz Substrates And Their Optical Anisotropy," Chem. Phys. Lett., 2004, pp. 298-303, vol. 385.
Ngo et al., "Thermal properties of imidazolium ionic liquids," Thermochimica Acta, pp. 97-102, 2000, vol. 357-58.
Nishida, et al., "Physical and electrochemical properties of 1-alkyl-3-nriethylirnidazolium telralluoroborate for electrolyte," J. Fluorine Chem., pp. 135-141, 2003, vol. 120.
Niu, et al., "High Power Electrochemical Capacitors Based on Carbon Nanotube Electrodes," Appl. Phys. Lett., Mar. 17, 1997, pp. 1480-1482, vol. 70, No. 11.
Patterson etal;Low Temp.Elec.for Space&Terrest. Apps.Glen Res. Center.;Power&On-Board Prop.Tech.Div.;NASA Elec.Parts&Pack. Prog.;Down. Oct. 17, 2004<https://nepp.nasa.gov/DocUploads/0265CC84-EEED-41B8-BB3B25CEF641E3E4/NEPP Dec03Video Presentation.pdf>.37pp.
Randstrom, "The influence of air and its components on the cathodic stability of N-butyl-N-methylpyrrolidinium bis(trifluoromethanesulfonyl)imide," Electrochimica Acta, pp. 1837-1842, Aug. 19, 2007, vol. 53.
Robertson, "Realistic applications of CNTs," materialstoday, Oct. 2004, pp. 46-52, vol. 7, No. 10.
Shamsipur etal;Phys.&electro.prop. of ionic liq.1-ethyl-3-methylimidazolium tetrafluoroborate,1-butyl-3-methylimidazolium trifluoromethanesulfonate&1-butyl-1-methylpyrrolidinium bis(trifluoronnethylsulfonypimide,J.Mol.Liq.,vol. 157,Aug. 24, 2010,pp. 43-50.

(56) References Cited

OTHER PUBLICATIONS

Signorelli et al., Electrochemical Double-Layer Capacitors Using Carbon Nanotube Electrode Structures. Proceedings of teh IEEE. Oct. 2009;97(11):1837-47.
Signorelli, et al., "Carbon Nanotube Enhanced Ultracapacitor", MIT Lab. for Electromagnetic and Electronic Systems Sep. 2004, 2 pages.
Signorelli, et al., "Fabrication and Electrochemical Testing of the First Generation Carbon-Nanotube Based Ultracapacitor Cell," 17th International Seminar on Double Layer Capacitors and Hybrid Energy Storage Devices, Dec. 10-12, 2007, pp. 70-78.
Signorelli, et al., "High Density Energy Storage Using a Nanotube-Enhanced Ultracapacitor," 16th International Seminar on Double Layer Capacitors and Hybrid Energy Storage Devices, Dec. 4-6, 2006, pp. 15-21.
Signorelli, et al., "High Potential Vertically Aligned Carbon Nanotubes as EDLC Electrodes," 18th International Seminar on Double Layer Capacitors and Hybrid Energy Storage Devices, Dec. 8-10, 2008, pp. 73-79.
Signorelli, et al., "Nanotube Enhanced Ultracapacitor," 14th International Seminar on Double Layer Capacitors and Hybrid Energy Storage Devices, Dec. 6-8, 2004, pp. 49-61.
Signorelli, et al., "Nanotube Enhanced Ultracapacitor," 15th International Seminar on Double Layer Capacitors and Hybrid Energy Storage Devices, Dec. 5-7, 2005, pp. 158-168.
Ue, et al., "Application of Low-Viscosity Ionic Liquid to the Electrolyte of Double-Layer Capacitors," J. Electrochem. Soc., Feb. 28, 2003,pp. A499-A502, vol. 150, No. 4.
Wongwiriyapan, et al., "Direct Growth of Single-Walled Carbon Nanotube Networks on Alumina Substrate: A novel route to Ultrasensitive Gas Sensor Fabrication", Japanese Journal of Applied Physics, Nov. 9, 2005, pp. 8227-8230, vol. 44, No. 11.
Zhang, Status of patents and Development Trends Report in Various Industries. Intellectual Property Publishing House. Dec. 2009. 117-8.
Zuckerbrod, et al., "How Dry I Am: Optimizing Cell Performance Through Proper Component Drying," 15th International Seminar on Double Layer Capacitors and Hybrid Energy Storage Devices, Dec. 5-7, 2005,pp. 101-110.
Nishino et al.; "Larger capacity capacitor technologies and their materials—Newest trend of electric double layer capacitors and ultracapacitors"; CMC Corporation, 2nd printing; May 26, 2000, pp. 70-71.
Sato et al.; "Application of ionic liquids to electrolytes"; Journal of Textile Science, vol. 61, No. 3; 2005, pp. 75-79.
Sato et al.; "Electrochemical properties of novel ionic liquids for electric double layer capacitor applications" Electrochimica Acta; vol. 49, Issue 21; Sep. 2004, pp. 3603-3611.
Sato; "Electric double-layer capacitors using ionic liquid"; Electrochemistry, vol. 72, No. 10; 2004, pp. 711-715.
[No Author Listed], Oscilla Power, Homepage. Web Printout. Last accessed Feb. 29, 2012 from <http://oscillapower.com/>. 2 pages.
[No Author Listed], Oscilla Power, iMEC Technology. Web Printout. Last accessed Feb. 29, 2012 from <http://oscillapower.com/imec-technology/>.
Extended European Search Report for EP 12796013.6 dated Mar. 24, 2015. 7 pages.
Extended European Search Report for EP App. No. 13751667.0 dated Sep. 21, 2015.
Extended European Search Report for EP App. No. 16812065.7 dated Nov. 7, 2018.
International Preliminary Report on Patentability for PCT/US2012/047474 dated Feb. 6, 2014.
International Preliminary Report on Patentability for PCT/US2013/027697 dated Sep. 4, 2014.
International Preliminary Report on Patentability for PCT/US2014/059971 dated Apr. 21, 2016.
International Preliminary Report on Patentability for PCT/US2016/015237 dated Aug. 10, 2017.
International Search Report and Written Opinion for PCT/US2007/068314 dated Feb. 13, 2008.
International Search REport and Written Opinion for PCT/US2012/039342 dated Dec. 6, 2012.
International Search Report and Written Opinion for PCT/US2012/041438 dated Nov. 19, 2012.
International Search Report and Written Opinion for PCT/US2013/027697 dated Jun. 26, 2013.
International Search Report and Written Opinion for PCT/US2014/059971 dated Jul. 28, 2015.
International Search REport and Written Opinion for PCT/US2016/015237 dated Feb. 2, 2017.
International Search REport for PCT/US2014/029992 dated Oct. 7, 2014.
International Search Report for PCT/US2014/030310 dated Oct. 10, 2014.
Kuznetsov et al., Kondensatory s dvoinym elektricheskim sloem (ionistory): razrabotka i proizvodstvo. Komponenty I Tekhnologii. 2005;6:12-16.
Sato et al., Electrochemical properties of novel ionic liquids for electric double layer capacitor applications. Electrochimica Acta. 2004;49:3603-11. Epub May 8, 2004.
Office Action dated Dec. 11, 2013 for U.S. Appl. No. 12/928,897.
Office Action dated Jul. 16, 2014 for U.S. Appl. No. 12/928,897.
Office Action dated Jun. 18, 2014 for U.S. Appl. No. 13/588,452.
Office Action dated May 29, 2014 for U.S. Appl. No. 13/560,628.
Office Action dated Oct. 15, 2014 for U.S. Appl. No. 13/587,037.
European Extended Search Report for EP Application No. 20179097.9; dated Feb. 19, 2021 (8 pages).
European Extended Search Report for EP Application No. 20188816.1; dated Feb. 26, 2021 (10 pages).
Yuncai; "Report on the Status and Development Trend of Patented Technologies in Various Industries 2008-2009"; China Intellectual Property Society; Intellectual Property Publishing House; Dec. 2009, pp. 117-118.
Electronics group in Comprehensive Technological Research Co, Ltd.; "The present condition and possibilities of electric double layer capacitors"; lines 6-14; Feb. 28, 2009, p. 48.
Jackson et al.; "Functional Electrolytes for Use in Non-aqueous EDLCs"; ECS Transactions, 16(1); Dec. 2008, pp. 139-149.
Maxwell Technologies; Datasheet K2 Series 650 F-3,000 F Ultracapacitors;1015370.1;URL: https://web.archive.org/web/20100331083354/http://www.maxwell.com/ultracapacitors/datasheets/DATASHEET_K2_SERIES_1015370.pdf; Mar. 31, 2010, 7 pages.
Maxwell Technologies; https://web.archive.org/web/20071011090643/http://www.maxwell.com/ultracapacitors/technical-support/detail_asp?iFaq=194&iType=15; Accessed Aug. 22, 2022, 4 pages.
Maxwell Technologies; https://web.archive.org/web/20071011090936/http://www.maxwell.com/ultracapacitors/technical-support/detail.asp?iFaq=203&iType=15; Accessed Aug. 22, 2022, 3 pages.
Maxwell Technologies; https://web.archive.org/web/20071011091958/http://www.maxwell.com/ultracapacitors/technical-support/detail.asp?iFaq=240&iType=15; Accessed Aug. 22, 2022, 5 pages.
Maxwell Technologies; https://web.archive.org/web/20071011092302/http://www.maxwell.com/ultracapacitors/technical-support/detail.asp?iFaq=217&iType=15; Accessed Aug. 22, 2022, 3 pages.

\* cited by examiner

Primary Structures of Cations

UNPURIFIED ELECTROLYTE

PURIFIED ELECTROLYTE

HOUSING WITH EXPOSED INTERNAL SURFACES

HOUSING WITH BARRIER OVER INTERNAL SURFACES

HIGH TEMPERATURE ENERGY STORAGE DEVICE

CROSS REFERENCE TO RELATED APPLICATIONS

The present application is a Continuation Application of Ser. No. 14/131,666, filed Sep. 4, 2014, which is a national stage filing under 35 U.S.C. § 371 of international PCT application No. PCT/US2012/045994, filed Jul. 9, 2012, which claims priority under 35 U.S.C. § 119(e) to U.S. Provisional Application Ser. No. 61/619,203, filed Apr. 2, 2012, U.S. Provisional Application Ser. No. 61/602,713, filed Feb. 24, 2012, U.S. Provisional Application Ser. No. 61/569,010, filed Dec. 9, 2011, U.S. Provisional Application Ser. No. 61/560,888, filed Nov. 17, 2011, U.S. Provisional Application Ser. No. 61/512,090, filed Jul. 27, 2011, and U.S. Provisional Application Ser. No. 61/505,715, filed Jul. 8, 2011, each one of which is incorporated herein by reference in its entirety.

STATEMENT REGARDING FEDERALLY SPONSORED RESEARCH

This invention was made with government support under Grant No. DE-AR0000035 awarded by the U.S. Department of Energy (ARPA-E). The U.S. government has certain rights in the invention.

BACKGROUND OF THE INVENTION

1. Field of the Invention

The invention disclosed herein relates to energy storage cells, and in particular to techniques for providing an electric double-layer capacitor that is operable at high temperatures.

2. Description of the Related Art

Energy storage cells are ubiquitous in our society. While most people recognize an energy storage cell simply as a "battery," other types of cells may be included. For example, recently, ultracapacitors have garnered much attention as a result of their favorable characteristics. In short, many types of energy storage cells are known and in use today.

As a general rule, an energy storage cell includes an energy storage media disposed within a housing (such as a canister). While a metallic canister can provide robust physical protection for the cell, such a canister is typically both electrically and thermally conductive and can react with the energy storage cell. Typically, such reactions increase in rate as ambient temperature increases. The electrochemical or other properties of many canisters can cause poor initial performance and lead to premature degradation of the energy storage cell, especially at elevated temperatures.

In fact, a variety of factors work to degrade performance of energy storage systems at elevated temperatures. Thus, what are needed are methods and apparatus for improving performance of an electric double-layer capacitor at elevated temperatures. Preferably, the methods and apparatus result in improved performance at a minimal cost.

BRIEF SUMMARY OF THE INVENTION

In one embodiment, an ultracapacitor is disclosed. The ultracapacitor includes an energy storage cell immersed in an electrolyte and disposed within an hermetically sealed housing, the cell electrically coupled to a positive contact and a negative contact, wherein the ultracapacitor is configured to output electrical energy at a temperature within a temperature range between about 80 degrees Celsius to about 210 degrees Celsius.

In another embodiment, a method for fabricating an ultracapacitor is provided. The method includes disposing an energy storage cell including energy storage media within a housing; and constructing the ultracapacitor to operate within a temperature range between about 80 degrees Celsius to about 210 degrees Celsius.

In yet another embodiment, a method for fabricating an ultracapacitor is provided. The method includes disposing an energy storage cell including energy storage media within a housing; and filling the housing with electrolyte adapted for operation within a temperature range between about 80 degrees Celsius to about 210 degrees Celsius.

In a further embodiment, an ultracapacitor is disclosed. The ultracapacitor includes an energy storage cell wetted with an electrolyte and disposed within a housing, wherein a level of moisture within the housing is no greater than about 1,000 parts per million (ppm) by combined weight of the storage cell and electrolyte.

In yet a further embodiment, an ultracapacitor is disclosed. The ultracapacitor includes an energy storage cell wetted with an electrolyte and disposed within a housing, wherein a level of halide impurities within the housing is no greater than 1,000 parts per million by combined weight of the storage cell and electrolyte.

In another embodiment, a method for characterizing a contaminant within an ultracapacitor is provided. The method includes breaching a housing of the ultracapacitor to access contents thereof; sampling the contents; and analyzing the sample.

In one embodiment, an ultracapacitor is disclosed. The ultracapacitor exhibits a volumetric leakage current (mA/cc) that is less than about 10 mA/cc while held at a substantially constant temperature within a range of between about 100 degrees Celsius and about 150 degrees Celsius.

In one embodiment, an ultracapacitor is disclosed. The ultracapacitor exhibits a volumetric leakage current of less than about 10 mA/cc while held at a substantially constant temperature within a temperature range of between about 140 degrees Celsius and 180 degrees Celsius.

In one embodiment, an ultracapacitor is disclosed. The ultracapacitor exhibits a volumetric leakage current of less than about 10 mA/cc while held at a substantially constant temperature within a temperature range of between about 170 degrees Celsius and 210 degrees Celsius.

In another embodiment, a method for providing a high temperature rechargeable energy storage device is disclosed. The method includes selecting a high temperature rechargeable energy storage device (HTRESD) that exhibits initial peak power density between 0.01 W/liter and 100 kW/liter and a lifetime of at least 20 hours when exposed to an ambient temperature in a temperature range from about 80 degrees Celsius to about 210 degrees Celsius; and providing the storage device.

In another embodiment, a method for using a high temperature rechargeable energy storage device is disclosed. The method includes obtaining an HTRESD and; at least one of cycling the HTRESD by alternatively charging and discharging the HTRESD at least twice over a duration of 20 hours, and maintaining a voltage across the HTRESD for 20 hours, such that the HTRESD exhibits a peak power density between 0.005 W/liter and 75 kW/liter after 20 hours when operated at an ambient temperature that is in a temperature range of between about 80 degrees Celsius to about 210 degrees Celsius.

In another embodiment, a method for using a high temperature rechargeable energy storage device is disclosed. The method includes obtaining an ultracapacitor and; maintaining a voltage across the ultracapacitor, such that the ultracapacitor will exhibit a peak power density of between about 0.005 W/liter and about 75 kW/liter after 20 hours, wherein the ultracapacitor is exposed to an ambient temperature in a temperature range from about 80 degrees Celsius to about 210 degrees Celsius during the maintaining.

In another embodiment, a method for using an ultracapacitor is disclosed. The method includes obtaining an ultracapacitor that has an electrolyte and two electrodes, each of the electrodes in electrical communication with a current collector, and separated from the other by a separator; wherein one of charging and discharging the ultracapacitor provides for an initial combination of peak power and energy densities in a range from about 0.1 Wh-kW/liter$^2$ to about 100 Wh-kW/liter$^2$, wherein said combination is mathematically a product of the peak power density and the energy density of the ultracapacitor; and wherein the ultracapacitor exhibits a durability period of at least 20 hours when exposed to an ambient temperature in a temperature range from about 80 degrees Celsius to about 210 degrees Celsius, wherein the durability is indicated by a decrease in peak power density of no more than about 50 percent over the period, and wherein the ultracapacitor is configured to charged and discharged at least twice.

BRIEF DESCRIPTION OF THE DRAWINGS

The foregoing and other features and advantages of the invention are apparent from the following detailed description taken in conjunction with the accompanying drawings in which.

DETAILED DESCRIPTION OF THE INVENTION

Disclosed herein is a capacitor that provides users with improved performance in a wide range of temperatures. For example, the capacitor may be operable at temperatures ranging from about as low as minus 40 degrees Celsius to as high as about 210 degrees Celsius. In some embodiments, the capacitor is operable temperatures ranging from about 80 degrees Celsius to as high as about 210 degrees Celsius.

In general, the capacitor includes energy storage media that is adapted for providing high power density and high energy density when compared to prior art devices. The capacitor includes components that are configured for ensuring operation over the temperature range, and includes any one or more of a variety of forms of electrolyte that are likewise rated for the temperature range. The combination of construction, energy storage media and electrolyte result in capabilities to provide robust operation under extreme conditions. To provide some perspective, aspects of an exemplary embodiment are now introduced.

Figure 1:
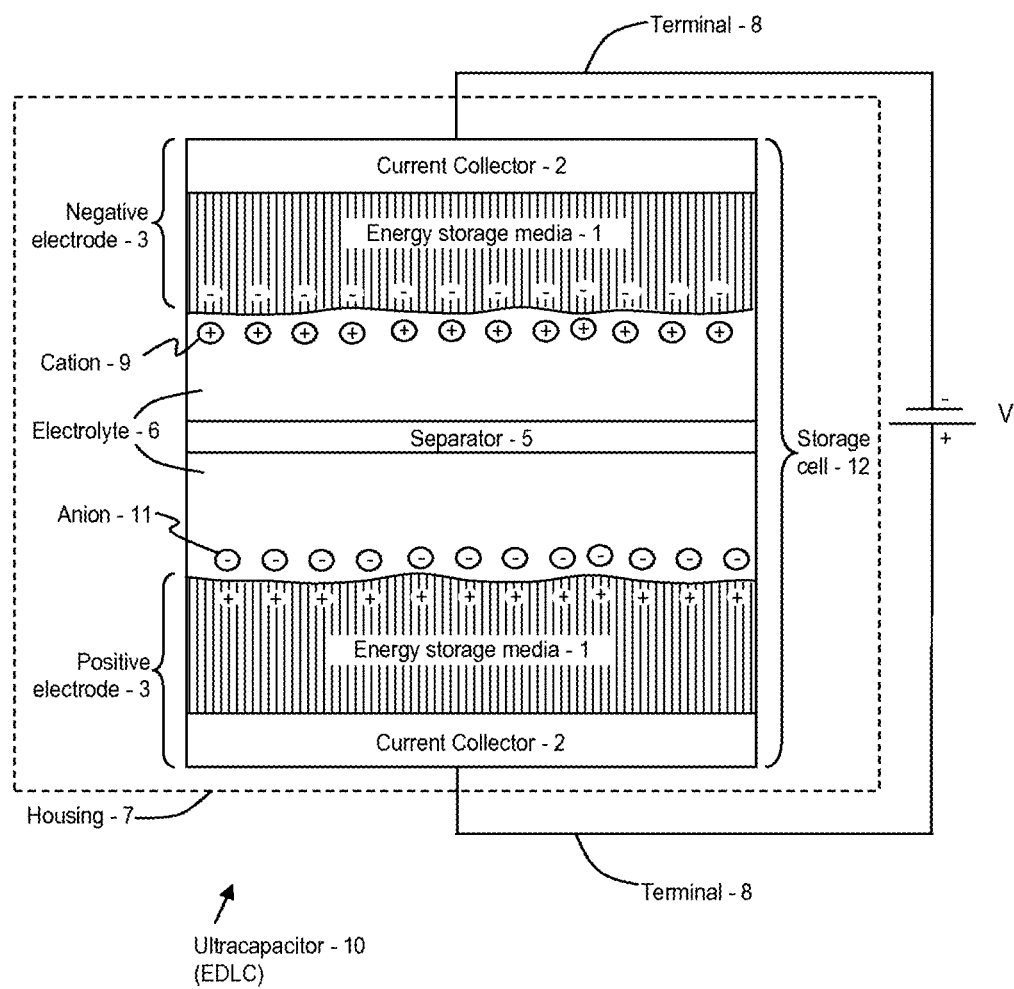
FIG. 1 illustrates aspects of an exemplary ultracapacitor.

As shown in FIG. 1, an exemplary embodiment of a capacitor is shown. In this case, the capacitor is an "ultracapacitor 10." The exemplary ultracapacitor 10 is an electric double-layer capacitor (EDLC). The EDLC includes at least one pair of electrodes 3 (where the electrodes 3 may be referred to as a negative electrode 3 and a positive electrode 3, merely for purposes of referencing herein). When assembled into the ultracapacitor 10, each of the electrodes 3 presents a double layer of charge at an electrolyte interface. In some embodiments, a plurality of electrodes 3 is included (for example, in some embodiments, at least two pairs of electrodes 3 are included). However, for purposes of discussion, only one pair of electrodes 3 are shown. As a matter of convention herein, at least one of the electrodes 3 uses a carbon-based energy storage media 1 (as discussed further herein) to provide energy storage. However, for purposes of discussion herein, it is generally assumed that each of the electrodes includes the carbon-based energy storage media 1. It should be noted that an electrolytic capacitor differs from an ultracapacitor because metallic electrode differ greatly (at least an order of magnitude) in area.

Each of the electrodes 3 includes a respective current collector 2 (also referred to as a "charge collector"). In some embodiments, the electrodes 3 are separated by a separator 5. In general, the separator 5 is a thin structural material (usually a sheet) used to separate the negative electrode 3 from the positive electrode 3. The separator 5 may also serve to separate pairs of the electrodes 3. Once assembled, the electrodes 3 and the separator 5 provide a storage cell 12. Note that, in some embodiments, the carbon-based energy storage media 1 may not be included on one or both of the electrodes 3. That is, in some embodiments, a respective electrode 3 might consist of only the current collector 2. The material used to provide the current collector 2 could be roughened, anodized or the like to increase a surface area thereof. In these embodiments, the current collector 2 alone may serve as the electrode 3. With this in mind, however, as used herein, the term "electrode 3" generally refers to a combination of the energy storage media 1 and the current collector 2 (but this is not limiting, for at least the foregoing reason).

At least one form of electrolyte 6 is included in the ultracapacitor 10. The electrolyte 6 fills void spaces in and between the electrodes 3 and the separator 5. In general, the electrolyte 6 is a substance that disassociates into electrically charged ions. A solvent that dissolves the substance may be included in some embodiments of the electrolyte 6, as appropriate. The electrolyte 6 conducts electricity by ionic transport.

Generally, the storage cell 12 is formed into one of a wound form or prismatic form which is then packaged into a cylindrical or prismatic housing 7. Once the electrolyte 6 has been included, the housing 7 may be hermetically sealed. In various examples, the package is hermetically sealed by techniques making use of laser, ultrasonic, and/or welding technologies. In addition to providing robust physical protection of the storage cell 12, the housing 7 is configured with external contacts to provide electrical communication with respective terminals 8 within the housing 7. Each of the terminals 8, in turn, provides electrical access to energy stored in the energy storage media 1, generally through electrical leads which are coupled to the energy storage media 1.

As discussed herein, "hermetic" refers to a seal whose quality (i.e., leak rate) is defined in units of "atm-cc/second," which means one cubic centimeter of gas (e.g., He) per second at ambient atmospheric pressure and temperature. This is equivalent to an expression in units of "standard He-cc/sec." Further, it is recognized that 1 atm-cc/sec is equal to 1.01325 mbar-liter/sec. Generally, the ultracapacitor 10 disclosed herein is capable of providing a hermetic seal that has a leak rate no greater than about $5.0 \times 10^{-6}$ atm-cc/sec, and may exhibit a leak rate no higher than about $5.0 \times 10^{-10}$ atm-cc/sec. It is also considered that performance of a successfully hermetic seal is to be judged by the user, designer or manufacturer as appropriate, and that "hermetic" ultimately implies a standard that is to be defined by a user, designer, manufacturer or other interested party.

Leak detection may be accomplished, for example, by use of a tracer gas. Using tracer gas such as helium for leak testing is advantageous as it is a dry, fast, accurate and non destructive method. In one example of this technique, the ultracapacitor 10 is placed into an environment of helium. The ultracapacitor 10 is subjected to pressurized helium. The ultracapacitor 10 is then placed into a vacuum chamber that is connected to a detector capable of monitoring helium presence (such as an atomic absorption unit). With knowledge of pressurization time, pressure and internal volume, the leak rate of the ultracapacitor 10 may be determined.

In some embodiments, at least one lead (which may also be referred to herein as a "tab") is electrically coupled to a respective one of the current collectors 2. A plurality of the leads (accordingly to a polarity of the ultracapacitor 10) may be grouped together and coupled to into a respective terminal 8. In turn, the terminal 8 may be coupled to an electrical access, referred to as a "contact" (e.g., one of the housing 7 and an external electrode (also referred to herein for convention as a "feed-through" or "pin")). Reference may be had to FIGS. 28 and 32-34. Consider now the energy storage media 1 in greater detail.

In the exemplary ultracapacitor 10, the energy storage media 1 is formed of carbon nanotubes. The energy storage media 1 may include other carbonaceous materials including, for example, activated carbon, carbon fibers, rayon, graphene, aerogel, carbon cloth, and a plurality of forms of carbon nanotubes. Activated carbon electrodes can be manufactured, for example, by producing a carbon base material by carrying out a first activation treatment to a carbon material obtained by carbonization of a carbon compound, producing a formed body by adding a binder to the carbon base material, carbonizing the formed body, and finally producing an active carbon electrode by carrying out a second activation treatment to the carbonized formed body. Carbon fiber electrodes can be produced, for example, by using paper or cloth pre-form with high surface area carbon fibers.

In an exemplary method for fabricating carbon nanotubes, an apparatus for producing an aligned carbon-nanotube aggregate includes apparatus for synthesizing the aligned carbon-nanotube aggregate on a base material having a catalyst on a surface thereof. The apparatus includes a formation unit that processes a formation step of causing an environment surrounding the catalyst to be an environment of a reducing gas and heating at least either the catalyst or the reducing gas; a growth unit that processes a growth step of synthesizing the aligned carbon-nanotube aggregate by causing the environment surrounding the catalyst to be an environment of a raw material gas and by heating at least either the catalyst or the raw material gas; and a transfer unit that transfers the base material at least from the formation unit to the growth unit. A variety of other methods and apparatus may be employed to provide the aligned carbon-nanotube aggregate.

In some embodiments, material used to form the energy storage media 1 may include material other than pure carbon (and the various forms of carbon as may presently exist or be later devised). That is, various formulations of other materials may be included in the energy storage media 1. More specifically, and as a non-limiting example, at least one binder material may be used in the energy storage media 1, however, this is not to suggest or require addition of other materials (such as the binder material). In general, however, the energy storage media 1 is substantially formed of carbon, and may therefore referred to herein as a "carbonaceous material," as a "carbonaceous layer" and by other similar terms. In short, although formed predominantly of carbon, the energy storage media 1 may include any form of carbon (as well as any additives or impurities as deemed appropriate or acceptable) to provide for desired functionality as energy storage media 1.

In one set of embodiments, the carbonaceous material includes at least about 60% elemental carbon by mass, and in other embodiments at least about 75%, 85%, 90%, 95% or 98% by mass elemental carbon.

Carbonaceous material can include carbon in a variety forms, including carbon black, graphite, and others. The carbonaceous material can include carbon particles, including nanoparticles, such as nanotubes, nanorods, graphene sheets in sheet form, and/or formed into cones, rods, spheres (buckyballs) and the like.

Some embodiments of various forms of carbonaceous material suited for use in energy storage media 1 are provided herein as examples. These embodiments provide robust energy storage and are well suited for use in the electrode 3. It should be noted that these examples are illustrative and are not limiting of embodiments of carbonaceous material suited for use in energy storage media 1.

In general, the term "electrode" refers to an electrical conductor that is used to make contact to another material which is often non-metallic, in a device that may be incorporated into an electrical circuit. Generally, the term "electrode," as used herein, is with reference to the current collector 2 and the additional components as may accompany the current collector 2 (such as the energy storage media 1) to provide for desired functionality (for example, the energy storage media 1 which is mated to the current collector 2 to provide for energy storage and energy transmission). An exemplary process for complimenting the energy storage media 1 with the current collector 2 to provide the electrode 3 is now provided.

Figure 2:
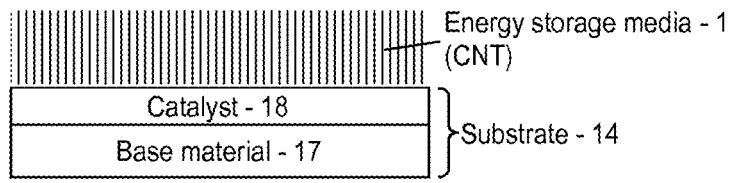
FIG. 2 is a block diagram depicting a plurality of carbon nanotubes (CNT) grown onto a substrate.

Referring now to FIG. 2, a substrate 14 that is host to carbonaceous material in the form of carbon nanotube aggregate (CNT) is shown. In the embodiment shown, the substrate 14 includes a base material 17 with a thin layer of a catalyst 18 disposed thereon.

In general, the substrate 14 is at least somewhat flexible (i.e., the substrate 14 is not brittle), and is fabricated from components that can withstand environments for deposition of the energy storage media 1 (e.g., CNT). For example, the substrate 14 may withstand a high-temperature environment of between about 400 degrees Celsius to about 1,100 degrees Celsius. A variety of materials may be used for the substrate 14, as determined appropriate.

Figure 3:
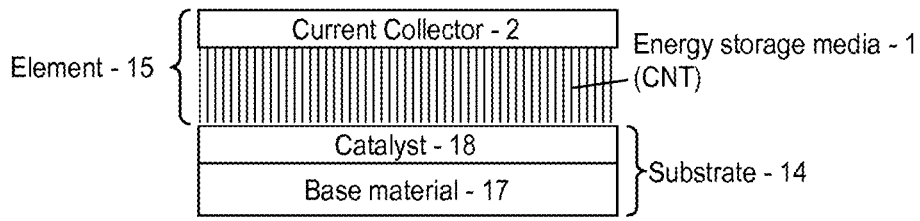
FIG. 3 is a block diagram depicting deposition of a current collector onto the CNT of FIG. 3 to provide an electrode element.

Refer now to FIG. 3. Once the energy storage media 1 (e.g., CNT) has been fabricated on the substrate 14, the current collector 2 may be disposed thereon. In some embodiments, the current collector 2 is between about 0.5 micrometers (µm) to about 25 micrometers (µm) thick. In some embodiments, the the current collector 2 is between about 20 micrometers (µm) to about 40 micrometers (µm) thick. The current collector 2 may appear as a thin layer, such as layer that is applied by chemical vapor deposition (CVD), sputtering, e-beam, thermal evaporation or through another suitable technique. Generally, the current collector 2 is selected for its properties such as conductivity, being electrochemically inert and compatible with the energy storage media 1 (e.g., CNT). Some exemplary materials include aluminum, platinum, gold, tantalum, titanium, and may include other materials as well as various alloys.

Once the current collector 2 is disposed onto the energy storage media 1 (e.g., CNT), an electrode element 15 is realized. Each electrode element 15 may be used individually as the electrode 3, or may be coupled to at least another electrode element 15 to provide for the electrode 3.

Figure 4:
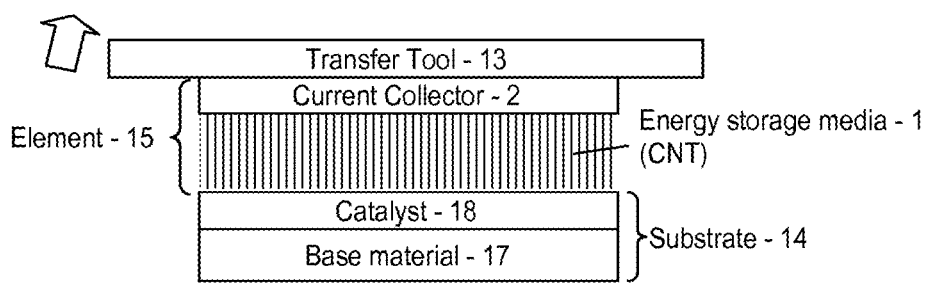
FIG. 4 is a block diagram depicting addition of transfer tape to the electrode element of FIG. 3.

Once the current collector 2 has been fabricated according to a desired standard, post-fabrication treatment may be undertaken. Exemplary post-treatment includes heating and cooling of the energy storage media 1 (e.g., CNT) in a slightly oxidizing environment. Subsequent to fabrication (and optional post-treatment), a transfer tool may be applied to the current collector 2. Reference may be had to FIG. 4.

FIG. 4 illustrates application of transfer tool 13 to the current collector 2. In this example, the transfer tool 13 is a thermal release tape, used in a "dry" transfer method. Exemplary thermal release tape is manufactured by NITTO DENKO CORPORATION of Fremont, Calif. and Osaka, Japan. One suitable transfer tape is marketed as REVALPHA. This release tape may be characterized as an adhesive tape that adheres tightly at room temperature and can be peeled off by heating. This tape, and other suitable embodiments of thermal release tape, will release at a predetermined temperature. Advantageously, the release tape does not leave a chemically active residue on the electrode element 15.

In another process, referred to as a "wet" transfer method, tape designed for chemical release may be used. Once applied, the tape is then removed by immersion in a solvent. The solvent is designed to dissolve the adhesive.

In other embodiments, the transfer tool 13 uses a "pneumatic" method, such as by application of suction to the current collector 2. The suction may be applied, for example, through a slightly oversized paddle having a plurality of perforations for distributing the suction. In another example, the suction is applied through a roller having a plurality of perforations for distributing the suction. Suction driven embodiments offer advantages of being electrically controlled and economic as consumable materials are not used as a part of the transfer process. Other embodiments of the transfer tool 13 may be used.

Figure 5:
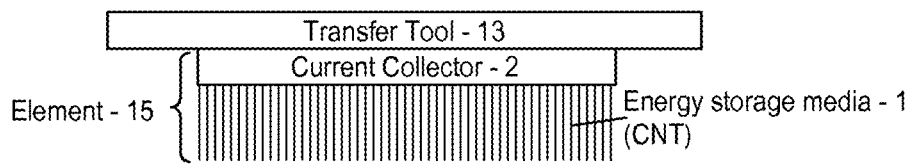
FIG. 5 is a block diagram depicting the electrode element during a transfer process.

Once the transfer tool 13 has been temporarily coupled to the current collector 2, the electrode element 15 is gently removed from the substrate 14 (see FIGS. 4 and 5). The removal generally involves peeling the energy storage media 1 (e.g., CNT) from the substrate 14, beginning at one edge of the substrate 14 and energy storage media 1 (e.g., CNT).

Figure 6:
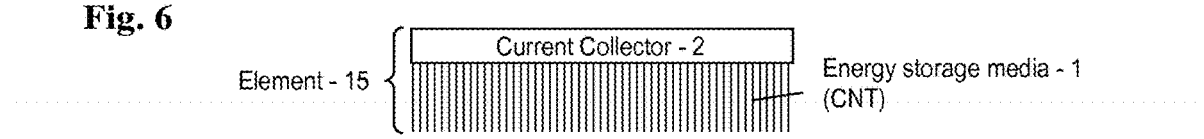
FIG. 6 is a block diagram depicting the electrode element subsequent to transfer.

Subsequently, the transfer tool 13 may be separated from the electrode element 15 (see FIG. 6). In some embodiments, the transfer tool 13 is used to install the electrode element 15. For example, the transfer tool 13 may be used to place the electrode element 15 onto the separator 5. In general, once removed from the substrate 14, the electrode element 15 is available for use.

Figure 7:
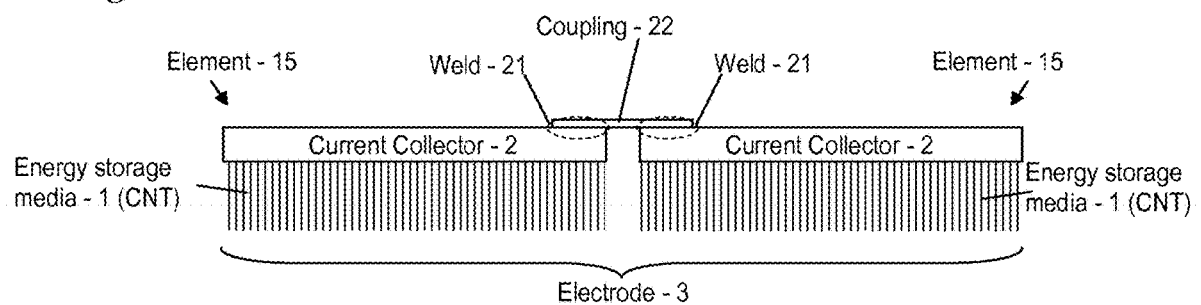
FIG. 7 is a block diagram depicting an exemplary electrode fabricated from a plurality of the electrode elements.

In instances where a large electrode 3 is desired, a plurality of the electrode elements 15 may be mated. Reference may be had to FIG. 7. As shown in FIG. 7, a plurality of the electrode elements 15 may be mated by, for example, coupling a coupling 52 to each electrode element 15 of the plurality of electrode elements 15. The mated electrode elements 15 provide for an embodiment of the electrode 3.

In some embodiments, the coupling 22 is coupled to each of the electrode elements 15 at a weld 21. Each of the welds 21 may be provided as an ultrasonic weld 21. It has been found that ultrasonic welding techniques are particularly well suited to providing each weld 21. That is, in general, the aggregate of energy storage media 1 (e.g., CNT) is not compatible with welding, where only a nominal current collector, such as disclosed herein is employed. As a result, many techniques for joining electrode elements 15 are disruptive, and damage the element 15. However, in other embodiments, other forms of coupling are used, and the coupling 22 is not a weld 21.

The coupling 22 may be a foil, a mesh, a plurality of wires or in other forms. Generally, the coupling 22 is selected for properties such as conductivity and being electrochemically inert. In some embodiments, the coupling 22 is fabricated from the same material(s) as are present in the current collector 2.

In some embodiments, the coupling 22 is prepared by removing an oxide layer thereon. The oxide may be removed by, for example, etching the coupling 22 before providing the weld 21. The etching may be accomplished, for example, with potassium hydroxide (KOH). The electrode 3 may be used in a variety of embodiments of the ultracapacitor 10. For example, the electrode 3 may be rolled up into a "jelly roll" type of energy storage.

The separator 5 may be fabricated from various materials. In some embodiments, the separator 5 is non-woven glass. The separator 5 may also be fabricated from fiberglass, ceramics and flouro-polymers, such as polytetrafluoroethylene (PTFE), commonly marketed as TEFLON™ by DuPont Chemicals of Wilmington, Del. For example, using non-woven glass, the separator 5 can include main fibers and binder fibers each having a fiber diameter smaller than that of each of the main fibers and allowing the main fibers to be bonded together.

For longevity of the ultracapacitor 10 and to assure performance at high temperature, the separator 5 should have a reduced amount of impurities and in particular, a very limited amount of moisture contained therein. In particular, it has been found that a limitation of about 200 ppm of moisture is desired to reduce chemical reactions and improve the lifetime of the ultracapacitor 10, and to provide for good performance in high temperature applications. Some embodiments of materials for use in the separator 5 include polyamide, polytetrafluoroethylene (PTFE), polyetheretherketone (PEEK), aluminum oxide ($Al_2O_3$), fiberglass, and glass-reinforced plastic (GRP).

In general, materials used for the separator 5 are chosed according to moisture content, porosity, melting point, impurity content, resulting electrical performance, thickness, cost, availability and the like. In some embodiments, the separator 5 is formed of hydrophobic materials.

Accordingly, procedures may be employed to ensure excess moisture is eliminated from each separator 5. Among other techniques, a vacuum drying procedure may be used. A selection of materials for use in the separator 5 is provided in Table 1. Some related performance data is provided in Table 2.

TABLE 1

Separator Materials

| Material | Melting point | PPM $H_2O$ unbaked | PPM $H_2O$ baked | Vacuum dry procedure |
|---|---|---|---|---|
| Polyamide | 256° C. | 2052 | 20 | 180° C. for 24 h |
| Polytetrafluoroethylene, PTFE | 327° C. | 286 | 135 | 150° C. for 24 h |
| Polyether ether ketone, PEEK | 256° C. | 130 | 50 | 215° C. for 12 h |
| Aluminum Oxide, $Al_2O_3$ | 330° C. | 1600 | 100 | 215° C. for 24 h |
| Fiberglass (GRP) | 320° C. | 2000 | 167 | 215° C. for 12 h |

TABLE 2

Separator Performance Data

| Material | μm | Porosity | ESR $1^{st}$ test (Ω) | ESR $2^{nd}$ test (Ω) | After 10 CV |
|---|---|---|---|---|---|
| Polyamide | 42 | Nonwoven | 1.069 | 1.069 | 1.213 |
| PEEK | 45 | Mesh | 1.665 | 1.675 | 2.160 |
| PEEK 60% | 25 | 60% | 0.829 | 0.840 | 0.883 |
| Fiberglass (GRP) | 160 | Nonwoven | 0.828 | 0.828 | 0.824 |
| Aluminum Oxide, $Al_2O_3$ | 25 | — | 2.400 | 2.400 | 2.400 |

In order to collect data for Table 2, two electrodes 3, based on carbonaceous material, were provided. The electrodes 3 were disposed opposite to and facing each other. Each of the separators 5 were placed between the electrodes 3 to prevent a short circuit. The three components were then wetted with electrolyte 6 and compressed together. Two aluminum bars and PTFE material was used as an external structure to enclose the resulting ultracapacitor 10.

The ESR $1^{st}$ test and ESR $2^{nd}$ test were performed with the same configuration one after the other. The second test was run five minutes after the first test, leaving time for the electrolyte 6 to further soak into the components.

Note that, in some embodiments, the ultracapacitor 10 does not require or include the separator 5. For example, in some embodiments, such as where the electrodes 3 are assured of physical separation by a geometry of construction, it suffices to have electrolyte 6 alone between the electrodes 3. More specifically, and as an example of physical separation, one such ultracapacitor 10 may include electrodes 3 that are disposed within a housing such that separation is assured on a continuous basis. A bench-top example would include an ultracapacitor 10 provided in a beaker.

The ultracapacitor 10 may be embodied in several different form factors (i.e., exhibit a certain appearance). Examples of potentially useful form factors include, a cylindrical cell, an annular or ring-shaped cell, a flat prismatic cell or a stack of flat prismatic cells comprising a box-like cell, and a flat prismatic cell that is shaped to accommodate a particular geometry such as a curved space. A cylindrical form factor may be most useful in conjunction with a cylindrical tool or a tool mounted in a cylindrical form factor. An annular or ring-shaped form factor may be most useful in conjunction with a tool that is ring-shaped or mounted in a ring-shaped form factor. A flat prismatic cell shaped to accommodate a particular geometry may be useful to make efficient use of "dead space" (i.e., space in a tool or equipment that is otherwise unoccupied, and may be generally inaccessible).

While generally disclosed herein in terms of a "jelly roll" application (i.e., a storage cell 12 that is configured for a cylindrically shaped housing 7), the rolled storage cell 23 may take any form desired. For example, as opposed to rolling the storage cell 12, folding of the storage cell 12 may be performed to provide for the rolled storage cell 23. Other types of assembly may be used. As one example, the storage cell 12 may be a flat cell, referred to as a "coin type" of cell. Accordingly, rolling is merely one option for assembly of the rolled storage cell 23. Therefore, although discussed herein in terms of being a "rolled storage cell 23", this is not limiting. It may be considered that the term "rolled storage cell 23" generally includes any appropriate form of packaging or packing the storage cell 12 to fit well within a given design of the housing 7.

Various forms of the ultracapacitor 10 may be joined together. The various forms may be joined using known techniques, such as welding contacts together, by use of at least one mechanical connector, by placing contacts in electrical contact with each other and the like. A plurality of the ultracapacitors 10 may be electrically connected in at least one of a parallel and a series fashion.

Figure 8:
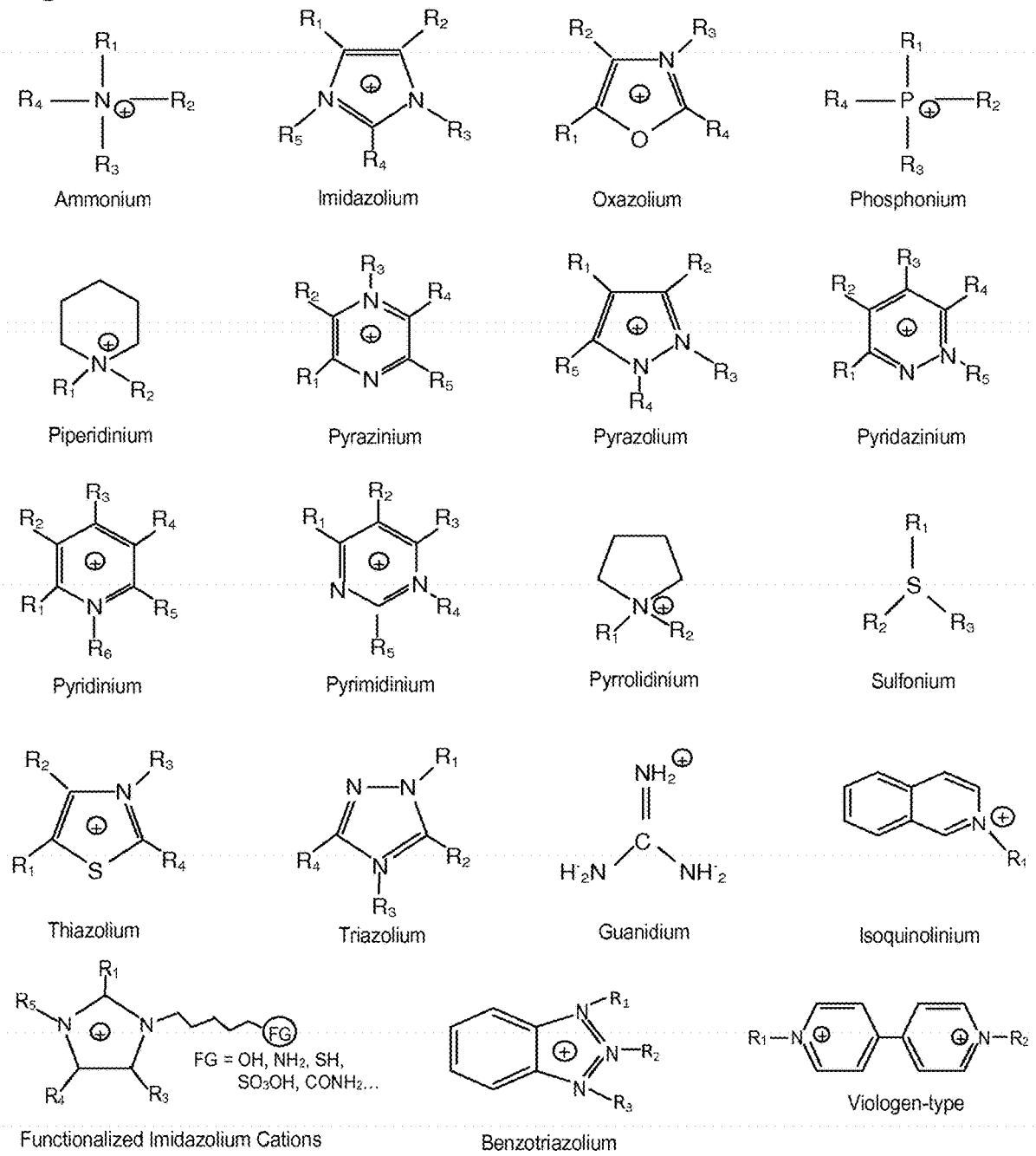
FIG. 8 depicts embodiments of primary structures for cations that may be included in the exemplary ultracapacitor.

The electrolyte 6 includes a pairing of cations 9 and anions 11 and may include a solvent. The electrolyte 6 may be referred to as a "ionic liquid" as appropriate. Various combinations of cations 9, anions 11 and solvent may be used. In the exemplary ultracapacitor 10, the cations 9 may include at least one of 1-(3-Cyanopropyl)-3-methylimidazolium, 1,2-Dimethyl-3-propylimidazolium, 1,3-Bis(3-cyanopropyl)imidazolium, 1,3-Diethoxyimidazolium, 1-Butyl-1-methylpiperidinium, 1-Butyl-2,3-dimethylimidazolium, 1-Butyl-3-methylimidazolium, 1-Butyl-4-methylpyridinium, 1-Butylpyridinium, 1-Decyl-3-methylimidazolium, 1-Ethyl-3-methylimidazolium, 3-Methyl-1-propylpyridinium, and combinations thereof as well as other equivalents as deemed appropriate. Additional exemplary cations 9 include imidazolium, pyrazinium, piperidinium, pyridinium, pyrimidinium, and pyrrolidinium (structures of which are depicted in FIG. 8). In the exemplary ultracapacitor 10, the anions 11 may include at least one of bis(trifluoromethanesulfonate)imide, tris(trifluoromethanesulfonate)methide, dicyanamide, tetrafluoroborate, hexafluorophosphate, trifluoromethanesulfonate, bis(pentafluoroethanesulfonate)imide, thiocyanate, trifluoro(trifluoromethyl)borate, and combinations thereof as well as other equivalents as deemed appropriate.

The solvent may include acetonitrile, amides, benzonitrile, butyrolactone, cyclic ether, dibutyl carbonate, diethyl carbonate, diethylether, dimethoxyethane, dimethyl carbonate, dimethylformamide, dimethylsulfone, dioxane, dioxolane, ethyl formate, ethylene carbonate, ethylmethyl carbonate, lactone, linear ether, methyl formate, methyl propionate, methyltetrahydrofuran, nitrile, nitrobenzene, nitromethane, n-methylpyrrolidone, propylene carbonate, sulfolane, sulfone, tetrahydrofuran, tetramethylene sulfone, thiophene, ethylene glycol, diethylene glycol, triethylene glycol, polyethylene glycols, carbonic acid ester, γ-butyrolactone, nitrile, tricyanohexane, any combination thereof or other material(s) that exhibit appropriate performance characteristics.

Referring now to FIG. 8, there are shown various additional embodiments of cations 9 suited for use in an ionic liquid to provide the electrolyte 6. These cations 9 may be used alone or in combination with each other, in combination with at least some of the foregoing embodiments of cations 9, and may also be used in combination with other cations 9 that are deemed compatible and appropriate by a user, designer, manufacturer or other similarly interested party. The cations 9 depicted in FIG. 8 include, without limitation, ammonium, imidazolium, oxazolium, phosphonium, piperidinium, pyrazinium, pyrazinium, pyridazinium, pyridinium, pyrimidinium, pyrrolidinium, sulfonium, thiazolium, triazolium, guanidium, isoquinolinium, benzotriazolium, viologen-types, and functionalized imidazolium cations.

With regard to the cations 9 shown in FIG. 8, various branch groups ($R_1$, $R_2$, $R_3$, ... $R_x$) are included. In the case of the cations 9, each branch groups ($R_x$) may be one of alkyl, heteroalkyl, alkenyl, heteroalkenyl, alkynyl, heteroalkynyl, halo, amino, nitro, cyano, hydroxyl, sulfate, sulfonate, or a carbonyl group any of which is optionally substituted.

The term "alkyl" is recognized in the art and may include saturated aliphatic groups, including straight-chain alkyl groups, branched-chain alkyl groups, cycloalkyl (alicyclic) groups, alkyl substituted cycloalkyl groups, and cycloalkyl substituted alkyl groups. In certain embodiments, a straight chain or branched chain alkyl has about 20 or fewer carbon atoms in its backbone (e.g., $C_1$-$C_{20}$ for straight chain, $C_1$-$C_{20}$ for branched chain). Likewise, cycloalkyls have from about 3 to about 10 carbon atoms in their ring structure, and alternatively about 5, 6 or 7 carbons in the ring structure. Examples of alkyl groups include, but are not limited to, methyl, ethyl, propyl, butyl, pentyl, hexyl, ethyl hexyl, cyclopropyl, cyclobutyl, cyclopentyl, cyclohexyl and the like.

The term "heteroalkyl" is recognized in the art and refers to alkyl groups as described herein in which one or more atoms is a heteroatom (e.g., oxygen, nitrogen, sulfur, and the like). For example, alkoxy group (e.g., —OR) is a heteroalkyl group.

The terms "alkenyl" and "alkynyl" are recognized in the art and refer to unsaturated aliphatic groups analogous in length and possible substitution to the alkyls described above, but that contain at least one double or triple bond respectively.

The "heteroalkenyl" and "heteroalkynyl" are recognized in the art and refer to alkenyl and alkynyl alkyl groups as described herein in which one or more atoms is a heteroatom (e.g., oxygen, nitrogen, sulfur, and the like).

Generally, any ion with a negative charge maybe used as the anion 11. The anion 11 selected is generally paired with a large organic cation 9 to form a low temperature melting ionic salt. Room temperature (and lower) melting salts come from mainly large anions 9 with a charge of −1. Salts that melt at even lower temperatures generally are realized with anions 11 with easily delocalized electrons. Anything that will decrease the affinity between ions (distance, delocalization of charge) will subsequently decrease the melting point. Although possible anion formations are virtually infinite, only a subset of these will work in low temperature ionic liquid application. This is a non-limiting overview of possible anion formations for ionic liquids.

Common substitute groups (α) suited for use of the anions 11 provided in Table 3 include: —F$^-$, —Cl$^-$, —Br$^-$, —I$^-$, —OCH$_3^-$, —CN$^-$, —SCN$^-$, —C$_2$H$_3$O$_2^-$, —ClO$^-$, —ClO$_2^-$, —ClO$_3^-$, —ClO$_4^-$, —NCO$^-$, —NCS$^-$, —NCSe$^-$, —NCN$^-$, —OCH(CH$_3$)$_2^-$, —CH$_2$OCH$_3^-$, —COOH$^-$, —OH$^-$, —SOCH$_3^-$, —SO$_2$CH$_3^-$, —SOCH$_3^-$, —SO$_2$CF$_3^-$, —SO$_3$H$^-$, —SO$_3$CF$_3^-$, —O(CF$_3$)$_2$C$_2$(CF$_3$)$_2$O$^-$, —CF$_3^-$, —CHF$_2^-$, —CH$_2$F$^-$, —CH$_3^-$ —NO$_3^-$, —NO$_2^-$, —SO$_3^-$, —SO$_4^{2-}$, —SF$_5^-$, —CB$_{11}$H$_{12}^-$, —CB$_{11}$H$_6$C$_{16}^-$, —CH$_3$CB$_{11}$H$_{11}^-$, —C$_2$H$_5$CB$_{11}$H$_{11}^-$, -A-PO$_4^-$, -A-SO$_2^-$, A—SO$_3^-$, -A-SO$_3$H$^-$, -A-COO$^-$, -A-CO$^-$ {where A is a phenyl (the phenyl group or phenyl ring is a cyclic group of atoms with the formula $C_6H_5$) or substituted phenyl, alkyl, (a radical that has the general formula $CnH_{2n+1}$, formed by removing a hydrogen atom from an alkane) or substituted alkyl group, negatively charged radical alkanes, (alkane are chemical compounds that consist only of hydrogen and carbon atoms and are bonded exclusively by single bonds) halogenated alkanes and ethers (which are a class of organic compounds that contain an oxygen atom connected to two alkyl or aryl groups).

With regard to anions 11 suited for use in an ionic liquid that provides the electrolyte 6, various organic anions 11 may be used. Exemplary anions 11 and structures thereof are provided in Table 3. In a first embodiment, (No. 1), exemplary anions 11 are formulated from the list of substitute groups ($\alpha$) provided above, or their equivalent. In additional embodiments, (Nos. 2-5), exemplary anions 11 are formulated from a respective base structure ($Y_2, Y_3, Y_4, \ldots Y_n$) and a respective number of anion substitute groups ($\alpha_1, \alpha_2, \alpha_3, \ldots \alpha_n$), where the respective number of anion substitute groups ($\alpha$) may be selected from the list of substitute ($\alpha$) groups provided above, or their equivalent. Note that in some embodiments, a plurality of anion substitute groups ($\alpha$) (i.e., at least one differing anion substitute group ($\alpha$)) may be used in any one embodiment of the anion 11. Also, note that in some embodiments, the base structure (Y) is a single atom or a designated molecule (as described in Table 3), or may be an equivalent.

More specifically, and by way of example, with regard to the exemplary anions provided in Table 3, certain combinations may be realized. As one example, in the case of No. 2, the base structure ($Y_2$) includes a single structure (e.g., an atom, or a molecule) that is bonded to two anion substitute groups ($\alpha_2$). While shown as having two identical anion substitute groups ($\alpha_2$), this need not be the case. That is, the base structure ($Y_2$) may be bonded to varying anion substitute groups ($\alpha_2$), such as any of the anion substitute groups ($\alpha$) listed above. Similarly, the base structure ($Y_3$) includes a single structure (e.g., an atom) that is bonded to three anion substitute groups ($\alpha_3$), as shown in case No. 3. Again, each of the anion substitute groups ($\alpha$) included in the anion may be varied or diverse, and need not repeat (be repetitive or be symmetric) as shown in Table 3. In general, with regard to the notation in Table 3, a subscript on one of the base structures denotes a number of bonds that the respective base structure may have with anion substitute groups ($\alpha$). That is, the subscript on the respective base structure ($Y_n$) denotes a number of accompanying anion substitute groups ($\alpha_n$) in the respective anion.

TABLE 3

Exemplary Organic Anions for an Ionic Liquid

| No.: | Ion | Guidelines for Anion Structure and Exemplary Ionic Liquids |
|---|---|---|
| 1 | -$\alpha$1 | Some of the above $\alpha$ may mix with organic cations to form an ionic liquid.<br>An exemplary anion: Cl⁻ Exemplary ionic liquid: [BMI*][Cl]<br>*BMI - butyl methyl immadizolium |
| 2 | -$Y_2\alpha_2$ | $Y_2$ may be any of the following: N, O, C=O, S=O.<br>Exemplary anions include: B $(CF_3CO_2)_4$ ⁻$N(SO_2CF_3)_2$⁻<br>Exemplary ionic liquid: [EMI*][NTF₂]<br>*EMI - ethyl methyl immadizolium |
| 3 | -$Y_3\alpha_3$ | $Y_3$ may be any of the following: Be, C, N, O, Mg, Ca, Ba, Ra, Au.<br>Exemplary anions include: -$C(SO_2CF_3)_3$⁻<br>Exemplary ionic liquid: [BMI] $C(SO_2CF_3)_3$⁻ |

TABLE 3-continued

Exemplary Organic Anions for an Ionic Liquid

| No.: | Ion | Guidelines for Anion Structure and Exemplary Ionic Liquids |
|---|---|---|
| 4 | $-Y_4\alpha_4$ | $Y_4$ may be any of the following: B, Al, Ga, Th, In, P.<br>Exemplary anions include: $-BF_4^-$, $-AlCl_4^-$<br>Exemplary ionic liquid: [BMI][$BF_4$] |
| 5 | $-Y_6\alpha_6$ | $Y_6$ can be any of the following: P, S, Sb, As, N, Bi, Nb, Sb.<br>Exemplary anions include: $-P(CF_3)_4F_2^-$, $-AsF_6^-$<br>Exemplary ionic liquid: [BMI][$PF_6$] |

The term "cyano" is given its ordinary meaning in the art and refers to the group, CN. The term "sulfate" is given its ordinary meaning in the art and refers to the group, $SO_2$. The term "sulfonate" is given its ordinary meaning in the art and refers to the group, $SO_3X$, where X may be an electron pair, hydrogen, alkyl or cycloalkyl. The term "carbonyl" is recognized in the art and refers to the group, C=O.

An important aspect for consideration in construction of the ultracapacitor 10 is maintaining good chemical hygiene. In order to assure purity of the components, in various embodiments, the activated carbon, carbon fibers, rayon, carbon cloth, and/or nanotubes making up the energy storage media 1 for the two electrodes 3, are dried at elevated temperature in a vacuum environment. The separator 5 is also dried at elevated temperature in a vacuum environment. Once the electrodes 3 and the separator 5 are dried under vacuum, they are packaged in the housing 7 without a final seal or cap in an atmosphere with less than 50 parts per million (ppm) of water. The uncapped ultracapacitor 10 may be dried, for example, under vacuum over a temperature range of about 100 degrees Celsius to about 300 degrees Celsius. Once this final drying is complete, the electrolyte 6 may be added and the housing 7 is sealed in a relatively dry atmosphere (such as an atmosphere with less than about 50 ppm of moisture). Of course, other methods of assembly may be used, and the foregoing provides merely a few exemplary aspects of assembly of the ultracapacitor 10.

Generally, impurities in the electrolyte 6 are kept to a minimum. For example, in some embodiments, a total concentration of halide ions (chloride, bromide, fluoride, iodide), is kept to below about 1,000 ppm. A total concentration of metallic species (e.g., Br, Cd, Co, Cr, Cu, Fe, K, Li, Mo, Na, Ni, Pb, Zn, including an at least one of an alloy and an oxide thereof), is kept to below about 1,000 ppm. Further, impurities from solvents and precursors used in the synthesis process are kept below about 1,000 ppm and can include, for example, bromoethane, chloroethane, 1-bromobutane, 1-chlorobutane, 1-methylimidazole, ethyl acetate, methylene chloride and so forth.

In some embodiments, the impurity content of the ultracapacitor 10 has been measured using ion selective electrodes and the Karl Fischer titration procedure, which has been applied to electrolyte 6 of the ultracapacitor 10. It has been found that the total halide content in the ultracapacitor 10 according to the teachings herein has been found to be less than about 200 ppm of halides (Cl⁻ and F⁻) and water content is less than about 100 ppm.

One example of a technique for purifying electrolyte is provided in a reference entitled "The oxidation of alcohols in substituted imidazolium ionic liquids using ruthenium catalysts," Farmer and Welton, The Royal Society of Chemistry, 2002, 4, 97-102. An exemplary process is also provided herein.

Impurities can be measured using a variety of techniques, such as, for example, Atomic Absorption Spectrometry (AAS), Inductively Coupled Plasma-Mass Spectometry (ICPMS), or simplified solubilizing and electrochemical sensing of trace heavy metal oxide particulates. AAS is a spectro-analytical procedure for the qualitative and quantitative determination of chemical elements employing the absorption of optical radiation (light) by free atoms in the gaseous state. The technique is used for determining the concentration of a particular element (the analyte) in a sample to be analyzed. AAS can be used to determine over seventy different elements in solution or directly in solid samples. ICPMS is a type of mass spectrometry that is highly sensitive and capable of the determination of a range of metals and several non-metals at concentrations below one part in $10^{12}$ (part per trillion). This technique is based on coupling together an inductively coupled plasma as a method of producing ions (ionization) with a mass spectrometer as a method of separating and detecting the ions. ICPMS is also capable of monitoring isotopic speciation for the ions of choice.

Additional techniques may be used for analysis of impurities. Some of these techniques are particularly advantageous for analyzing impurities in solid samples. Ion Chromatography (IC) may be used for determination of trace levels of halide impurities in the electrolyte 6 (e.g., an ionic liquid). One advantage of Ion Chromatography is that relevant halide species can be measured in a single chromatographic analysis. A Dionex AS9-HC column using an eluent consisting 20 mM NaOH and 10% (v/v) acetonitrile is one example of an apparatus that may be used for the quantification of halides from the ionic liquids. A further technique is that of X-ray fluorescence.

X-ray fluorescence (XRF) instruments may be used to measure halogen content in solid samples. In this technique, the sample to be analyzed is placed in a sample cup and the sample cup is then placed in the analyzer where it is irradiated with X-rays of a specific wavelength. Any halogen atoms in the sample absorb a portion of the X-rays and then reflect radiation at a wavelength that is characteristic for a given halogen. A detector in the instrument then quantifies the amount of radiation coming back from the halogen atoms and measures the intensity of radiation. By knowing the surface area that is exposed, concentration of halogens in the sample can be determined. A further technique for assessing impurities in a solid sample is that of pyrolysis.

Adsoption of impurities may be effectively measured through use of pyrolysis and microcoulometers. Microcoulometers are capable of testing almost any type of material for total chlorine content. As an example, a small amount of sample (less than 10 milligrams) is either injected or placed into a quartz combustion tube where the temperature ranges from about 600 degrees Celsius to about 1,000 degrees Celsius. Pure oxygen is passed through the quartz tube and any chlorine containing components are combusted completely. The resulting combustion products are swept into a titration cell where the chloride ions are trapped in an electrolyte solution. The electrolyte solution contains silver ions that immediately combine with any chloride ions and drop out of solution as insoluble silver chloride. A silver electrode in the titration cell electrically replaces the used up silver ions until the concentration of silver ions is back to where it was before the titration began. By keeping track of the amount of current needed to generate the required amount of silver, the instrument is capable of determining how much chlorine was present in the original sample. Dividing the total amount of chlorine present by the weight of the sample gives the concentration of chlorine that is actually in the sample. Other techniques for assessing impurities may be used.

Surface characterization and water content in the electrode 3 may be examined, for example, by infrared spectroscopy techniques. The four major absorption bands at around 1130, 1560, 3250 and 2300 $cm^{-1}$, correspond to vC=O in, vC=C in aryl, vO–H and vC–N, respectively. By measuring the intensity and peak position, it is possible to quantitatively identify the surface impurities within the electrode 3.

Another technique for identifying impurities in the electrolyte 6 and the ultracapacitor 10 is Raman spectroscopy. This spectroscopic technique relies on inelastic scattering, or Raman scattering, of monochromatic light, usually from a laser in the visible, near infrared, or near ultraviolet range. The laser light interacts with molecular vibrations, phonons or other excitations in the system, resulting in the energy of the laser photons being shifted up or down. Thus, this technique may be used to characterize atoms and molecules within the ultracapacitor 10. A number of variations of Raman spectroscopy are used, and may prove useful in characterizing contents the ultracapacitor 10.

Once the ultracapacitor 10 is fabricated, it may be used in high temperature applications with little or no leakage current and little increase in resistance. The ultracapacitor 10 described herein can operate efficiently at temperatures from about minus 40 degrees Celsius to about 210 degrees Celsius with leakage currents normalized over the volume of the device less than 1 amp per liter (A/L) of volume of the device within the entire operating voltage and temperature range.

By reducing the moisture content in the ultracapacitor 10 (e.g., to less than 500 part per million (ppm) over the weight and volume of the electrolyte and the impurities to less than 1,000 ppm), the ultracapacitor 10 can efficiently operate over the temperature range, with a leakage current (I/L) that is less than 1,000 mAmp per Liter within that temperature range and voltage range.

In one embodiment, leakage current (FL) at a specific temperature is measured by holding the voltage of the ultracapacitor 10 constant at the rated voltage (i.e., the maximum rated operating voltage) for seventy two (72) hours. During this period, the temperature remains relatively constant at the specified temperature. At the end of the measurement interval, the leakage current of the ultracapacitor 10 is measured.

In some embodiments, a maximum voltage rating of the ultracapacitor 10 is about 4 V at room temperature. An approach to ensure performance of the ultracapacitor 10 at elevated temperatures (for example, over 210 degrees Celsius), is to derate (i.e., to reduce) the voltage rating of the ultracapacitor 10. For example, the voltage rating may be adjusted down to about 0.5 V, such that extended durations of operation at higher temperature are achievable.

Another embodiment for ensuring a high degree of purity includes an exemplary process for purifying the electrolyte 6. It should be noted that although the process is presented in terms of specific parameters (such as quantities, formulations, times and the like), that the presentation is merely exemplary and illustrative of the process for purifying electrolyte and is not limiting thereof.

In a first step of the process for purifying electrolyte, the electrolyte 6 (in some embodiments, the ionic liquid) is mixed with deionized water, and then raised to a moderate temperature for some period of time. In a proof of concept, fifty (50) milliliters (ml) of ionic liquid was mixed with eight hundred and fifty (850) milliliters (ml) of the deionized water. The mixture was raised to a constant temperature of sixty (60) degrees Celsius for about twelve (12) hours and subjected to constant stirring (of about one hundred and twenty (120) revolutions per minute (rpm)).

In a second step, the mixture of ionic liquid and deionized water is permitted to partition. In this example, the mixture was transferred via a funnel, and allowed to sit for about four (4) hours.

In a third step, the ionic liquid is collected. In this example, a water phase of the mixture resided on the bottom, with an ionic liquid phase on the top. The ionic liquid phase was transferred into another beaker.

In a fourth step, a solvent was mixed with the ionic liquid. In this example, a volume of about twenty five (25) milliliters (ml) of ethyl acetate was mixed with the ionic liquid. This mixture was again raised to a moderate temperature and stirred for some time.

Although ethyl acetate was used as the solvent, the solvent can be at least one of diethylether, pentone, cyclopentone, hexane, cyclohexane, benzene, toluene, 1-4 dioxane, chloroform or any combination thereof as well as other material(s) that exhibit appropriate performance characteristics. Some of the desired performance characteristics include those of a non-polar solvent as well as a high degree of volatility.

In a fifth step, carbon powder is added to the mixture of the ionic liquid and solvent. In this example, about twenty (20) weight percent (wt %) of carbon (of about a 0.45 micrometer diameter) was added to the mixture.

In a sixth step, the ionic liquid is again mixed. In this example, the mixture with the carbon powder was then subjected to constant stirring (120 rpm) overnight at about seventy (70) degrees Celsius.

In a seventh step, the carbon and the ethyl acetate are separated from the ionic liquid. In this example, the carbon was separated using Buchner filtration with a glass microfiber filter. Multiple filtrations (three) were performed. The ionic liquid collected was then passed through a 0.2 micrometer syringe filter in order to remove substantially all of the carbon particles. In this example, the solvent was then subsequently separated from the ionic liquid by employing rotary evaporation. Specifically, the sample of ionic liquid was stirred while increasing temperature from seventy (70) degrees Celsius to eighty (80) degrees Celsius, and finished at one hundred (100) degrees Celsius. Evaporation was performed for about fifteen (15) minutes at each of the respective temperatures.

The process for purifying electrolyte has proven to be very effective. For the sample ionic liquid, water content was measured by titration, with a titration instrument provided by Mettler-Toledo Inc., of Columbus, Ohio (model No: AQC22). Halide content was measured with an ISE instrument provided by Hanna Instruments of Woonsocket, R.I. (model no. AQC22). The standards solution for the ISE instrument was obtained from Hanna, and included HI 4007-03 (1,000 ppm chloride standard), HI 4010-03 (1,000 ppm fluoride standard) HI 4000-00 (ISA for halide electrodes), and HI 4010-00 (TISAB solution for fluoride electrode only). Prior to performing measurements, the ISE instrument was calibrated with the standards solutions using 0.1, 10, 100 and 1,000 parts per million (ppm) of the standards, mixed in with deionized water. ISA buffer was added to the standard in a 1:50 ratio for measurement of $Cl^-$ ions. Results are shown in Table 4.

TABLE 4

Purification Data for Electrolyte

| Impurity | Before (ppm) | After (ppm) |
|---|---|---|
| $Cl^-$ | 5,300.90 | 769 |
| $F-$ | 75.61 | 10.61 |
| $H_2O$ | 1080 | 20 |

A four step process was used to measure the halide ions. First, $Cl^-$ and $F^-$ ions were measured in the deionized water. Next, a 0.01 M solution of ionic liquid was prepared with deionized water. Subsequently, $Cl^-$ and $F^-$ ions were measured in the solution. Estimation of the halide content was then determined by subtracting the quantity of ions in the water from the quantity of ions in the solution.

As an overview, a method of assembly of a cylindrically shaped ultracapacitor 10 is provided. Beginning with the electrodes 3, each electrode 3 is fabricated once the energy storage media 1 has been associated with the current collector 2. A plurality of leads are then coupled to each electrode 3 at appropriate locations. A plurality of electrodes 3 are then oriented and assembled with an appropriate number of separators 5 therebetween to form the storage cell 12. The storage cell 12 may then be rolled into a cylinder, and may be secured with a wrapper. Generally, respective ones of the leads are then bundled to form each of the terminals 8.

Prior to incorporation of the electrolyte 6 into the ultracapacitor 10 (such as prior to assembly of the storage cell 12, or thereafter) each component of the ultracapacitor 10 may be dried to remove moisture. This may be performed with unassembled components (i.e., an empty housing 7, as well as each of the electrodes 3 and each of the separators 5), and subsequently with assembled components (such as the storage cell 12).

Drying may be performed, for example, at an elevated temperature in a vacuum environment. Once drying has been performed, the storage cell 12 may then be packaged in the housing 7 without a final seal or cap. In some embodiments, the packaging is performed in an atmosphere with less than 50 parts per million (ppm) of water. The uncapped ultracapacitor 10 may then be dried again. For example, the ultracapacitor 10 may be dried under vacuum over a temperature range of about 100 degrees Celsius to about 300 degrees Celsius. Once this final drying is complete, the housing 7 may then be sealed in, for example, an atmosphere with less than 50 ppm of moisture.

In some embodiments, once the drying process (which may also be referred to a "baking" process) has been completed, the environment surrounding the components may be filled with an inert gas. Exemplary gasses include argon, nitrogen, helium, and other gasses exhibiting similar properties (as well as combinations thereof).

Generally, a fill port (a perforation in a surface of the housing 7) is included in the housing 7, or may be later added. Once the ultracapacitor 10 has been filled with electrolyte 6, the fill port may then be closed. Closing the fill port may be completed, for example, by welding material (e.g., a metal that is compatible with the housing 7) into or over the fill port. In some embodiments, the fill port may be temporarily closed prior to filling, such that the ultracapacitor 10 may be moved to another environment, for subsequent re-opening, filling and closure. However, as discussed herein, it is considered that the ultracapacitor 10 is dried and filled in the same environment.

A number of methods may be used to fill the housing 7 with a desired quantity of electrolyte 6. Generally, controlling the fill process may provide for, among other things, increases in capacitance, reductions in equivalent-series-resistance (ESR), and limiting waste of electrolyte 6. A vacuum filling method is provided as a non-limiting example of a techinque for filling the housing 7 and wetting the storage cell 12 with the electrolyte 6.

First, however, note that measures may be taken to ensure that any material that has a potential to contaminate components of the ultracapacitor 10 is clean, compatible and dry. As a matter of convention, it may be considered that "good hygiene" is practiced to ensure assembly processes and components do not introduce contaminants into the ultracapacitor 10. Also, as a matter of convention, it may be considered that a "contaminant" may be defined as any unwanted material that will negatively affect performance of the ultracapacitor 10 if introduced. Also note, that generally herein, contaminants may be assessed as a concentration, such as in parts-per-million (ppm). The concentration may be taken as by weight, volume, sample weight, or in any other manner as determined appropriate.

In the "vacuum method" a container is placed onto the housing 7 around the fill port. A quantity of electrolyte 6 is then placed into the container in an environment that is substantially free of oxygen and water (i.e., moisture). A vacuum is then drawn in the environment, thus pulling any air out of the housing and thus simultaneously drawing the electrolyte 6 into the housing 7. The surrounding environment may then be refilled with inert gas (such as argon, nitrogen, or the like, or some combination of inert gases), if desired. The ultracapacitor 10 may be checked to see if the desired amount of electrolyte 6 has been drawn in. The process may be repeated as necessary until the desired amount of electrolyte 6 is in the ultracapacitor 10.

After filling with electrolyte 6, in some embodiments, material may be fit into the fill port to seal the ultracapacitor 10. The material may be, for example, a metal that is compatible with the housing 7 and the electrolyte 6. In one example, material is force fit into the fill port, essentially performing a "cold weld" of a plug in the fill port. Of course, the force fit may be complimented with other welding techniques as discussed further herein.

In order to show how the fill process effects the ultracapacitor 10, two similar embodiments of the ultracapacitor 10 were built. One was filled without a vacuum, the other was filled under vacuum. Electrical performance of the two embodiments is provided in Table 5. By repeated performance of such measurements, it has been noted that increased performance is realized with by filling the ultracapacitor 10 through applying a vacuum. It has been determined that, in general, is desired that pressure within the housing 7 is reduced to below about 150 mTorr, and more particularly to below about 40 mTorr.

TABLE 5

Comparative Performance for Fill Methods

| Parameter (at 0.1 V) | Without vacuum | With vacuum | Deviation |
| --- | --- | --- | --- |
| ESR @ 45° Φ | 3.569 Ohms | 2.568 Ohms | (−28%) |
| Capacitance @ 12 mHz | 155.87 mF | 182.3 mF | (+14.49%) |
| Phase @ 12 mHz | 79.19 degrees | 83 degrees | (+4.59%) |

In order to evaluate efficacy of vacuum filling techniques, two different pouch cells were tested. The pouch cells included two electrodes 3, each electrode 3 being based on carbonaceous material. Each of the electrodes 3 were placed opposite and facing each other. The separator 5 was disposed between them to prevent short circuit and everything was soaked in electrolyte 6. Two external tabs were used to provide for four measurement points. The separator 5 used was a polyethylene separator 5, and the cell had a total volume of about 0.468 ml.

Figure 9:
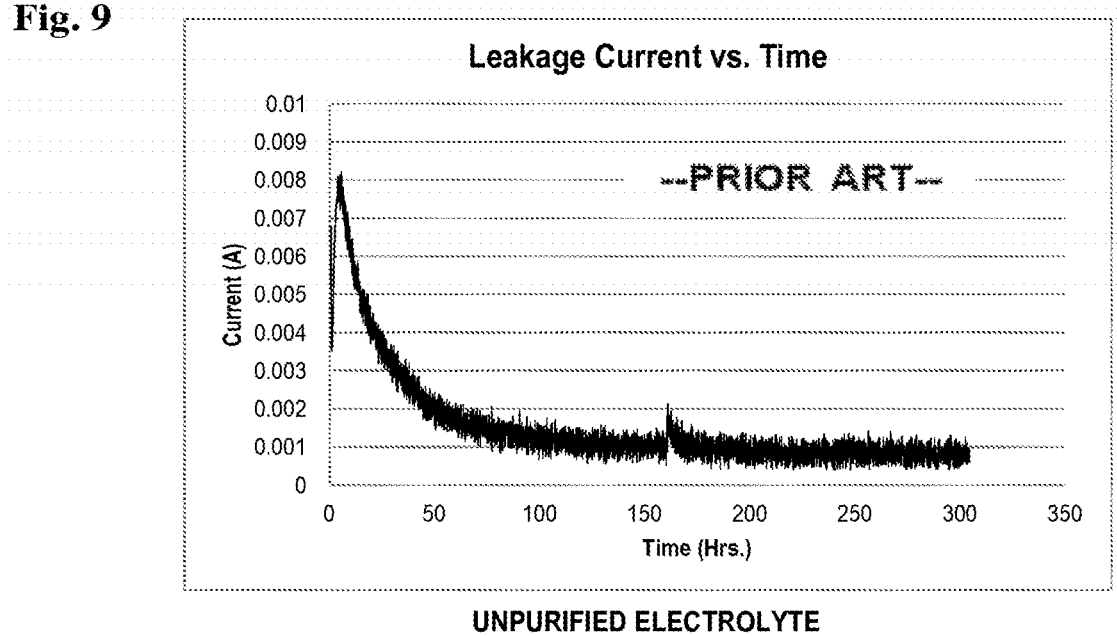
FIGS. 9 and 10 provide comparative data for the exemplary ultracapacitor making use of raw electrolyte and purified electrolyte, respectively.
Figure 10:
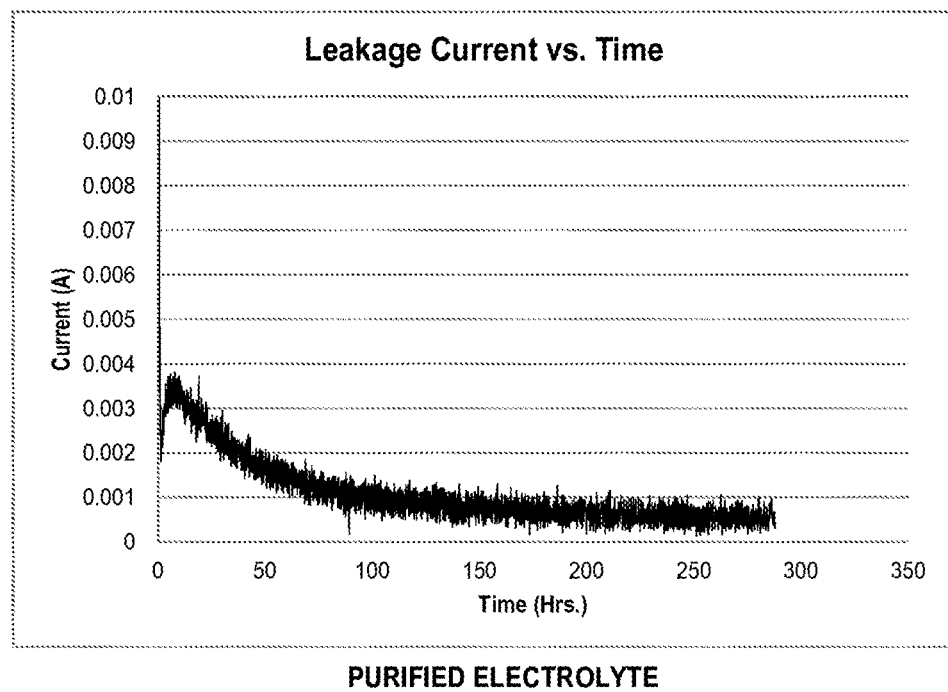

FIG. 9 depicts leakage current for unpurified electrolyte in the ultracapacitor 10. FIG. 10 depicts leakage current for purified electrolyte in a similarly structured ultracapacitor 10. As one can see, there is a substantial decrease in initial leakage current, as well as a decrease in leakage current over the later portion of the measurement interval. More information is provided on the construction of each embodiment in Table 6.

TABLE 6

Test Ultracapacitor Configuration

| Parameter | FIG. 9 | FIG. 10 |
| --- | --- | --- |
| Cell Size: | Open Sub C | Open Sub C |
| Casing: | Coated with PTFE | Coated with PTFE |
| Electrode: | Carbonaceous | Carbonaceous |
| Separator: | Fiberglass | Fiberglass |
| Leads: | 0.005" Aluminum (3 leads) | 0.005" Aluminum (3 leads) |
| Temperature | 150 degrees Celsius | 150 degrees Celsius |
| Electrolyte: | Unpurified | Purified |

Leakage current may be determined in a number of ways. Qualitatively, leakage current may be considered as current drawn into a device, once the device has reached a state of equilibrium. In practice, it is always or almost always necessary to estimate the actual leakage current as a state of equilibrium that may generally only by asymptotically approached. Thus, the leakage current in a given measurement may be approximated by measuring the current drawn into the ultracapacitor 10, while the ultracapacitor 10 is held at a substantially fixed voltage and exposed to a substantially fixed ambient temperature for a relatively long period of time. In some instances, a relatively long period of time may be determined by approximating the current time function as an exponential function, then allowing for several (e.g., about 3 to 5) characteristic time constants to pass. Often, such a duration ranges from about 50 hours to about 100 hours for many ultracapacitor technologies. Alternatively, if such a long period of time is impractical for any reason, the leakage current may simply be extrapolated, again, perhaps, by approximating the current time function as an exponential or any approximating function deemed appropriate. Notably, leakage current will generally depend on ambient temperature. So, in order to characterize performance of a device at a temperature or in a temperature range, it is generally important to expose the device to the ambient temperature of interest when measuring leakage current.

Figure 11:
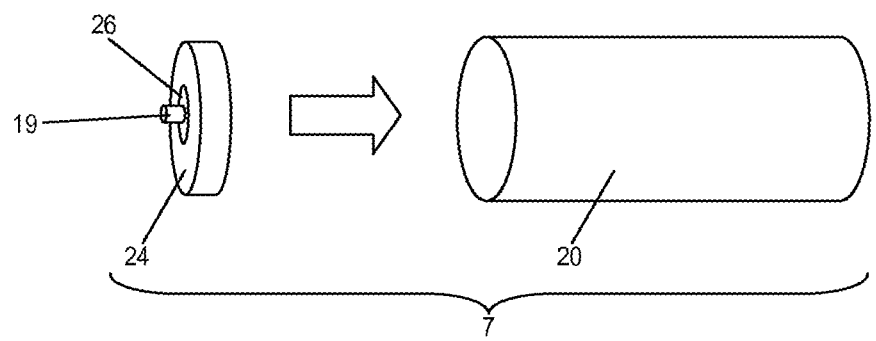
FIG. 11 depicts an embodiment of a housing for the exemplary ultracapacitor.

Refer now to FIG. 11, where aspects of an exemplary housing 7 are shown. Among other things, the housing 7 provides structure and physical protection for the ultracapacitor 10. In this example, the housing 7 includes an annular cylindrically shaped body 20 and a complimentary cap 24. In this embodiment, the cap 24 includes a central portion that has been removed and filled with an electrical insulator 26. A cap feed-through 19 penetrates through the electrical insulator 26 to provide users with access to the stored energy.

Common materials for the housing 7 include stainless steel, aluminum, tantalum, titanium, nickel, copper, tin, various alloys, laminates, and the like. Structural materials, such as some polymer-based materials may be used in the housing 7 (generally in combination with at least some metallic components).

Although this example depicts only one feed-through 19 on the cap 24, it should be recognized that the construction of the housing 7 is not limited by the embodiments discussed herein. For example, the cap 24 may include a plurality of feed-throughs 19. In some embodiments, the body 20 includes a second, similar cap 24 at an opposing end of the annular cylinder. Further, it should be recognized that the housing 7 is not limited to embodiments having an annular cylindrically shaped body 20. For example, the housing 7 may be a clamshell design, a prismatic design, a pouch, or of any other design that is appropriate for the needs of the designer, manufacturer or user.

In this example, the cap 24 is fabricated with an outer diameter that is designed for fitting snugly within an inner diameter of the body 20. When assembled, the cap 24 may be welded into the body 20, thus providing users with a hermetic seal.

Figure 12:
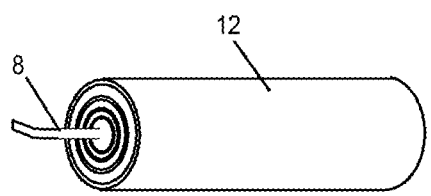
FIG. 12 illustrates an embodiment of a storage cell for the exemplary capacitor.
Figure 15:
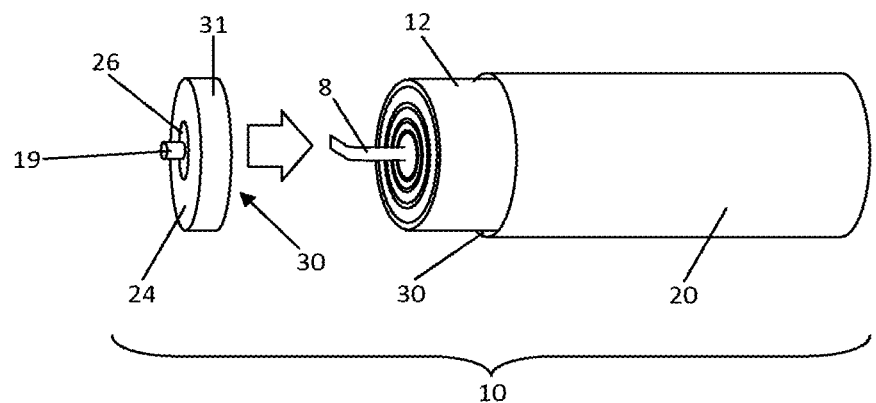
FIG. 15 depicts assembly of the ultracapacitor according to the teachings herein.
Figure 17:
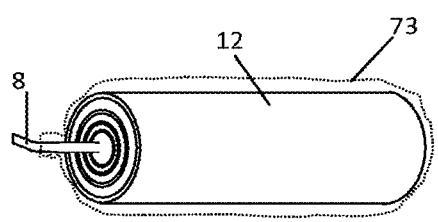
FIG. 17 depicts the barrier disposed about the storage cell as a wrapper.

Referring now to FIG. 12, there is shown an exemplary energy storage cell 12. In this example, the energy storage cell 12 is a "jelly roll" type of energy storage. In these embodiments, the energy storage materials are rolled up into a tight package. A plurality of leads generally form each terminal 8 and provide electrical access to the appropriate layer of the energy storage cell 12. Generally, when assembled, each terminal 8 is electrically coupled to the housing 7 (such as to a respective feed-through 19 and/or directly to the housing 7). The energy storage cell 12 may assume a variety of forms. There are generally at least two plurality of leads (e.g., terminals 8), one for each current collector 2. For simplicity, only one of terminal 8 is shown in FIGS. 12, 15 and 17.

A highly efficient seal of the housing 7 is desired. That is, preventing intrusion of the external environment (such as air, humidity, etc, . . . ) helps to maintain purity of the components of the energy storage cell 12. Further, this prevents leakage of electrolyte 6 from the energy storage cell 12.

Figure 13:
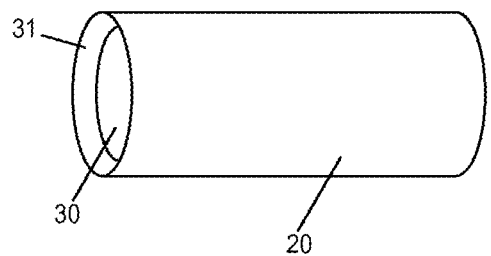
FIG. 13 depicts a barrier disposed on an interior portion of a body of the housing.

Referring now to FIG. 13, the housing 7 may include an inner barrier 30. In some embodiments, the barrier 30 is a coating. In this example, the barrier 30 is formed of polytetrafluoroethylene (PTFE). Polytetrafluoroethylene (PTFE) exhibits various properties that make this composition well suited for the barrier 30. PTFE has a melting point of about 327 degrees Celsius, has excellent dielectric properties, has a coefficient of friction of between about 0.05 to 0.10, which is the third-lowest of any known solid material, has a high corrosion resistance and other beneficial properties. Generally, an interior portion of the cap 24 may include the barrier 30 disposed thereon.

Other materials may be used for the barrier 30. Among these other materials are forms of ceramics (any type of ceramic that may be suitably applied and meet performance criteria), other polymers (preferably, a high temperature polymer) and the like. Exemplary other polymers include perfluoroalkoxy (PFA) and fluorinated ethylene propylene (FEP) as well as ethylene tetrafluoroethylene (ETFE).

The barrier 30 may include any material or combinations of materials that provide for reductions in electrochemical or other types of reactions between the energy storage cell 12 and the housing 7 or components of the housing 7. In some embodiments, the combinations are manifested as homogeneous dispersions of differing materials within a single layer. In other embodiments, the combinations are manifested as differing materials within a plurality of layers. Other combinations may be used. In short, the barrier 30 may be considered as at least one of an electrical insulator and chemically inert (i.e., exhibiting low reactivity) and therefore substantially resists or impedes at least one of electrical and chemical interactions between the storage cell 12 and the housing 7. In some embodiments, the term "low reactivity" and "low chemical reactivity" generally refer to a rate of chemical interaction that is below a level of concern for an interested party.

Figure 14A:
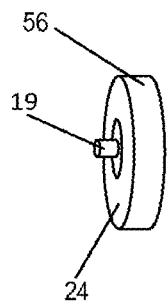
FIGS. 14A and 14B, collectively referred to herein as FIG. 14, depict aspects of a cap for the housing.
Figure 14B:
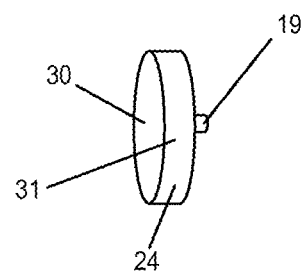

In general, the interior of the housing 7 may be host to the barrier 30 such that all surfaces of the housing 7 which are exposed to the interior are covered. At least one untreated area 31 may be included within the body 20 and on an outer surface 36 of the cap 24 (see FIG. 14A). In some embodiments, untreated areas 31 (see FIG. 14B) may be included to account for assembly requirements, such as areas which will be sealed or connected (such as by welding).

The barrier 30 may be applied to the interior portions using conventional techniques. For example, in the case of PTFE, the barrier 30 may be applied by painting or spraying the barrier 30 onto the interior surface as a coating. A mask may be used as a part of the process to ensure untreated areas 31 retain desired integrity. In short, a variety of techniques may be used to provide the barrier 30.

In an exemplary embodiment, the barrier 30 is about 3 mil to about 5 mil thick, while material used for the barrier 30 is a PFA based material. In this example, surfaces for receiving the material that make up the barrier 30 are prepared with grit blasting, such as with aluminum oxide. Once the surfaces are cleaned, the material is applied, first as a liquid then as a powder. The material is cured by a heat treating process. In some embodiments, the heating cycle is about 10 minutes to about 15 minutes in duration, at temperatures of about 370 degrees Celsius. This results in a continuous finish to the barrier 30 that is substantially free of pin-hole sized or smaller defects. FIG. 15 depicts assembly of an embodiment of the ultracapacitor 10 according to the teachings herein. In this embodiment, the ultracapacitor 10 includes the body 20 that includes the barrier 30 disposed therein, a cap 24 with the barrier 30 disposed therein, and the energy storage cell 12. During assembly, the cap 24 is set over the body 20. A first one of the terminals 8 is electrically coupled to the cap feed-through 19, while a second one of the terminals 8 is electrically coupled to the housing 7, typically at the bottom, on the side or on the cap 24. In some embodiments, the second one of the terminals 8 is coupled to another feed-through 19 (such as of an opposing cap 24).

With the barrier 30 disposed on the interior surface(s) of the housing 7, electrochemical and other reactions between the housing 7 and the electrolyte are greatly reduced or substantially eliminated. This is particularly significant at higher temperatures where a rate of chemical and other reactions is generally increased.

Figure 16A:
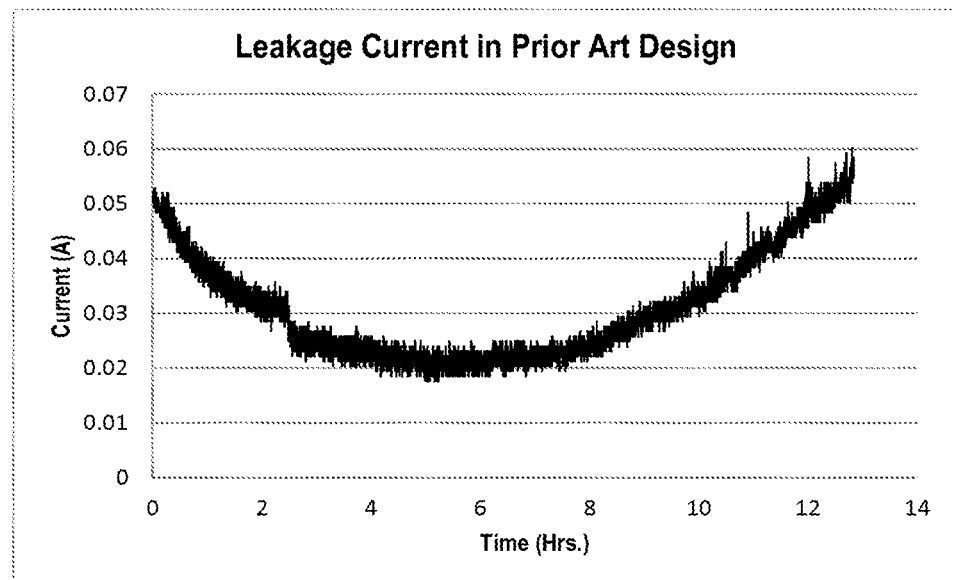
FIGS. 16A and 16B, collectively referred to herein as FIG. 16, are graphs depicting performance for the ultracapacitor for an embodiment without a barrier and a similar embodiment that includes the barrier, respectively.
Figure 16B:
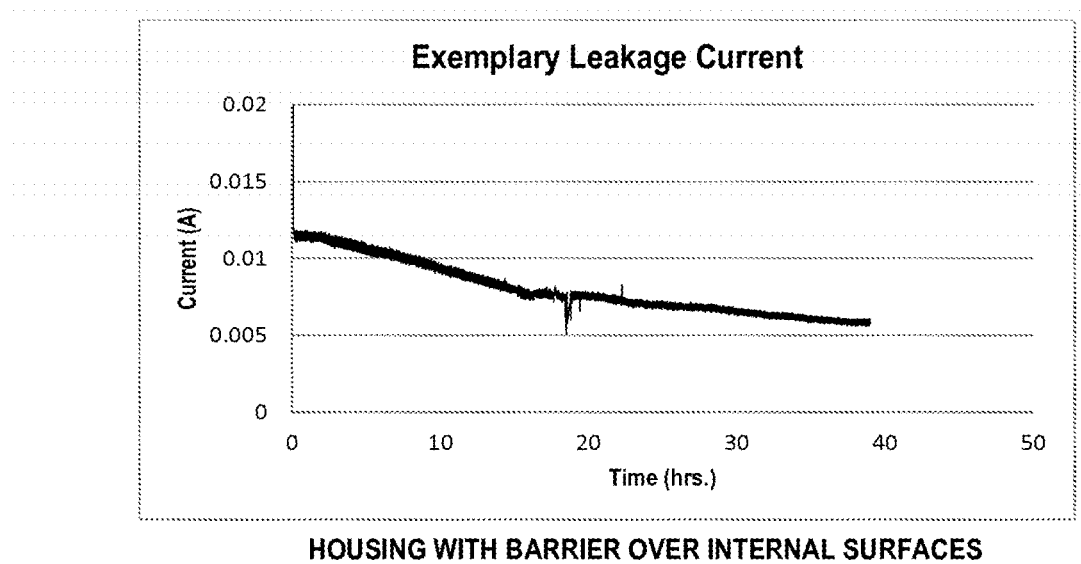

Referring now to FIG. 16, there is shown relative performance of the ultracapacitor 10 in comparison to an otherwise equivalent ultracapacitor. In FIG. 16A, leakage current is shown for a prior art embodiment of the ultracapacitor 10. In FIG. 16B, leakage current is shown for an equivalent ultracapacitor 10 that includes the barrier 30. In FIG. 16B, the ultracapacitor 10 is electrically equivalent to the ultracapacitor whose leakage current is shown in FIG. 16A. In both cases, the housing 7 was stainless steel, and the voltage supplied to the cell was 1.75 Volts, and electrolyte was not purified. Temperature was held a constant 150 degrees Celsius. Notably, the leakage current in FIG. 16B indicates a comparably lower initial value and no substantial increase over time while the leakage current in FIG. 16A indicates a comparably higher initial value as well as a substantial increase over time.

Generally, the barrier 30 provides a suitable thickness of suitable materials between the energy storage cell 12 and the housing 7. The barrier 30 may include a homogeneous mixture, a heterogeneous mixture and/or at least one layer of materials. The barrier 30 may provide complete coverage (i.e., provide coverage over the interior surface area of the housing with the exception of electrode contacts) or partial coverage. In some embodiments, the barrier 30 is formed of multiple components. Consider, for example, the embodiment presented below and illustrated in FIG. 8.

Referring to FIG. 17, aspects of an additional embodiment are shown. In some embodiments, the energy storage cell 12 is deposited within an envelope 33. That is, the energy storage cell 12 has the barrier 30 disposed thereon, wrapped thereover, or otherwise applied to separate the energy storage cell 12 from the housing 7 once assembled. The envelope 33 may be applied well ahead of packaging the energy storage cell 12 into the housing 7. Therefore, use of an envelope 33 may present certain advantages, such as to manufacturers. (Note that the envelope 33 is shown as loosely disposed over the energy storage cell 12 for purposes of illustration).

In some embodiments, the envelope 33 is used in conjunction with the coating, wherein the coating is disposed over at least a portion of the interior surfaces. For example, in one embodiment, the coating is disposed within the interior of the housing 7 only in areas where the envelope 33 may be at least partially compromised (such as be a protruding terminal 8). Together, the envelope 33 and the coating form an efficient barrier 30.

Accordingly, incorporation of the barrier 30 may provide for an ultracapacitor that exhibits leakage current with comparatively low initial values and substantially slower increases in leakage current over time in view of the prior art. Significantly, the leakage current of the ultracapacitor remains at practical (i.e., desirably low) levels when the ultracapacitor is exposed to ambient temperatures for which prior art capacitors would exhibit prohibitively large initial values of leakage current and/or prohibitively rapid increases in leakage current over time.

As a matter of convention, the term "leakage current" generally refers to current drawn by the capacitor which is measured after a given period of time. This measurement is performed when the capacitor terminals are held at a substantially fixed potential difference (terminal voltage). When assessing leakage current, a typical period of time is seventy two (72) hours, although different periods may be used. It is noted that leakage current for prior art capacitors generally increases with increasing volume and surface area of the energy storage media and the attendant increase in the inner surface area of the housing. In general, an increasing leakage current is considered to be indicative of progressively increasing reaction rates within the ultracapacitor 10. Performance requirements for leakage current are generally defined by the environmental conditions prevalent in a particular application. For example, with regard to an ultracapacitor 10 having a volume of 20 mL, a practical limit on leakage current may fall below 100 mA.

Having thus described embodiments of the barrier 30, and various aspects thereof, it should be recognized the ultracapacitor 10 may exhibit other benefits as a result of reduced reaction between the housing 7 and the energy storage media 1. For example, an effective series resistance (ESR) of the ultracapacitor 10 may exhibit comparatively lower values over time. Further, unwanted chemical reactions that take place in a prior art capacitor often create unwanted effects such as out-gassing, or in the case of a hermetically sealed housing, bulging of the housing. In both cases, this leads to a compromise of the structural integrity of the housing and/or hermetic seal of the capacitor. Ultimately, this may lead to leaks or catastrophic failure of the prior art capacitor. In some embodiments, these effects may be substantially reduced or eliminated by the application of a disclosed barrier 30.

It should be recognized that the terms "barrier" and "coating" are not limiting of the teachings herein. That is, any technique for applying the appropriate material to the interior of the housing 7, body 20 and/or cap 24 may be used. For example, in other embodiments, the barrier 30 is actually fabricated into or onto material making up the housing body 20, the material then being worked or shaped as appropriate to form the various components of the housing 7. When considering some of the many possible techniques for applying the barrier 30, it may be equally appropriate to roll on, sputter, sinter, laminate, print, or otherwise apply the material(s). In short, the barrier 30 may be applied using any technique deemed appropriate by a manufacturer, designer and/or user.

Materials used in the barrier 30 may be selected according to properties such as reactivity, dielectric value, melting point, adhesion to materials of the housing 7, coefficient of friction, cost, and other such factors. Combinations of materials (such as layered, mixed, or otherwise combined) may be used to provide for desired properties.

Using an enhanced housing 7, such as one with the barrier 30, may, in some embodiments, limit degradation of the electrolyte 6. While the barrier 30 presents one technique for providing an enhanced housing 7, other techniques may be used. For example, use of a housing 7 fabricated from aluminum would be advantageous, due to the electrochemical properties of aluminum in the presence of electrolyte 6. However, given the difficulties in fabrication of aluminum, it has not been possible (until now) to construct embodiments of the housing 7 that take advantage of aluminum.

Additional embodiments of the housing 7 include those that present aluminum to all interior surfaces, which may be exposed to electrolyte, while providing users with an ability to weld and hermetically seal the housing. Improved performance of the ultracapacitor 10 may be realized through reduced internal corrosion, elimination of problems associated with use of dissimilar metals in a conductive media and for other reasons. Advantageously, the housing 7 makes use of existing technology, such available electrode inserts that include glass-to-metal seals (and may include those fabricated from stainless steel, tantalum or other advantageous materials and components), and therefore is economic to fabricate.

Although disclosed herein as embodiments of the housing 7 that are suited for the ultracapacitor 10, these embodiments (as is the case with the barrier 30) may be used with any type of energy storage deemed appropriate, and may include any type of technology practicable. For example, other forms of energy storage may be used, including electrochemical batteries, in particular, lithium based batteries.

In some embodiments, a material used for construction of the body 20 includes aluminum, which may include any type of aluminum or aluminum alloy deemed appropriate by a designer or fabricator (all of which are broadly referred to herein simply as "aluminum"). Various alloys, laminates, and the like may be disposed over (e.g., clad to) the aluminum (the aluminum being exposed to an interior of the body 20). Additional materials (such as structural materials or electrically insulative materials, such as some polymer-based materials) may be used to compliment the body and/or the housing 7. The materials disposed over the aluminum may likewise be chosen by what is deemed appropriate by a designer or fabricator.

In general, the material(s) exposed to an interior of the housing 7 exhibit adequately low reactivity when exposed to the electrolyte 6, and therefore are merely illustrative of some of the embodiments and are not limiting of the teachings herein.

Although this example depicts only one feed-through 19 on the cap 24, it should be recognized that the construction of the housing 7 is not limited by the embodiments discussed herein. For example, the cap 24 may include a plurality of feed-throughs 19. In some embodiments, the body 20 includes a second, similar cap 24 at the opposing end of the annular cylinder. Further, it should be recognized that the housing 7 is not limited to embodiments having an annular cylindrically shaped body 20. For example, the housing 7 may be a clamshell design, a prismatic design, a pouch, or of any other design that is appropriate for the needs of the designer, manufacturer or user.

A highly efficient seal of the housing 7 is desired. That is, preventing intrusion of the external environment (such as air, humidity, etc, . . . ) helps to maintain purity of the components of the energy storage cell 12. Further, this prevents leakage of electrolyte 6 from the energy storage cell 12.

Figure 18A:
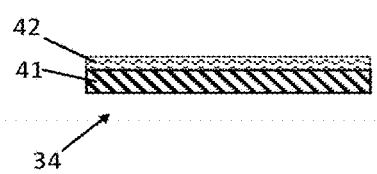
FIGS. 18A, 18B and 18C, collectively referred to herein as FIG. 18, depict embodiments of the cap that include multi-layered materials.

Referring now to FIG. 18, aspects of embodiments of a blank 34 for the cap 24 are shown. In FIG. 18A, the blank 34 includes a multi-layer material. A layer of a first material 41 is aluminum. A layer of a second material 42 is stainless steel. In the embodiments of FIG. 18, the stainless steel is clad onto the aluminum, thus providing for a material that exhibits a desired combination of metallurgical properties. That is, in the embodiments provided herein, the aluminum is exposed to an interior of the energy storage cell (i.e., the housing), while the stainless steel is exposed to exterior. In this manner, advantageous electrical properties of the aluminum are enjoyed, while structural properties (and metallurgical properties, i.e., weldability) of the stainless steel are relied upon for construction. The multi-layer material may include additional layers as deemed appropriate.

As mentioned above, the layer of first material 41 is clad onto (or with) the layer of second material 42. As used herein, the terms "clad," "cladding" and the like refer to the bonding together of dissimilar metals. Cladding is often achieved by extruding two metals through a die as well as pressing or rolling sheets together under high pressure. Other processes, such as laser cladding, may be used. A result is a sheet of material composed of multiple layers, where the multiple layers of material are bonded together such that the material may be worked with as a single sheet (e.g., formed as a single sheet of homogeneous material would be formed).

Figure 18B:
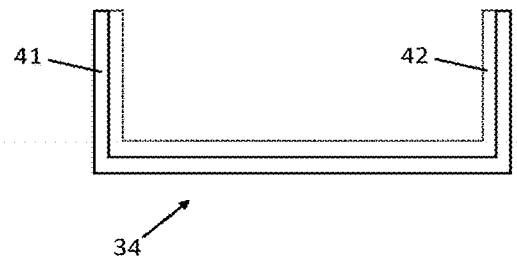
Figure 18C:
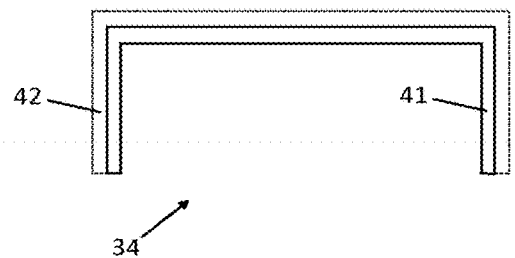

Referring still to FIG. 18A, in one embodiment, a sheet of flat stock (as shown) is used to provide the blank 34 to create a flat cap 24. A portion of the layer of second material 42 may be removed (such as around a circumference of the cap 24) in order to facilitate attachment of the cap 24 to the body 20. In FIG. 18B, another embodiment of the blank 34 is shown. In this example, the blank 34 is provided as a sheet of clad material that is formed into a concave configuration. In FIG. 18C, the blank 34 is provided as a sheet of clad material that is formed into a convex configuration. The cap 24 that is fabricated from the various embodiments of the blank 34 (such as those shown in FIG. 18), are configured to support welding to the body 20 of the housing 7. More specifically, the embodiment of FIG. 18B is adapted for fitting within an inner diameter of the body 20, while the embodiment of FIG. 18C is adapted for fitting over an outer diameter of the body 20. In various alternative embodiments, the layers of clad material within the sheet may be reversed.

When assembled, the cap 24 may be welded to the body 20, thus providing users with a hermetic seal. Exemplary welding techniques include laser welding and TIG welding, and may include other forms of welding as deemed appropriate.

Figure 19:
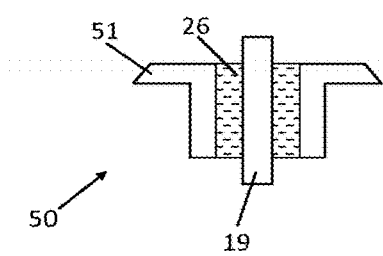
FIG. 19 is a cross-sectional view of an electrode assembly that includes a glass-to-metal seal.

Referring now to FIG. 19, there is shown an embodiment of an electrode assembly 50. The electrode assembly 50 is designed to be installed into the blank 34 and to provide electrical communication from the energy storage media to a user. Generally, the electrode assembly 50 includes a sleeve 51. The sleeve 51 surrounds the insulator 26, which in turn surrounds the feed-through 19. In this example, the sleeve 51 is an annular cylinder with a flanged top portion.

Figure 20:
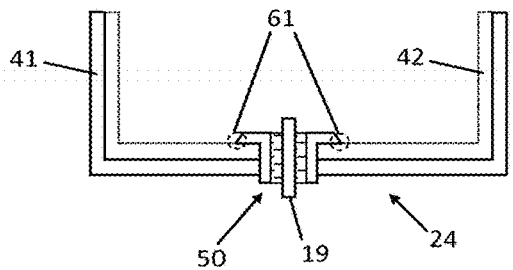
FIG. 20 is a cross-sectional view of the electrode assembly of FIG. 19 installed in the cap of FIG. 18B.

In order to assemble the cap 24, a perforation (not shown) is made in the blank 34. The perforation has a geometry that is sized to match the electrode assembly 50. Accordingly, the electrode assembly 50 is inserted into perforation of the blank 34. Once the electrode assembly 50 is inserted, the electrode assembly 50 may be affixed to the blank 34 through a technique such as welding. The welding may be laser welding which welds about a circumference of the flange of sleeve 51. Referring to FIG. 20, points 61 where welding is performed are shown. In this embodiment, the points 61 provide suitable locations for welding of stainless steel to stainless steel, a relatively simple welding procedure. Accordingly, the teachings herein provide for welding the electrode assembly 50 securely into place on the blank 34.

Material for constructing the sleeve 51 may include various types of metals or metal alloys. Generally, materials for the sleeve 51 are selected according to, for example, structural integrity and bondability (to the blank 34). Exemplary materials for the sleeve 51 include 304 stainless steel or 316 stainless steel. Material for constructing the feed-through 19 may include various types of metals or metal alloys. Generally, materials for the feed-through 19 are selected according to, for example, structural integrity and electrical conductance. Exemplary materials for the electrode include 446 stainless steel or 52 alloy.

Generally, the insulator 26 is bonded to the sleeve 51 and the feed-through 19 through known techniques (i.e., glass-to-metal bonding). Material for constructing the insulator 26 may include, without limitation, various types of glass, including high temperature glass, ceramic glass or ceramic materials. Generally, materials for the insulator are selected according to, for example, structural integrity and electrical resistance (i.e., electrical insulation properties).

Use of components (such as the foregoing embodiment of the electrode assembly 50) that rely on glass-to-metal bonding as well as use of various welding techniques provides for hermetic sealing of the energy storage. Other components may be used to provide hermetic sealing as well. As used herein, the term "hermetic seal" generally refers to a seal that exhibits a leak rate no greater than that which is defined herein. However, it is considered that the actual seal efficacy may perform better than this standard.

Additional or other techniques for coupling the electrode assembly 50 to the blank 34 include use of a bonding agent under the flange of the sleeve 51 (between the flange and the layer of second material 42), when such techniques are considered appropriate.

Figure 21:
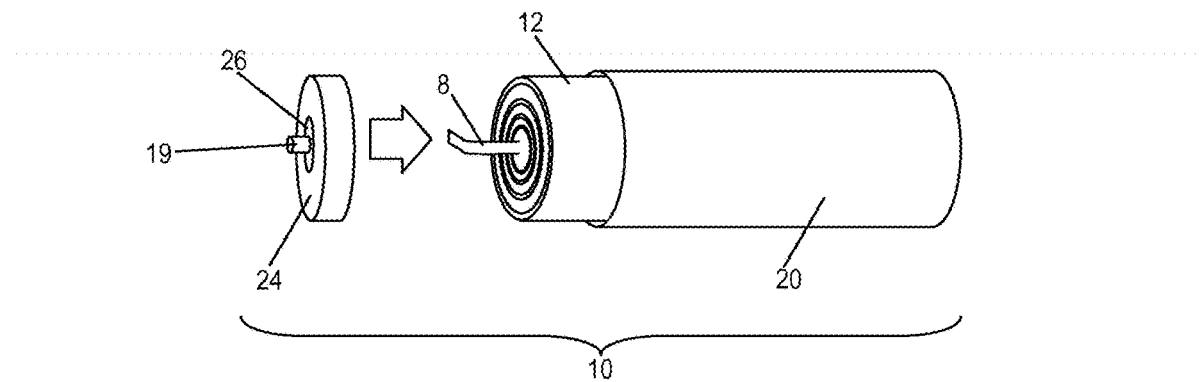
FIG. 21 depicts an arrangement of the energy storage cell in assembly.

Referring now to FIG. 21, the energy storage cell 12 is disposed within the body 20. The at least one terminal 8 is coupled appropriately (such as to the feed-through 19), and the cap 24 is mated with the body 20 to provide for the ultracapacitor 10.

Figure 22A:
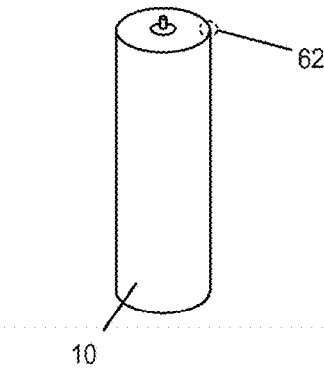
FIGS. 22A, 22B and 22C, collectively referred to herein as FIG. 22, depict embodiments of an assembled energy storage cell.
Figure 22B:
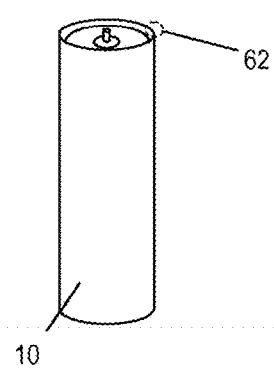

Once assembled, the cap 24 and the body 20 may be sealed. FIG. 22 depicts various embodiments of the assembled energy storage (in this case, the ultracapacitor 10). In FIG. 22A, a flat blank 34 (see FIG. 18A) is used to create a flat cap 24. Once the cap 24 is set on the body 20, the cap 24 and the body 20 are welded to create a seal 62. In this case, as the body 20 is an annular cylinder, the weld proceeds circumferentially about the body 20 and cap 24 to provide the seal 62. In a second embodiment, shown in FIG.

22B, the concave blank 34 (see FIG. 18B) is used to create a concave cap 24. Once the cap 24 is set on the body 20, the cap 24 and the body 20 are welded to create the seal 62. In a third embodiment, shown in FIG. 22C, the convex blank 34 (see FIG. 18C) is used to create a convex cap 24. Once the cap 24 is set on the body 20, the cap 24 and the body 20 may be welded to create the seal 62.

As appropriate, clad material may be removed (by techniques such as, for example, machining or etching, etc, . . . ) to expose other metal in the multi-layer material. Accordingly, in some embodiments, the seal 62 may include an aluminum-to-aluminum weld. The aluminum-to-aluminum weld may be supplemented with other fasteners, as appropriate.

Other techniques may be used to seal the housing 7. For example, laser welding, TIG welding, resistance welding, ultrasonic welding, and other forms of mechanical sealing may be used. It should be noted, however, that in general, traditional forms of mechanical sealing alone are not adequate for providing the robust hermetic seal offered in the ultracapacitor 10.

In some embodiments, the multi-layer material is used for internal components. For example, aluminum may be clad with stainless steel to provide for a multi-layer material in at least one of the terminals 8. In some of these embodiments, a portion of the aluminum may be removed to expose the stainless steel. The exposed stainless steel may then be used to attach the terminal 8 to the feed-through 19 by use of simple welding procedures.

Using the clad material for internal components may call for particular embodiments of the clad material. For example, it may be beneficial to use clad material that include aluminum (bottom layer), stainless steel and/or tantalum (intermediate layer) and aluminum (top layer), which thus limits exposure of stainless steel to the internal environment of the ultracapacitor 10. These embodiments may be augmented by, for example, additional coating with polymeric materials, such as PTFE.

In general, assembly of the housing often involves placing the storage cell 12 within the body 20 and filling the body 20 with the electrolyte 6. A drying process may be performed. Exemplary drying includes heating the body 20 with the storage cell 12 and electrolyte 6 therein, often under a reduced pressure (e.g., a vacuum). Once adequate (optional) drying has been performed, final steps of assembly may be performed. In the final steps, internal electrical connections are made, the cap 24 is installed, and the cap 24 is hermetically sealed to the body 20, by, for example, welding the cap 24 to the body 20.

Accordingly, providing a housing 7 that takes advantage of multi-layered material provides for an energy storage that exhibits leakage current with comparatively low initial values and substantially slower increases in leakage current over time in view of the prior art. Significantly, the leakage current of the energy storage remains at practical (i.e., desirably low) levels when the ultracapacitor 10 is exposed to ambient temperatures for which prior art capacitors would exhibit prohibitively large initial values of leakage current and/or prohibitively rapid increases in leakage current over time.

Additionally, the ultracapacitor 10 may exhibit other benefits as a result of reduced reaction between the housing 7 and the energy storage cell 12. For example, an effective series resistance (ESR) of the energy storage may exhibit comparatively lower values over time. Further, the unwanted chemical reactions that take place in a prior art capacitor often create create unwanted effects such as outgassing, or in the case of a hermetically sealed housing, bulging of the housing 7. In both cases, this leads to a compromise of the structural integrity of the housing 7 and/or hermetic seal of the energy storage. Ultimately, this may lead to leaks or catastrophic failure of the prior art capacitor. These effects may be substantially reduced or eliminated by the application of a disclosed barrier.

Accordingly, users are now provided with a housing 7 for the energy storage, where a substantial portion up to all of the interior surfaces of the housing 7 are aluminum (and may include a non-interfering material, as described below). Thus, problems of internal corrosion are avoided and designers are afforded greater flexibility in selection of appropriate materials for the electrolyte 6.

By use of a multi-layer material (e.g., a clad material), stainless steel may be incorporated into the housing 7, and thus components with glass-to-metal seals may be used. The components may be welded to the stainless steel side of the clad material using techniques such as laser or resistance welding, while the aluminum side of the clad material may be welded to other aluminum parts (e.g., the body 20).

Figure 23:
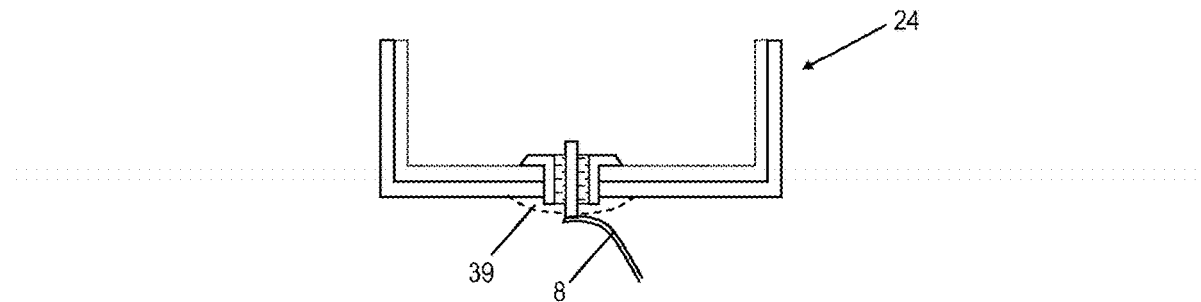
FIG. 23 depicts incorporation of polymeric insulation into the ultracapacitor.

In some embodiments, an insulative polymer may be used to coat parts of the housing 7. In this manner, it is possible to insure that the components of the energy storage are only exposed to acceptable types of metal (such as the aluminum). Exemplary insulative polymer includes PFA, FEP, TFE, and PTFE. Suitable polymers (or other materials) are limited only by the needs of a system designer or fabricator and the properties of the respective materials. Reference may be had to FIG. 23, where a small amount of insulative material 39 is included to limit exposure of electrolyte 6 to the stainless steel of the sleeve 51 and the feed-through 19. In this example, the terminal 8 is coupled to the feed-through 19, such as by welding, and then coated with the insulative material 39.

Figure 24A:
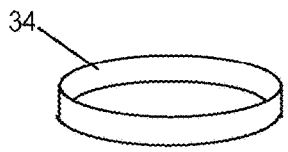
FIGS. 24A, 24B and 24C, collectively referred to herein as FIG. 24, depict aspects of a template for another embodiment of the cap for the energy storage.
Figure 24B:
Figure 24C:
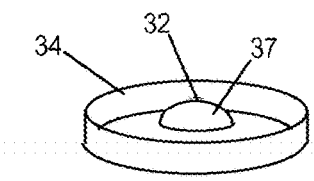

Refer now to FIG. 24 in which aspects of assembly another embodiment of the cap 24 are depicted. FIG. 4A depicts a template (i.e., the blank 34) that is used to provide a body of the cap 24. The template is generally sized to mate with the housing 7 of an appropriate type of energy storage cell (such as the ultracapacitor 10). The cap 24 may be formed by initially providing the template forming the template, including a dome 37 within the template (shown in FIG. 24B) and by then perforating the dome 37 to provide a through-way 32 (shown in FIG. 24C). Of course, the blank 34 (e.g., a circular piece of stock) may be pressed or otherwise fabricated such that the foregoing features are simultaneously provided.

In general, and with regard to these embodiments, the cap may be formed of aluminum, or an alloy thereof. However, the cap may be formed of any material that is deemed suitable by a manufacturer, user, designer and the like. For example, the cap 24 may be fabricated from steel and passivated (i.e., coated with an inert coating) or otherwise prepared for use in the housing 7.

Figure 25:
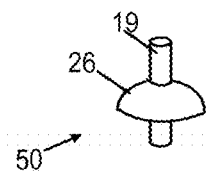
FIG. 25 is a perspective view of an electrode assembly that includes hemispherically shaped material.

Referring now also to FIG. 25, there is shown another embodiment of the electrode assembly 50. In these embodiments, the electrode assembly 50 includes the feed-through 19 and a hemispherically shaped material disposed about the feed-through 19. The hemispherically shaped material serves as the insulator 26, and is generally shaped to conform to the dome 37. The hemispheric insulator 26 may be fabricated of any suitable material for providing a hermetic seal while withstanding the chemical influence of the electrolyte 6. Exemplary materials include PFA (perfluoroalkoxy polymer), FEP (fluorinated ethylene-propylene), PVF (polyvinylfluoride), TFE (tetrafluoroethylene), CTFE (chlorotrifluoroethylene), PCTFE (polychlorotrifluoroethylene), ETFE (polyethylenetetrafluoroethylene), ECTFE (polyethylenechlorotrifluoroethylene), PTFE (polytetrafluoroethylene), another fluoropolymer based material as well as any other material that may exhibit similar properties (in varying degrees) and provide for satisfactory performance (such as by exhibiting, among other things, a high resistance to solvents, acids, and bases at high temperatures, low cost and the like).

The feed-through 19 may be formed of aluminum, or an alloy thereof. However, the feed-through 19 may be formed of any material that is deemed suitable by a manufacturer, user, designer and the like. For example, the feed-through 19 may be fabricated from steel and passivated (i.e., coated with an inert coating, such as silicon) or otherwise prepared for use in the electrode assembly 50. An exemplary technique for passivation includes depositing a coating of hydrogenated amorphous silicon on the surface of the substrate and functionalizing the coated substrate by exposing the substrate to a binding reagent having at least one unsaturated hydrocarbon group under pressure and elevated temperature for an effective length of time. The hydrogenated amorphous silicon coating is deposited by exposing the substrate to silicon hydride gas under pressure and elevated temperature for an effective length of time.

The hemispheric insulator 26 may be sized relative to the dome 37 such that a snug fit (i.e., hermetic seal) is achieved when assembled into the cap 24. The hemispheric insulator 26 need not be perfectly symmetric or of classic hemispheric proportions. That is, the hemispheric insulator 26 is substantially hemispheric, and may include, for example, slight adjustments in proportions, a modest flange (such as at the base) and other features as deemed appropriate. The hemispheric insulator 26 is generally formed of homogeneous material, however, this is not a requirement. For example, the hemispheric insulator 26 may include an air or gas filled torus (not shown) therein to provide for desired expansion or compressability.

Figure 26:
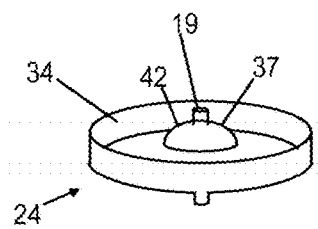
FIG. 26 is a perspective view of a cap including the electrode assembly of FIG. 25 installed in the template of FIG. 24.

As shown in FIG. 26, the electrode assembly 50 may be inserted into the template (i.e., the formed blank 34) to provide for an embodiment of the cap 24 that includes a hemispheric hermetic seal.

Figure 27:
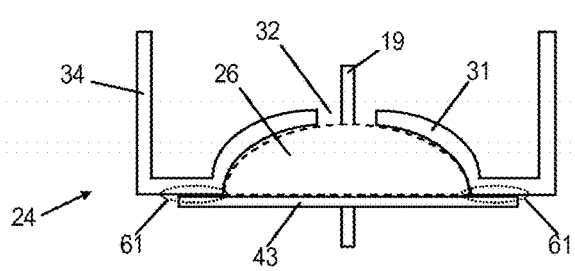
FIG. 27 is a cross-sectional view of the cap of FIG. 26.

As shown in FIG. 27, in various embodiments, a retainer 43 may be bonded or otherwise mated to a bottom of the cap 24 (i.e., a portion of the cap 24 that faces to an interior of the housing 7 and faces the energy storage cell 12). The retainer 43 may be bonded to the cap 24 through various techniques, such as aluminum welding (such as laser, ultrasonic and the like). Other techniques may be used for the bonding, including for example, stamping (i.e., mechanical bonding) and brazing. The bonding may occur, for example, along a perimeter of the retainer 43. Generally, the bonding is provided for in at least one bonding point to create a desired seal 71. At least one fastener, such as a plurality of rivets may be used to seal the insulator 26 within the retainer 43.

Figure 22C:
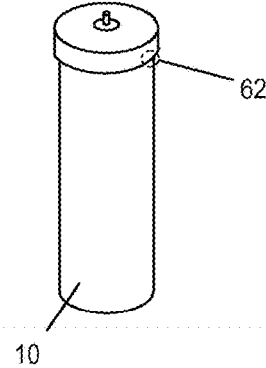

In the example of FIG. 27, the cap 24 is of a concave design (see FIG. 18B). However, other designs may be used. For example, a convex cap 24 may be provided (FIG. 18C), and an over-cap 24 may also be used (a variation of the embodiment of FIG. 18C, which is configured to mount as depicted in FIG. 22C).

In some embodiments, at least one of the housing 7 and the cap 24 include materials that include a plurality of layers. For example, a first layer of material may include aluminum, with a second layer of material being stainless steel. In this example, the stainless steel is clad onto the aluminum, thus providing for a material that exhibits a desired combination of metallurgical properties. That is, in the embodiments provided herein, the aluminum is exposed to an interior of the energy storage cell (i.e., the housing), while the stainless steel is exposed to exterior. In this manner, advantageous electrical properties of the aluminum are enjoyed, while structural properties (and metallurgical properties, i.e., weldability) of the stainless steel are relied upon for construction. The multi-layer material may include additional layers as deemed appropriate. Advantageously, this provides for welding of stainless steel to stainless steel, a relatively simple welding procedure.

The material used for the cap as well as the feed-through 19 may be selected with regard for thermal expansion of the hemispheric insulator 26. Further, manufacturing techniques may also be devised to account for thermal expansion. For example, when assembling the cap 24, a manufacturer may apply pressure to the hemispheric insulator 26, thus at least somewhat compressing the hemispheric insulator 26. In this manner, there at least some thermal expansion of the cap 24 is provided for without jeopardizing efficacy of the hermetic seal.

While material used for construction of the body 20 includes aluminum, any type of aluminum or aluminum alloy deemed appropriate by a designer or fabricator (all of which are broadly referred to herein simply as "aluminum"). Various alloys, laminates, and the like may be disposed over (e.g., clad to) the aluminum (the aluminum being exposed to an interior of the body 20. Additional materials (such as structural materials or electrically insulative materials, such as some polymer-based materials) may be used to compliment the body and/or the housing 7. The materials disposed over the aluminum may likewise be chosen by what is deemed appropriate by a designer or fabricator.

Use of aluminum is not necessary or required. In short, material selection may provide for use of any material deemed appropriate by a designer, fabricator, or user and the like. Considerations may be given to various factors, such as, for example, reduction of electrochemical interaction with the electrolyte 6, structural properties, cost and the like.

Figure 28:
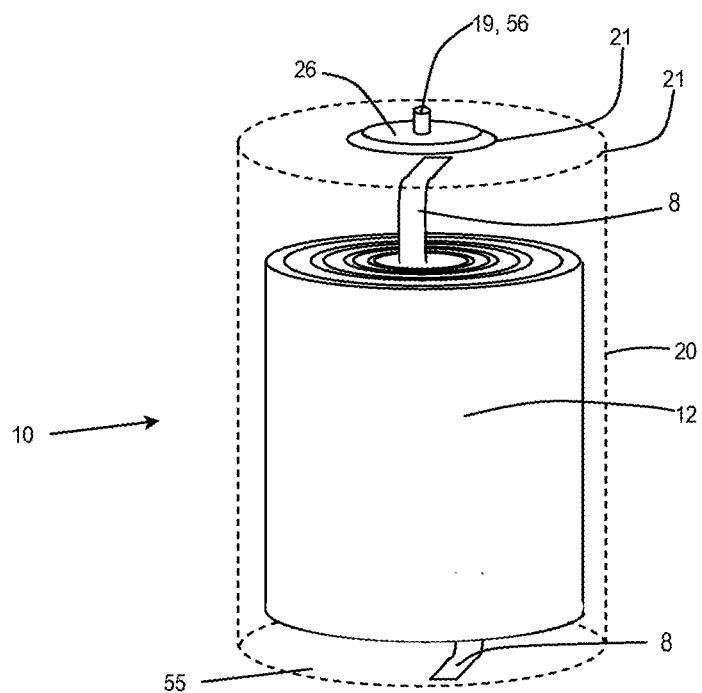
FIG. 28 depicts coupling of the electrode assembly with a terminal of a storage cell.

The storage cell 12 is now discussed in greater detail. Refer to FIG. 28, where a cut-away view of the ultracapacitor 10 is provided. In this example, the storage cell 12 is inserted into and contained within the body 20. Each plurality of leads are bundled together and coupled to the housing 7 as one of the terminals 8. In some embodiments, the plurality of leads are coupled to a bottom of the body 20 (on the interior), thus turning the body 20 into a negative contact 55. Likewise, another plurality of leads are bundled and coupled to the feed-through 19, to provide a positive contact 56. Electrical isolation of the negative contact 55 and the positive contact 56 is preserved by the electrical insulator 26. Generally, coupling of the leads is accomplished through welding, such as at least one of laser and ultrasonic welding. Of course, other techniques may be used as deemed appropriate.

It should be recognized that robust assembly techniques are required to provide a highly efficient energy storage. Accordingly, some of the techniques for assembly are now discussed.

Figure 29:
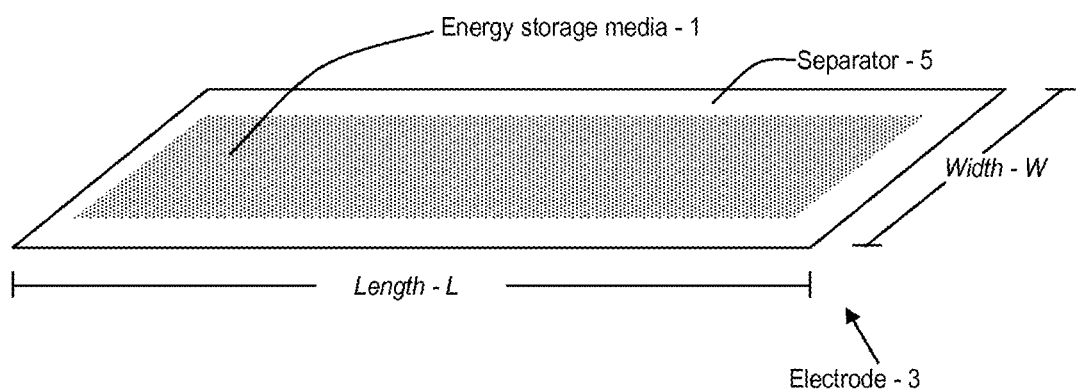
FIG. 29 is a transparent isometric view of the energy storage cell disposed in a cylindrical housing.

Referring now to FIG. 29, components of an exemplary electrode 3 are shown. In this example, the electrode 3 will be used as the negative electrode 3 (however, this designation is arbitrary and merely for referencing).

As may be noted from the illustration, at least in this embodiment, the separator 5 is generally of a longer length and wider width than the energy storage media 1 (and the current collector 2). By using a larger separator 5, protection is provided against short circuiting of the negative electrode 3 with the positive electrode 3. Use of additional material in the separator 5 also provides for better electrical protection of the leads and the terminal 8.

Figure 30:
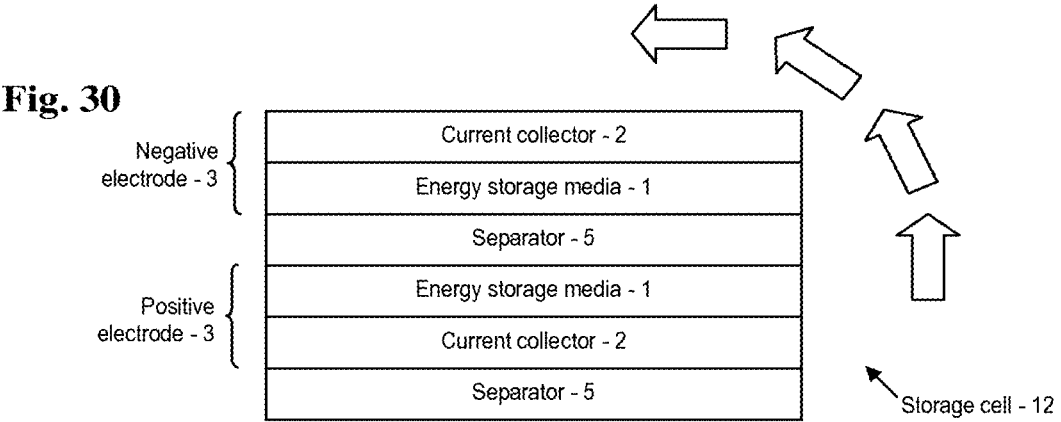
FIG. 30 is a side view of the storage cell, showing the various layers of one embodiment.

Refer now to FIG. 30 which provides a side view of an embodiment of the storage cell 12. In this example, a layered stack of energy storage media 1 includes a first separator 5 and a second separator 5, such that the electrodes 3 are electrically separated when the storage cell 12 is assembled into a rolled storage cell 23. Note that the term "positive" and "negative" with regard to the electrode 3 and assembly of the ultracapacitor 10 is merely arbitrary, and makes reference to functionality when configured in the ultracapacitor 10 and charge is stored therein. This convention, which has been commonly adopted in the art, is not meant to apply that charge is stored prior to assembly, or connote any other aspect other than to provide for physical identification of different electrodes.

Prior to winding the storage cell 12, the negative electrode 3 and the positive electrode 3 are aligned with respect to each other. Alignment of the electrodes 3 gives better performance of the ultracapacitor 10 as a path length for ionic transport is generally minimized when there is a highest degree of alignment. Further, by providing a high degree of alignment, excess separator 5 is not included and efficiency of the ultracapacitor 10 does not suffer as a result.

Figure 31:
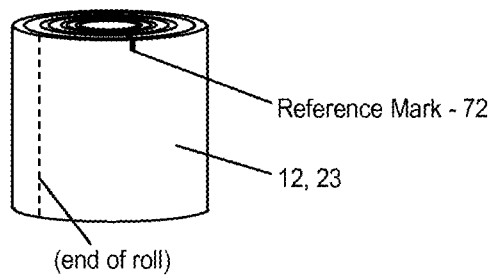
FIG. 31 is an isometric view of a rolled up storage cell which includes a reference mark for placing a plurality of leads.

Referring now also to FIG. 31, there is shown an embodiment of the storage cell 12 wherein the electrodes 3 have been rolled into the rolled storage cell 23. One of the separators 5 is present as an outermost layer of the storage cell 12 and separates energy storage media 1 from an interior of the housing 7.

"Polarity matching" may be employed to match a polarity of the outermost electrode in the rolled storage cell 23 with a polarity of the body 20. For example, in some embodiments, the negative electrode 3 is on the outermost side of the tightly packed package that provides the rolled storage cell 23. In these embodiments, another degree of assurance against short circuiting is provided. That is, where the negative electrode 3 is coupled to the body 20, the negative electrode 3 is the placed as the outermost electrode in the rolled storage cell 23. Accordingly, should the separator 5 fail, such as by mechanical wear induced by vibration of the ultracapacitor 10 during usage, the ultracapacitor 10 will not fail as a result of a short circuit between the the outermost electrode in the rolled storage cell 23 and the body 20.

For each embodiment of the rolled storage cell 23, a reference mark 72 may be in at least the separator 5. The reference mark 72 will be used to provide for locating the leads on each of the electrodes 3. In some embodiments, locating of the leads is provided for by calculation. For example, by taking into account an inner diameter of the jelly roll and an overall thickness for the combined separators 5 and electrodes 3, a location for placement of each of the leads may be estimated. However, practice has shown that it is more efficient and effective to use a reference mark 72. The reference mark 72 may include, for example, a slit in an edge of the separator(s) 5.

Generally, the reference mark 72 is employed for each new specification of the storage cell 12. That is, as a new specification of the storage cell 12 may call for differing thickness of at least one layer therein (over a prior embodiment), use of prior reference marks may be at least somewhat inaccurate.

Figure 32:
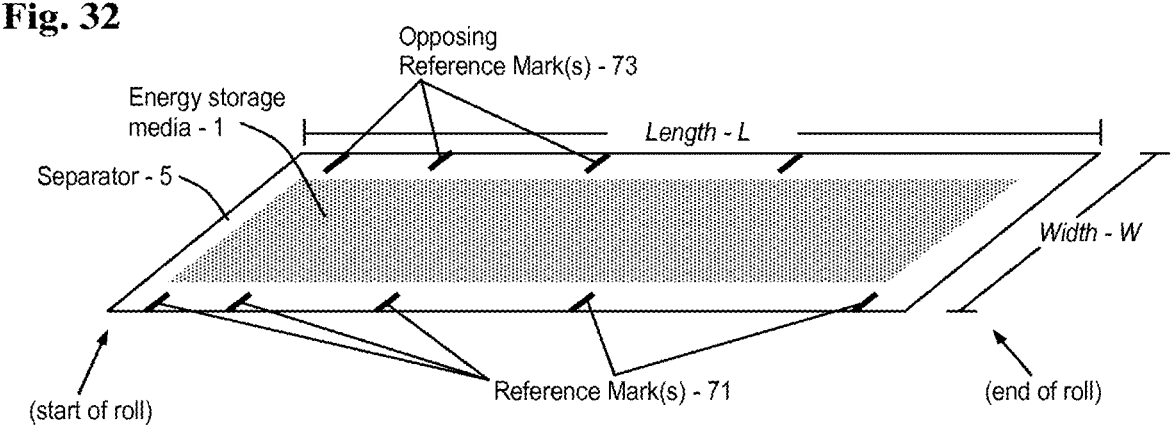
FIG. 32 is an isometric view of the storage cell of FIG. 31 once unrolled.

In general, the reference mark 72 is manifested as a single radial line that traverses the roll from a center thereof to a periphery thereof. Accordingly, when the leads are installed along the reference mark 72, each lead will align with the remaining leads (as shown in FIG. 10). However, when the storage cell 12 is unrolled (for embodiments where the storage cell 12 is or will become a roll), the reference mark 72 may be considered to be a plurality of markings (as shown in FIG. 32). As a matter of convention, regardless of the embodiment or appearance of marking of the storage cell 12, identification of a location for incorporation of the lead is considered to involve determination of a "reference mark 72" or a "set of reference marks 72."

Referring now to FIG. 32, once the reference mark 72 has been established (such as by marking a rolled up storage cell 12), an installation site for installation each of the leads is provided (i.e., described by the reference mark 72). Once each installation site has been identified, for any given build specification of the storage cell 12, the relative location of each installation site may be repeated for additional instances of the particular build of storage cell 12.

Generally, each lead is coupled to a respective current collector 2 in the storage cell 12. In some embodiments, both the current collector 2 and the lead are fabricated from aluminum. Generally, the lead is coupled to the current collector 2 across the width, W however, the lead may be coupled for only a portion of the width, W. The coupling may be accomplished by, for example, ultrasonic welding of the lead to the current collector 2. In order to accomplish the coupling, at least some of the energy storage media 1 may be removed (as appropriate) such that each lead may be appropriately joined with the current collector 2. Other preparations and accommodations may be made, as deemed appropriate, to provide for the coupling.

Of course, opposing reference marks 73 may be included. That is, in the same manner as the reference marks 72 are provided, a set of opposing reference marks 73 may be made to account for installation of leads for the opposing polarity. That is, the reference marks 72 may be used for installing leads to a first electrode 3, such as the negative electrode 3, while the opposing reference marks 73 may be used for installing leads to the positive electrode 3. In the embodiment where the rolled storage cell 23 is cylindrical, the opposing reference marks 73 are disposed on an opposite side of the energy storage media 1, and offset lengthwise from the reference marks 72 (as depicted).

Note that in FIG. 32, the reference marks 72 and the opposing reference marks 73 are both shown as being disposed on a single electrode 3. That is, FIG. 29 depicts an embodiment that is merely for illustration of spatial (i.e., linear) relation of the reference marks 72 and the opposing reference marks 73. This is not meant to imply that the positive electrode 3 and the negative electrode 3 share energy storage media 1. However, it should be noted that in instances where the reference marks 72 and the opposing reference marks 73 are placed by rolling up the storage cell 12 and then marking the separator 5, that the reference marks 72 and the opposing reference marks 73 may indeed by provided on a single separator 5. However, in practice, only one set of the reference marks 72 and the opposing reference marks 73 would be used to install the leads for any given electrode 3. That is, it should be recognized that the embodiment depicted in FIG. 32 is to be complimented with another layer of energy storage media 1 for another electrode 3 which will be of an opposing polarity.

Figure 33:
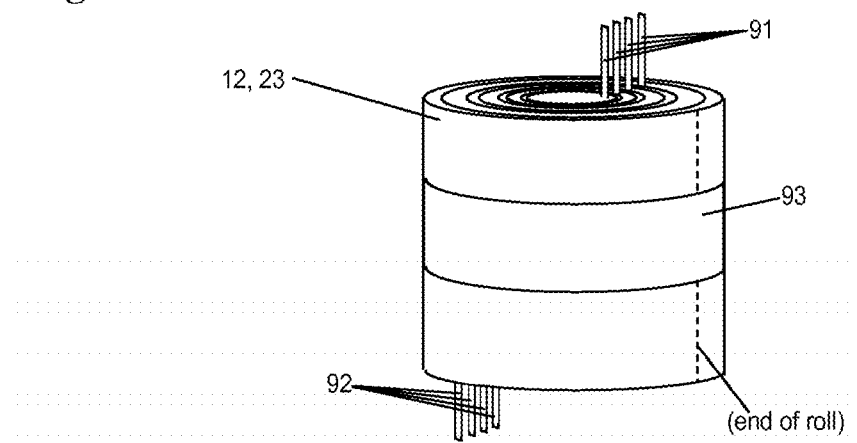
FIG. 33 depicts the rolled up storage cell with the plurality of leads included.
Figure 34:
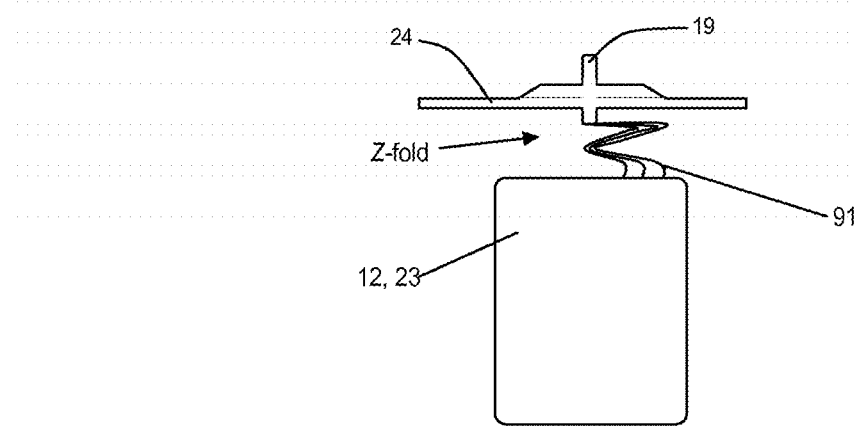
FIG. 34 depicts a Z-fold imparted into aligned leads (i.e., a terminal) coupled to the storage cell.

As shown in FIG. 33, the foregoing assembly technique results in a storage cell 12 that includes at least one set of aligned leads. A first set of aligned leads 91 are particularly useful when coupling the rolled storage cell 23 to one of the negative contact 55 and the positive contact 56, while a set of opposing aligned leads 92 provide for coupling the energy storage media 1 to an opposite contact (55, 56).

The rolled storage cell 23 may be surrounded by a wrapper 93. The wrapper 93 may be realized in a variety of embodiments. For example, the wrapper 93 may be provided as KAPTON™ tape (which is a polyimide film developed by DuPont of Wilmington Del.), or PTFE tape. In this example, the KAPTON™ tape surrounds and is adhered to the rolled storage cell 23. The wrapper 93 may be provided without adhesive, such as a tightly fitting wrapper 93 that is slid onto the rolled storage cell 23. The wrapper 93 may be manifested more as a bag, such as one that generally engulfs the rolled storage cell 23 (e.g., such as the envelope 73 discussed above). In some of these embodiments, the wrapper 93 may include a material that functions as a shrink-wrap would, and thereby provides an efficient physical (and in some embodiments, chemical) enclosure of the rolled storage cell 23. Generally, the wrapper 93 is formed of a material that does not interfere with electrochemical functions of the ultracapacitor 10. The wrapper 93 may also provide partial coverage as needed, for example, to aid insertion of the rolled storage cell 23.

In some embodiments, the negative leads and the positive leads are located on opposite sides of the rolled storage cell 23 (in the case of a jelly-roll type rolled storage cell 23, the leads for the negative polarity and the leads for the positive polarity may be diametrically opposed). Generally, placing the leads for the negative polarity and the leads for the positive polarity on opposite sides of the rolled storage cell 23 is performed to facilitate construction of the rolled storage cell 23 as well as to provide improved electrical separation.

In some embodiments, once the aligned leads 91, 92 are assembled, each of the plurality of aligned leads 91, 92 are bundled together (in place) such that a shrink-wrap (not shown) may be disposed around the plurality of aligned leads 91, 92. Generally, the shrink-wrap is formed of PTFE, however, any compatible material may be used.

In some embodiments, once shrink-wrap material has been placed about the aligned leads 91, the aligned leads 91 are folded into a shape to be assumed when the ultracapacitor 10 has been assembled. That is, with reference to FIG. 34, it may be seen that the aligned leads assume a "Z" shape. After imparting a "Z-fold" into the aligned leads 91, 92 and applying the shrink-wrap, the shrink-wrap may be heated or otherwise activated such that the shrink-wrap shrinks into place about the aligned leads 91, 92. Accordingly, in some embodiments, the aligned leads 91, 92 may be strengthened and protected by a wrapper. Use of the Z-fold is particularly useful when coupling the energy storage media 1 to the feed-through 19 disposed within the cap 24.

Of course, other embodiments for coupling each set of aligned leads 91, 92 (i.e., each terminal 8) to a respective contact 55, 56 may be practiced. For example, in one embodiment, an intermediate lead is coupled to the one of the feed-through 19 and the housing 7, such that coupling with a respective set of aligned leads 91, 92 is facilitated.

Materials used may be selected according to properties such as reactivity, dielectric value, melting point, adhesion to other materials, weldability, coefficient of friction, cost, and other such factors. Combinations of materials (such as layered, mixed, or otherwise combined) may be used to provide for desired properties.

In a variety of embodiments, it is useful to use a plurality of the ultracapacitors 10 together to provide a power supply. In order to provide for reliable operation, individual ultracapacitors 10 may be tested in advance of use. In order to perform various types of testing, each of the ultracapacitors 10 may be tested as a singular cell, in series or in parallel with multiple ultracapacitors 10 attached. Using different metals joined by various techniques (such as by welding) can reduce the ESR of the connection as well as increase the strength of the connections. Some aspects of connections between ultracapacitors 10 are now introduced.

In some embodiments, the ultracapacitor 10 includes two contacts. The two contacts are the glass-to-metal seal pin (i.e., the feed-through 19) and the entire rest of the housing 7. When connecting a plurality of the ultracapacitors 10 in series, it is often desired to couple an interconnection between a bottom of the housing 7 (in the case of the cylindrical form housing 7), such that distance to the internal leads is minimized, and therefore of a minimal resistance. In these embodiments, an opposing end of the interconnection is usually coupled to the pin of the glass-to-metal seal.

With regard to interconnections, a common type of weld involves use of a parallel tip electric resistance welder. The weld may be made by aligning an end of the interconnection above the pin and welding the interconnection directly to the pin. Using a number of welds will increase the strength and connection between the interconnection and the pin. Generally, when welding to the pin, configuring a shape of the end of the interconnection to mate well with the pin serves to ensure there is substantially no excess material overlapping the pin that would cause a short circuit.

An opposed tip electric resistance welder may be used to weld the interconnection to the pin, while an ultrasonic welder may used to weld the interconnection to the bottom of the housing 7. Soldering techniques may used when metals involved are compatible.

With regard to materials used in interconnections, a common type of material used for the interconnection is nickel. Nickel may be used as it welds well with stainless steel and has a strong interface. Other metals and alloys may be used in place of nickel, for example, to reduce resistance in the interconnection.

Generally, material selected for the interconnection is chosen for compatibility with materials in the pin as well as materials in the housing 7. Exemplary materials include copper, nickel, tantalum, aluminum, and nickel copper clad. Further metals that may be used include silver, gold, brass, platinum, and tin.

In some embodiments, such as where the pin (i.e., the feed-through 19) is made of tantalum, the interconnection may make use of intermediate metals, such as by employing a short bridge connection. An exemplary bridge connection includes a strip of tantalum, which has been modified by use of the opposed tip resistance welder to weld a strip of aluminum/copper/nickel to the bridge. A parallel resistance welder is then used to weld the tantalum strip to the tantalum pin.

The bridge may also be used on the contact that is the housing 7. For example, a piece of nickel may be resistance welded to the bottom of the housing 7. A strip of copper may then be ultrasonic welded to the nickel bridge. This technique helps to decrease resistance of cell interconnections. Using different metals for each connection can reduce the ESR of the interconnections between cells in series.

Having thus described aspects of a robust ultracapacitor 10 that is useful for high temperature environments (i.e., up to about 210 degrees Celsius), some additional aspects are now provided and/or defined.

A variety of materials may be used in construction of the ultracapacitor 10. Integrity of the ultracapacitor 10 is essential if oxygen and moisture are to be excluded and the electrolyte 6 is to be prevented from escaping. To accomplish this, seam welds and any other sealing points should meet standards for hermiticity over the intended temperature range for operation. Also, materials selected should be compatible with other materials, such as ionic liquids and solvents that may be used in the formulation of the electrolyte 6.

In some embodiments, the feed-through 19 is formed of metal such as at least one of KOVAR™ (a trademark of Carpenter Technology Corporation of Reading, Pa., where KOVAR is a vacuum melted, iron-nickel-cobalt, low expansion alloy whose chemical composition is controlled within narrow limits to assure precise uniform thermal expansion properties), Alloy 52 (a nickel iron alloy suitable for glass and ceramic sealing to metal), tantalum, molybdenum, niobium, tungsten, Stainless Steel 446 (a ferritic, non-heat treatable stainless steel that offers good resistance to high temperature corrosion and oxidation) and titanium.

The body of glass-to-metal seals that take advantage of the foregoing may be fabricated from 300 series stainless steels, such as 304, 304L, 316, and 316L alloys. The bodies may also be made from metal such as at least one of various nickel alloys, such as Inconel (a family of austenitic nickel-chromium-based superalloys that are oxidation and corrosion resistant materials well suited for service in extreme environments subjected to pressure and heat) and Hastelloy (a highly corrosion resistant metal alloy that includes nickel and varying percentages of molybdenum, chromium, cobalt, iron, copper, manganese, titanium, zirconium, aluminum, carbon, and tungsten).

The insulating material between the feed-through 19 and the surrounding body in the glass-to-metal seal is typically a glass, the composition of which is proprietary to each manufacturer of seals and depends on whether the seal is under compression or is matched. Other insulative materials may be used in the glass-to-metal seal. For example, various polymers may be used in the seal. As such, the term "glass-to-metal" seal is merely descriptive of a type of seal, and is not meant to imply that the seal must include glass.

The housing 7 for the ultracapacitor 10 may be made from, for example, types 304, 304L, 316, and 316L stainless steels. They may also be constructed from, but not limited to, some of the aluminum alloys, such as 1100, 3003, 5052, 4043 and 6061. Various multi-layer materials may be used, and may include, for example, aluminum clad to stainless steel. Other non-limiting compatible metals that may be used include platinum, gold, rhodium, ruthenium and silver.

Specific examples of glass-to-metal seals that have been used in the ultracapacitor 10 include two different types of glass-to-metal seals. A first one is from SCHOTT with a US location in Elmsford, N.Y. This embodiment uses a stainless steel pin, glass insulator, and a stainless steel body. A second glass-to-metal seal is from HERMETIC SEAL TECHNOLOGY of Cincinnatti, Ohio. This second embodiment uses a tantalum pin, glass insulator and a stainless steel body. Varying sizes of the various embodiments may be provided.

An additional embodiment of the glass-to-metal seal includes an embodiment that uses an aluminum seal and an aluminum body. Yet another embodiment of the glass-to-metal seal includes an aluminum seal using epoxy or other insulating materials (such as ceramics or silicon).

A number of aspects of the glass-to-metal seal may be configured as desired. For example, dimensions of housing and pin, and the material of the pin and housing may be modified as appropriate. The pin can also be a tube or solid pin, as well as have multiple pins in one cover. While the most common types of material used for the pin are stainless steel alloys, copper cored stainless steel, molybdenum, platinum-iridium, various nickel-iron alloys, tantalum and other metals, some non-traditional materials may be used (such as aluminum). The housing is usually formed of stainless steel, titanium and/or various other materials.

A variety of fastening techniques may be used in assembly of the ultracapacitor 10. For example, and with regards to welding, a variety of welding techniques may be used. The following is an illustrative listing of types of welding and various purposes for which each type of welding may be used.

Ultrasonic welding may be used for, among other things: welding aluminum tabs to the current collector; welding tabs to the bottom clad cover; welding a jumper tab to the clad bridge connected to the glass-to-metal seal pin; and welding jelly roll tabs together. Pulse or resistance welding may be used for, among other things: welding leads onto the bottom of the can or to the pin; welding leads to the current collector; welding a jumper to a clad bridge; welding a clad bridge to the terminal 8; welding leads to a bottom cover. Laser welding may be used for, among other things: welding a stainless steel cover to a stainless steel can; welding a stainless steel bridge to a stainless steel glass-to-metal seal pin; and welding a plug into the fill port. TIG welding may be used for, among other things: sealing aluminum covers to an aluminum can; and welding aluminum seal into place. Cold welding (compressing metals together with high force) may be used for, among other things: sealing the fillport by force fitting an aluminum ball/tack into the fill port.

Physical aspects of an exemplary ultracapacitor 10 are now provided. Note that in the following tables, the terminology "tab" generally refers to the "lead" as discussed above; the terms "bridge" and "jumper" also making reference to aspects of the lead (for example, the bridge may be coupled to the feed-through, or "pin," while the jumper is useful for connecting the bridge to the tabs, or leads). Use of various connections may facilitate the assembly process, and take advantage of certain assembly techniques. For example, the bridge may be laser welded or resistance welded to the pin, and coupled with an ultrasonic weld to the jumper.

TABLE 7

Weights of Complete Cell With Electrolyte

| Component | Weight (grams) | Percent of total |
| --- | --- | --- |
| SS Can (body of the housing) | 14.451 | 20.87% |
| SS Top cover (cap) | 5.085 | 7.34% |
| Tantalum glass-metal Seal | 12.523 | 18.09% |
| SS/Al Clad Bottom | 10.150 | 14.66% |
| Tack (seal for fill hole) | 0.200 | 0.29% |
| Inner Electrode (cleared, no tabs) | 3.727 | 5.38% |
| Inner Electrode Aluminum | 1.713 | 2.47% |
| Inner Electrode Carbon | 2.014 | 2.91% |
| Outer Electrode (cleared, no tabs) | 4.034 | 5.83% |
| Outer Electrode Aluminum | 1.810 | 2.61% |
| Outer Electrode Carbon | 2.224 | 3.21% |
| Separator | 1.487 | 2.15% |
| Alum. Jelly roll Tabs (all 8) | 0.407 | 0.59% |
| Ta/Al clad bridge | 0.216 | 0.31% |
| Alum. Jumper (bridge-JR tabs) | 0.055 | 0.08% |
| Teflon heat shrink | 0.201 | 0.29% |
| Electrolyte (IT) | 16.700 | 24.12% |
| Total Weight | 69.236 | 100.00% |

TABLE 8

Weights of Complete Cell Without Electrolyte

| Component | Weight (grams) | Percent of total |
|---|---|---|
| SS Can | 14.451 | 27.51% |
| SS Top cover | 5.085 | 9.68% |
| Tantalum glass-metal Seal | 12.523 | 23.84% |
| SS/Al Clad Bottom | 10.150 | 19.32% |
| Tack | 0.200 | 0.38% |
| Inner Electrode (cleared, no tabs) | 3.727 | 7.09% |
| Outer Electrode (cleared, no tabs) | 4.034 | 7.68% |
| Separator | 1.487 | 2.83% |
| Alum. Jelly roll Tabs (all 8) | 0.407 | 0.77% |
| Ta/Al clad bridge | 0.216 | 0.41% |
| Alum. Jumper (bridge-JR tabs) | 0.055 | 0.10% |
| Teflon heat shrink | 0.201 | 0.38% |
| Total Weight | 52.536 | 100.00% |

TABLE 9

Weights of Cell Components in Full Cell with Electrolyte

| Component | Weight (grams) | Percent of total |
|---|---|---|
| Can, covers, seal, bridge, jumper, heat shrink, tack | 42.881 | 61.93% |
| Jelly Roll with Electrodes, tabs, separator | 9.655 | 13.95% |
| Electrolyte | 16.700 | 24.12% |
| Total Weight | 69.236 | 100.00% |

TABLE 10

Weights of Electrode

| Component | Weight (grams) | Percent of total |
|---|---|---|
| Inner electrode carbon | 2.014 | 25.95% |
| Inner electrode aluminum | 1.713 | 22.07% |
| Outer electrode carbon | 2.224 | 28.66% |
| Outer electrode aluminum | 1.810 | 23.32% |
| Total Weight | 7.761 | 100.00% |

As a demonstration of purity in the ultracapacitor 10, the housing 7 of a sealed ultracapacitor 10 was opened, and the storage cell 12 was sampled for impurities. Water content was measured using the Karl Fischer method for the electrodes, separator and electrolyte from the cell 12. Three measurements were taken and averaged.

The water content (i.e., a level of moisture) of electrode and separator was found to be 343.3 ppm (per weight percent) and 152.6 ppm (per weight percent) respectively. In order to measure water content in electrolyte 6, 1.1 ml of electrolyte which had been obtained from the closed cell was mixed with 4 ml of purified electrolyte. The water content of the mixture was then measured. By knowing the water content in the added electrolyte (60.3 ppm), the water content of the electrolyte withdrawn from the cell was determined. Thus, the water content of the electrolyte 6 within the sealed ultracapacitor 10 was 15.5 ppm. Halide content in the ultracapacitor 10 was measured using Ion Selective Electrodes (ISE). The average chloride (Cl-) ion content was found to be 90.9 ppm in the electrolyte 6, while the average fluoride (F-) content was found to be 0.25 ppm.

In general, a method for characterizing a contaminant within the ultracapacitor includes breaching the housing 7 to access contents thereof, sampling the contents and analyzing the sample. Techniques disclosed elsewhere herein may be used in support of the characterizing.

Note that to ensure accurate measurement of impurities in the ultracapacitor and components thereof, including the electrode, the electrolyte and the separator, assembly and disassembly may be performed in an appropriate environment, such as in an inert environment within a glove box.

Figure 35:
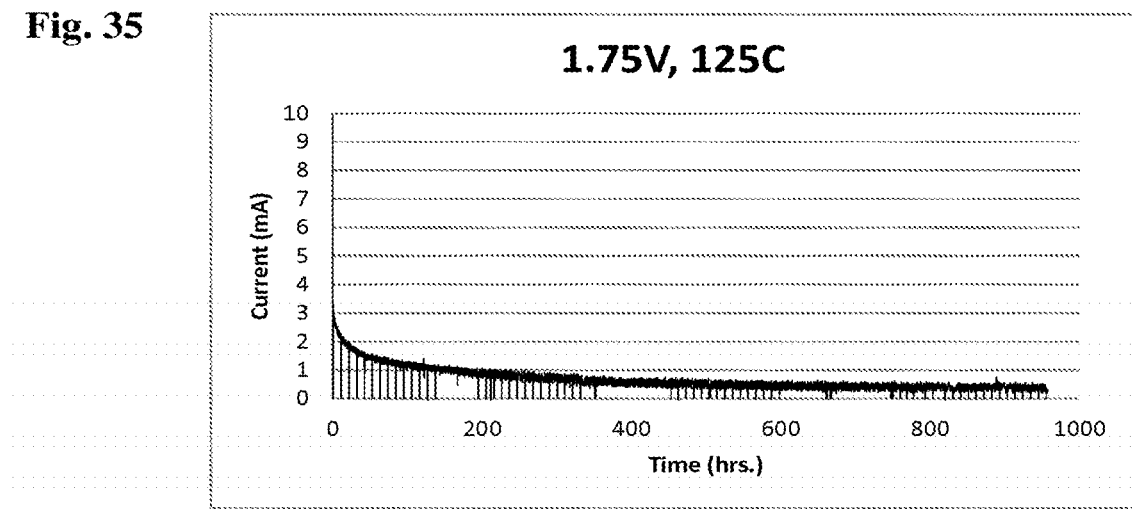
FIGS. 35-38 are graphs depicting performance of exemplary ultracapacitors.
Figure 36:
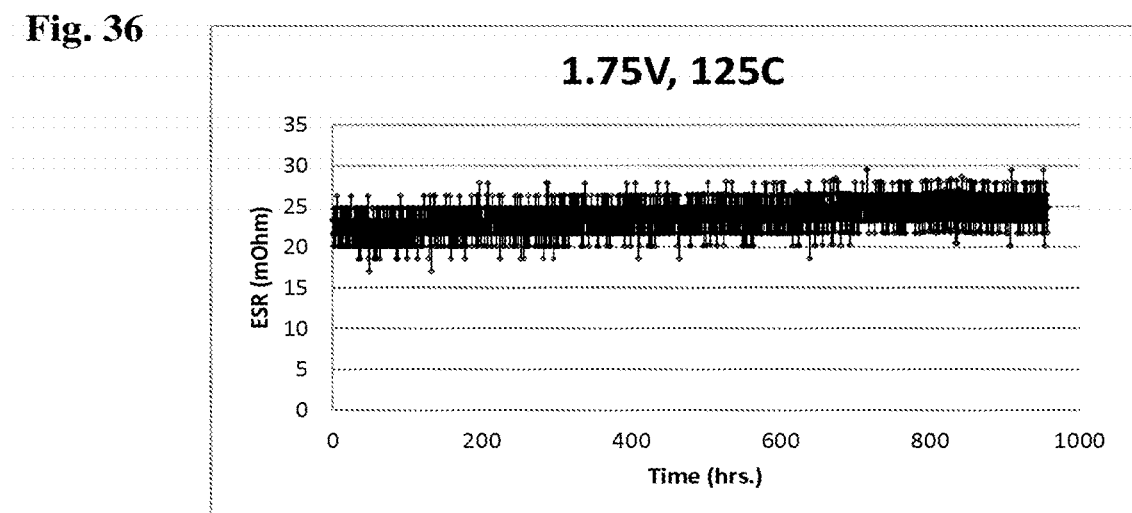
Figure 37:
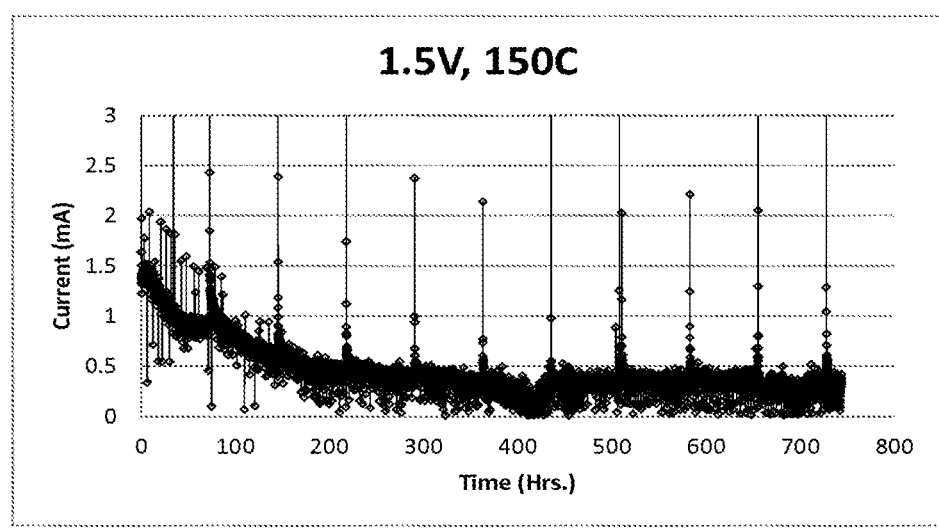
Figure 38:
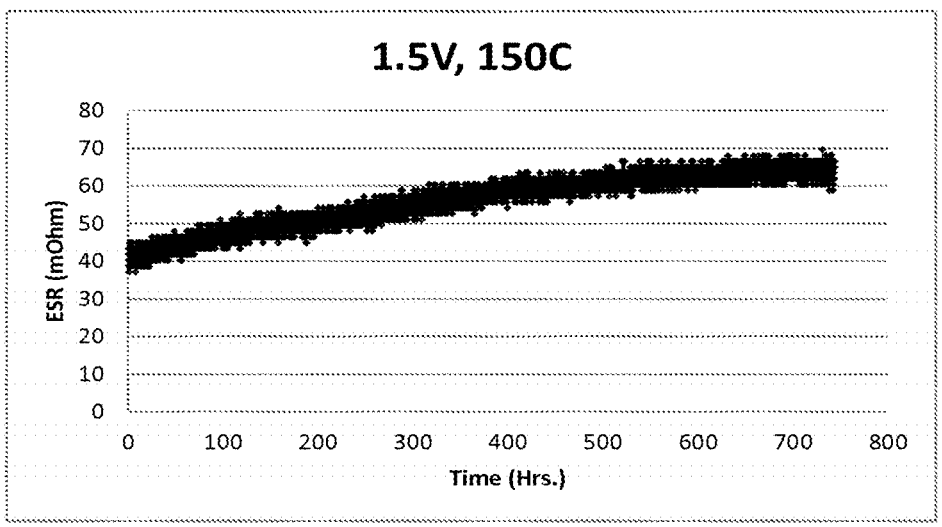
Figure 39:
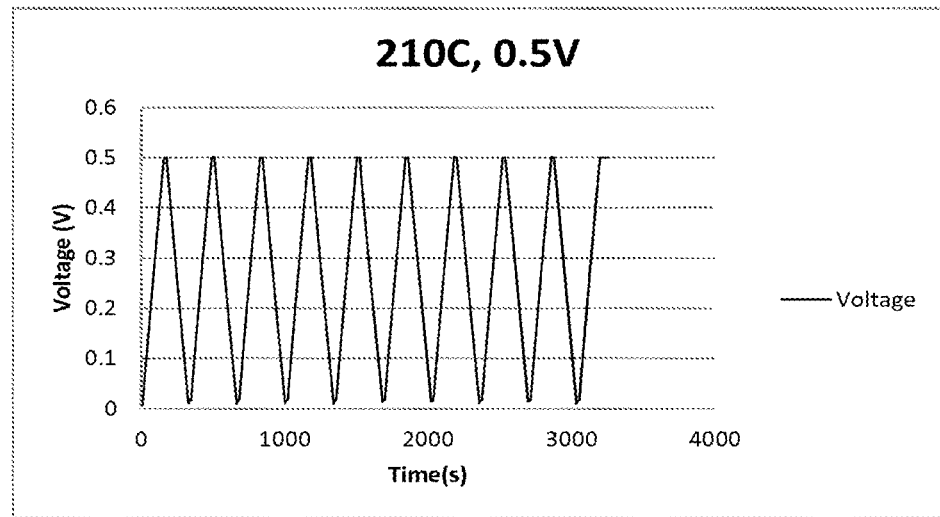
FIGS. 39-43 are graphs depicting performance of exemplary ultracapacitors at 210 degrees Celsius.
Figure 40:
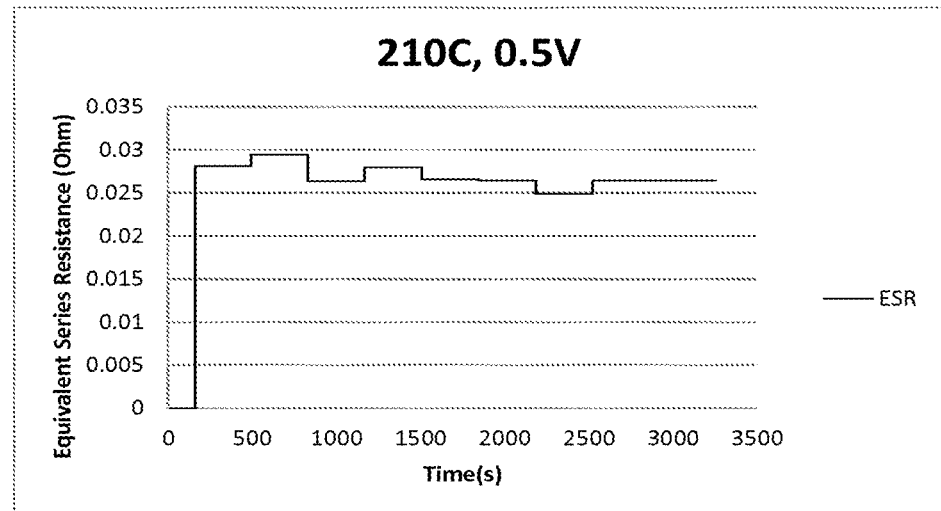
Figure 41:
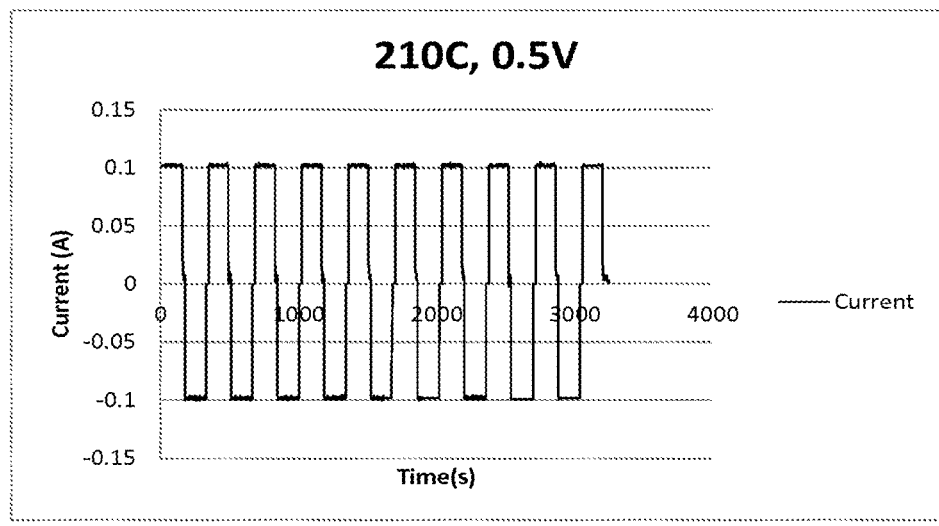
Figure 42:
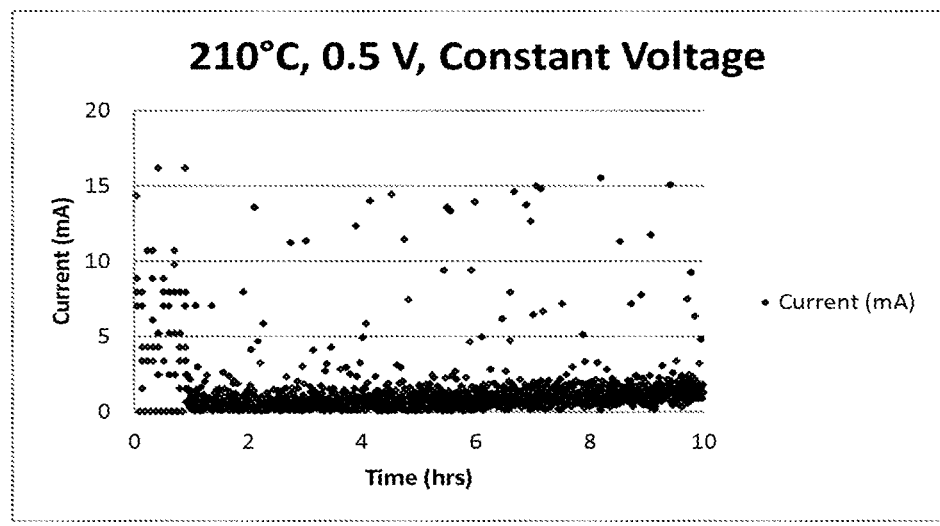
Figure 43:
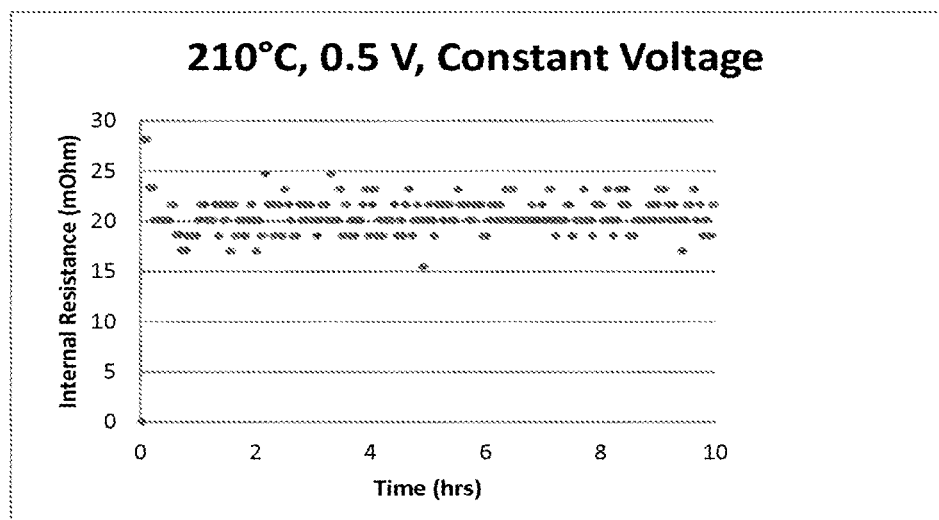

FIGS. 35-38 are graphs depicting performance of exemplary ultracapacitors 10. FIGS. 35 and 36 depict performance of the ultracapacitor 10 at 1.75 volts and 125 degrees Celsius. FIGS. 37 and 38 depict performance of the ultracapacitor 10 at 1.5 volts and 150 degrees Celsius.

Generally, the ultracapacitor 10 may be used under a variety of environmental conditions and demands. For example, terminal voltage may range from about 100 mV to 10 V. Ambient temperatures may range from about minus 40 degrees Celsius to plus 210 degrees Celsius. Typical high temperature ambient temperatures range from plus 60 degrees Celsius to plus 210 degrees Celsius.

FIGS. 39-43 are additional graphs depicting performance of exemplary ultracapacitors 10. In these examples, the ultracapacitor 10 was a closed cell (i.e., housing). The ultracapacitor was cycled 10 times, with a charge and discharge of 100 mA, charged to 0.5 Volts, resistance measurement, discharged to 10 mV, 10 second rest then cycled again.

Tables 11 and 12 provide comparative performance data for embodiments of the ultracapacitor 10. The performance data was collected for a variety of operating conditions as shown.

TABLE 11

Comparative Performance Data

| Cell # | Temperature (° C.) | Voltage (V) | Time (Hrs) | ESR Initial (mOhm) | % ESR Increase | Capacitance Initial (F) | % Capacitance Decrease | Cell Weight (g) | Ending Current (mA) |
|---|---|---|---|---|---|---|---|---|---|
| D2011-09 | 150 | 1.25 | 1500 | 30 | 0 | 93 | 5 | — | 0.5 |
| C1041-02 | 150 | 1.5 | 1150 | 45 | 60 | 32 | — | 28.35 | 0.5 |
| C2021-01 | 150 | 1.5 | 1465 | 33 | 100 | 32 | 70 | 26.61 | 0.8 |
| D5311-01 | 150 | 1.6 | 150 | 9 | 10 | 87 | 4 | — | 5 |
| C6221-05 | 150 | 1.75 | 340 | 15 | 50 | — | — | 38.31 | 1 |
| C6221-05 | 150 | 1.75 | 500 | 15 | 100 | — | — | 38.31 | 2 |
| C6221-05 | 150 | 1.75 | 600 | 15 | 200 | — | — | 38.31 | 2 |
| C6221-05 | 150 | 1.75 | 650 | 15 | 300 | — | — | 38.31 | 2 |
| D1043-02 | 150 | 1.75 | 615 | 43 | 50 | 100 | — | — | 3 |

TABLE 11-continued

Comparative Performance Data

| Cell # | Temperature (° C.) | Voltage (V) | Time (Hrs) | ESR Initial (mOhm) | % ESR Increase | Capacitance Initial (F) | % Capacitance Decrease | Cell Weight (g) | Ending Current (mA) |
|---|---|---|---|---|---|---|---|---|---|
| D1043-02 | 150 | 1.75 | 700 | 43 | 100 | 100 | — | — | 3 |
| C5071-01 | 150 | 1.75 | 600 | 26 | 100 | 27 | 32 | — | 2 |
| C5071-01 | 150 | 1.75 | 690 | 26 | 200 | 27 | 35 | — | 2 |
| C5071-01 | 150 | 1.75 | 725 | 26 | 300 | 27 | 50 | — | 2 |
| C8091-06 | 125 | 1.75 | 500 | 38 | 5 | 63 | 11 | 37.9 | 0.5 |
| C9021-02 | 125 | 1.75 | 1250 | 37 | 10 | 61 | — | 39.19 | 0.3 |
| D5011-02 | 125 | 1.9 | 150 | 13 | 0 | 105 | 0 | — | 1.4 |
| C8091-06 | 125 | 2 | 745 | 41 | 22 | 56 | — | 37.9 | 1.2 |
| D2011-08 | 175 | 1 | 650 | 33 | 12 | 89 | 30 | — | 4 |
| D1043-10 | 175 | 1.3 | 480 | 30 | 100 | 93 | 50 | — | 6.5 |
| C2021-04 | 175 | 1.4 | 150 | 35 | 100 | 27 | — | 27.17 | 3.5 |
| C4041-04 | 210 | 0.5 | 10 | 28 | 0 | 32 | — | 28.68 | 1 |
| C4041-04 | 210 | 0.5 | 20 | 28 | 0 | 32 | — | 28.68 | 7 |
| C4041-04 | 210 | 0.5 | 50 | 28 | 100 | 32 | — | 28.68 | 18 |

TABLE 12

Comparative Performance Data

| Cell # | T (° C.) | Voltage (V) | Time (Hrs) | ESR Initial (mOhm) | Initial Capacitance (F) | Leakage Current (mA) | Volumetric ESR (Ohms × cc) | Volumetric Capacitance (F/cc) | Volumetric Leakage Current (mA/cc) | % ESR Increase | % Capacitance Decrease | Volume (cc) |
|---|---|---|---|---|---|---|---|---|---|---|---|---|
| D2011-09 | 150 | 1.25 | 1500 | 30 | 93 | 0.5 | 0.75 | 3.72 | 0.02 | 0 | 5 | 25 |
| C2021-01 | 150 | 1.5 | 1465 | 33 | 32 | 0.75 | 0.396 | 2.67 | 0.06 | 100 | 5 | 12 |
| C5071-01 | 150 | 1.75 | 600 | 26 | 27 | 2 | 0.338 | 2.08 | 0.15 | 100 | 32 | 13 |
| C5071-01 | 150 | 1.75 | 690 | 26 | 27 | 2 | 0.338 | 2.08 | 0.15 | 200 | 35 | 13 |
| C5071-01 | 150 | 1.75 | 725 | 26 | 27 | 2 | 0.338 | 2.08 | 0.15 | 300 | 50 | 13 |
| C8091-06 | 125 | 1.75 | 500 | 38 | 63 | 0.5 | 0.494 | 4.85 | 0.04 | 5 | 11 | 13 |
| C9021-02 | 125 | 1.75 | 1250 | 37 | 61 | 0.25 | 0.481 | 4.69 | 0.02 | 10 | 11 | 13 |
| D2011-08 | 175 | 1 | 650 | 33 | 89 | 4 | 0.825 | 3.56 | 0.16 | 12 | 30 | 25 |
| D1043-10 | 175 | 1.3 | 480 | 30 | 93 | 6.5 | 0.75 | 3.72 | 0.26 | 100 | 50 | 25 |
| C4041-04 | 210 | 0.5 | 50 | 28 | 32 | 18 | 0.336 | 2.67 | 1.50 | 100 | 50 | 12 |

Thus, data provided in Tables 11 and 12 demonstrate that the teachings herein enable performance of ultracapitors in extreme conditions. Ultracapacitors fabricated accordingly may, for example, exhibit leakage currents of less than about 1 mA per milliliter of cell volume, and an ESR increase of less than about 100 percent in 500 hours (while held at voltages of less than about 2 V and temperatures less than about 150 degrees Celsius). As trade-offs may be made among various demands of the ultracapacitor (for example, voltage and temperature) performance ratings for the ultracapacitor may be managed (for example, a rate of increase for ESR, capacitance,) may be adjusted to accommodate a particular need. Note that in reference to the foregoing, "performance ratings" is given a generally conventional definition, which is with regard to values for parameters describing conditions of operation.

Note that measures of capacitance as well as ESR, as presented in Table 11 and elsewhere herein, followed generally known methods. Consider first, techniques for measuring capacitance.

Capacitance may be measured in a number of ways. One method involves monitoring the voltage presented at the capacitor terminals while a known current is drawn from (during a "discharge") or supplied to (during a "charge") of the ultracapacitor. More specifically, we may use the fact that an ideal capacitor is governed by the equation:

$$I = C \cdot dV/dt,$$

where I represents charging current, C represents capacitance and dV/dt represents the time-derivative of the ideal capacitor voltage, V. An ideal capacitor is one whose internal resistance is zero and whose capacitance is voltage-independent, among other things. When the charging current, I, is constant, the voltage V is linear with time, so dV/dt may be computed as the slope of that line, or as DeltaV/DeltaT. However, this method is generally an approximation and the voltage difference provided by the effective series resistance (the ESR drop) of the capacitor should be considered in the computation or measurement of a capacitance. The effective series resistance (ESR) may generally be a lumped element approximation of dissipative or other effects within a capacitor. Capacitor behavior is often derived from a circuit model comprising an ideal capacitor in series with a resistor having a resistance value equal to the ESR. Generally, this yields good approximations to actual capacitor behavior.

In one method of measuring capacitance, one may largely neglect the effect of the ESR drop in the case that the internal resistance is substantially voltage-independent, and the charging or discharging current is substantially fixed. In that case, the ESR drop may be approximated as a constant and is naturally subtracted out of the computation of the change in voltage during said constant-current charge or discharge. Then, the change in voltage is substantially a reflection of the change in stored charge on the capacitor. Thus, that change in voltage may be taken as an indicator, through computation, of the capacitance.

For example, during a constant-current discharge, the constant current, I, is known. Measuring the voltage change during the discharge, DeltaV, during a measured time interval DeltaT, and dividing the current value I by the ratio DeltaV/DeltaT, yields an approximation of the capacitance. When I is measured in amperes, DeltaV in volts, and DeltaT in seconds, the capacitance result will be in units of Farads.

Turning to estimation of ESR, the effective series resistance (ESR) of the ultracapacitor may also be measured in a number of ways. One method involves monitoring the voltage presented at the capacitor terminals while a known current is drawn from (during a "discharge") or supplied to (during a "charge") the ultracapacitor. More specifically, one may use the fact that ESR is governed by the equation:

$$V=I*R,$$

where I represents the current effectively passing through the ESR, R represents the resistance value of the ESR, and V represents the voltage difference provided by the ESR (the ESR drop). ESR may generally be a lumped element approximation of dissipative or other effects within the ulracapacitor. Behavior of the ultracapacitor is often derived from a circuit model comprising an ideal capacitor in series with a resistor having a resistance value equal to the ESR. Generally, this yields good approximations of actual capacitor behavior.

In one method of measuring ESR, one may begin drawing a discharge current from a capacitor that had been at rest (one that had not been charging or discharging with a substantial current). During a time interval in which the change in voltage presented by the capacitor due to the change in stored charge on the capacitor is small compared to the measured change in voltage, that measured change in voltage is substantially a reflection of the ESR of the capacitor. Under these conditions, the immediate voltage change presented by the capacitor may be taken as an indicator, through computation, of the ESR.

For example, upon initiating a discharge current draw from a capacitor, one may be presented with an immediate voltage change DeltaV over a measurement interval DeltaT. So long as the capacitance of the capacitor, C, discharged by the known current, I, during the measurement interval, DeltaT, would yield a voltage change that is small compared to the measured voltage change, DeltaV, one may divide DeltaV during the time interval DeltaT by the discharge current, I, to yield an approximation to the ESR. When I is measured in amperes and DeltaV in volts, the ESR result will have units of Ohms.

Both ESR and capacitance may depend on ambient temperature. Therefore, a relevant measurement may require the user to subject the ultracapacitor 10 to a specific ambient temperature of interest during the measurement.

Performance requirements for leakage current are generally defined by the environmental conditions prevalent in a particular application. For example, with regard to a capacitor having a volume of 20 mL, a practical limit on leakage current may fall below 100 mA. As referred to herein, a "volumetric leakage current" of the ultracapacitor 10 generally refers to leakage current divided by a volume of the ultracapacitor 10, and may be expressed, for example in units of mA/cc. Similarly, a "volumetric capacitance" of the ultracapacitor 10 generally refers to capacitance of the ultracapacitor 10 divided by the volume of the ultracapacitor 10, and may be expressed, for example in units of F/cc. Additionally, "volumetric ESR" of the ultracapacitor 10 generally refers to ESR of the ultracapacitor 10 multiplied by the volume of the ultracapacitor 10, and may be expressed, for example in units of Ohms•cc.

Note that one approach to reduce the volumetric leakage current at a specific temperature is to reduce the operating voltage at that temperature. Another approach to reduce the volumetric leakage current at a specific temperature is to increase the void volume of the ultracapacitor. Yet another approach to reduce the leakage current is to reduce loading of the energy storage media 1 on the electrode 3.

A variety of environments may exist where the ultracapacitor 10 is of particular usefulness. For example, in automotive applications, ambient temperatures of 105 degrees Celsius may be realized (where a practical lifetime of the capacitor will range from about 1 year to 20 years). In some downhole applications, such as for geothermal well drilling, ambient temperatures of 300 degrees Celsius or more may be reached (where a practical lifetime of the capacitor will range from about 100 hours to 10,000 hours).

A "lifetime" for the capacitor is also generally defined by a particular application and is typically indicated by a certain percentage increase in leakage current or degradation of another parameter (as appropriate or determinative for the given application). For instance, in one embodiment, the lifetime of a capacitor in an automotive application may be defined as the time at which the leakage current increases to 200% of its initial (beginning of life or "BOL") value.

Electrolyte 6 may be selected for exhibiting desirable properties, such as high thermal stability, a low glass transition temperature (Tg), a viscosity, a particular rhoepectic or thixotropic property (e.g., one that is dependent upon temperature), as well as high conductivity and exhibited good electric performance over a wide range of temperatures. As examples, the electrolyte 6 may have a high degree of fluidicity, or, in contrast, be substantially solid, such that separation of electrodes 3 is assured. Accordingly, other embodiments of electrolyte 6 that exhibit the desired properties may be used as well or in conjunction with any of the foregoing.

"Peak power density" is one fourth times the square of peak device voltage divided by the effective series resistance of the device. "Energy density" is one half times the square of the peak device voltage times the device capacitance.

For the purposes of this invention, an ultracapacitor 10 may have a volume in the range from about 0.05 cc to about 7.5 liters.

Nominal values of normalized parameters may be obtained by multiplying or dividing the normalized parameters (e.g. volumetric leakage current) by a normalizing characteristic (e.g. volume). For instance, the nominal leakage current of an ultracapacitor having a volumetric leakage current of 10 mA/cc and a volume of 50 cc is the product of the volumetric leakage current and the volume, 500 mA. Meanwhile the nominal ESR of an ultracapacitor having a volumetric ESR of 20 mOhm•cc and a volume of 50 cc is the quotient of the volumetric ESR and the volume, 0.4 mOhm.

A volume of a particular ultracapacitor 10 may be extended by combining several storage cells (e.g., welding together several jelly rolls) within one housing 7 such that they are electrically in parallel or in series.

Embodiments of the ultracapacitor 10 that exhibit a relatively small volume may be fabricated in a prismatic form factor such that the electrodes 3 of the ultracapacitor 10 oppose one another, at least one electrode 3 having an internal contact to a glass to metal seal, the other having an internal contact to a housing or to a glass to metal seal.

It should be recognized that the teachings herein are merely illustrative and are not limiting of the invention.

Further, one skilled in the art will recognize that additional components, configurations, arrangements and the like may be realized while remaining within the scope of this invention. For example, configurations of layers, electrodes, leads, terminals, contacts, feed-throughs, caps and the like may be varied from embodiments disclosed herein. Generally, design and/or application of components of the ultracapacitor and ultracapacitors making use of the electrodes are limited only by the needs of a system designer, manufacturer, operator and/or user and demands presented in any particular situation.

Further, various other components may be included and called upon for providing for aspects of the teachings herein. For example, additional materials, combinations of materials and/or omission of materials may be used to provide for added embodiments that are within the scope of the teachings herein. As discussed herein, terms such as "adapting," "configuring," "constructing" and the like may be considered to involve application of any of the techniques disclosed herein, as well as other analogous techniques (as may be presently known or later devised) to provide an intended result.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including," "has" and "having" are intended to be inclusive such that there may be additional elements other than the listed elements.

In the present application a variety of variables are described, including but not limited to components (e.g. electrode materials, electrolytes, etc.), conditions (e.g., temperature, freedom from various impurities at various levels), and performance characteristics (e.g., post-cycling capacity as compared with initial capacity, low leakage current, etc.). It is to be understood that any combination of any of these variables can define an embodiment of the invention. For example, a combination of a particular electrode material, with a particular electrolyte, under a particular temperature range and with impurity less than a particular amount, operating with post-cycling capacity and leakage current of particular values, where those variables are included as possibilities but the specific combination might not be expressly stated, is an embodiment of the invention. Other combinations of articles, components, conditions, and/or methods can also be specifically selected from among variables listed herein to define other embodiments, as would be apparent to those of ordinary skill in the art.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention but to be construed by the claims appended herein.

What is claimed is:

1. An ultracapacitor comprising:
an energy storage cell and an electrolyte within an hermetically sealed housing, the cell electrically coupled to a positive contact and a negative contact, wherein the ultracapacitor is configured to operate at a temperature within a temperature range between about 80 degrees Celsius to about 210 degrees Celsius; the housing comprising an interior with at least a portion that exhibits a lower reactivity with the electrolyte than a reactivity of the housing,
wherein a positive electrode and a negative electrode each comprise energy storage media disposed onto a respective current collector and the positive electrode and the negative electrode are separated from each other by a separator,
wherein a total concentration of moisture within the housing is below 1,000 ppm, a total concentration of halide ions is below 1,000 ppm, a total concentration of metallic species is below 1,000 ppm, and a total concentration of impurities from solvents and electrolyte precursors is below 1,000 ppm; wherein the portion that exhibits low reactivity comprises a barrier and a coating disposed thereon; wherein the barrier comprises polytetrafluoroethylene, perfluoroalkoxy, fluorinated ethylene propylene (FEP) or ethylene tetrafluoroethylene (ETFE); wherein the housing comprises a layered material with the interior comprising a layer of aluminum clad to an outer layer comprising an alloy.

2. The energy storage device of claim 1, wherein the portion that exhibits low reactivity comprises a layer of electrically insulative material.

3. The energy storage device of claim 2, wherein the electrically insulative material comprises a polymer based material.

4. The energy storage device of claim 1, wherein the portion of the interior that exhibits low reactivity with the electrolyte is within a cap of the housing.

5. The energy storage device of claim 1, comprising one of an ultracapacitor, an electrochemical battery and a lithium based battery.

6. The energy storage device of claim 1, wherein the energy storage media has a water content less than 500 parts per million (ppm).

7. The energy storage device of claim 1, wherein the electrolyte comprises an ionic liquid comprising a cation and an anion.

8. The energy storage device of claim 1, wherein the electrolyte comprises an ionic salt and a solvent.

9. The energy storage device of claim 1, wherein the electrolyte has a water content less than 500 ppm.

10. An ultracapacitor comprising:
an energy storage cell and an electrolyte within a hermetically sealed housing, the cell electrically coupled to a positive contact and a negative contact, wherein the ultracapacitor is configured to operate at a temperature within a temperature range between about 80 degrees Celsius to about 210 degrees Celsius; the housing comprising an interior with at least a portion that exhibits a lower reactivity with the electrolyte than a reactivity of the housing,
wherein a positive electrode and a negative electrode each comprise energy storage media disposed onto a respective current collector and the positive electrode and the negative electrode are separated from each other by a separator, wherein a total concentration of moisture within the housing is below 1,000 ppm, a total concentration of halide ions is below 1,000 ppm, a total concentration of metallic species is below 1,000 ppm, and a total concentration of impurities from solvents and electrolyte precursors is below 1,000 ppm; wherein the portion that exhibits low reactivity comprises a barrier and a coating disposed thereon; wherein the barrier comprises polytetrafluoroethylene, perfluoroalkoxy, fluorinated ethylene propylene (FEP) or ethylene tetrafluoroethylene (ETFE); wherein the housing comprises a layered material with the interior comprising a layer of aluminum clad to an outer layer comprising an alloy; and wherein the outer layer comprises a weldable material.

11. The energy storage device of claim 10, wherein the portion that exhibits low reactivity comprises a layer of electrically insulative material.

12. The energy storage device of claim 11, wherein the electrically insulative material comprises a polymer based material.

13. The energy storage device of claim 10, wherein the portion of the interior that exhibits low reactivity with the electrolyte is within a cap of the housing.

14. The energy storage device of claim 10, comprising one of an ultracapacitor, an electrochemical battery and a lithium based battery.

15. The energy storage device of claim 10, wherein the energy storage media has a water content less than 500 parts per million (ppm).

16. The energy storage device of claim 10, wherein the electrolyte comprises an ionic liquid comprising a cation and an anion.

17. The energy storage device of claim 10, wherein the electrolyte comprises an ionic salt and a solvent.

18. The energy storage device of claim 10, wherein the electrolyte has a water content less than 500 ppm.

* * * * *